United States Patent
Fox et al.

(10) Patent No.: US 10,265,653 B2
(45) Date of Patent: Apr. 23, 2019

(54) FILTRATION MEDIUM INCLUDING POLYMERIC NETTING OF RIBBONS AND STRANDS

(71) Applicant: 3M INNOVATIVE PROPERTIES COMPANY, St. Paul, MN (US)

(72) Inventors: Andrew R. Fox, Oakdale, MN (US); Lori-Ann S. Prioleau, St. Paul, MN (US); Ronald W. Ausen, St. Paul, MN (US); Zhiqun Zhang, Roseville, MN (US); William J. Kopecky, Hudson, WI (US); Leigh E. Wood, Woodbury, MN (US); Michelle L. Legatt, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 176 days.

(21) Appl. No.: 15/121,976

(22) PCT Filed: Feb. 26, 2015

(86) PCT No.: PCT/US2015/017755
§ 371 (c)(1),
(2) Date: Aug. 26, 2016

(87) PCT Pub. No.: WO2015/130934
PCT Pub. Date: Sep. 3, 2015

(65) Prior Publication Data
US 2017/0065923 A1    Mar. 9, 2017

Related U.S. Application Data

(60) Provisional application No. 62/042,066, filed on Aug. 26, 2014, provisional application No. 61/946,601, (Continued)

(51) Int. Cl.
*B01D 46/00* (2006.01)
*B01D 46/52* (2006.01)
(Continued)

(52) U.S. Cl.
CPC ......... *B01D 46/521* (2013.01); *B01D 39/083* (2013.01); *B01D 39/1607* (2013.01);
(Continued)

(58) Field of Classification Search
CPC .. B01D 46/521; B01D 46/0636; B01D 53/14; B01D 53/22
(Continued)

(56) References Cited

U.S. PATENT DOCUMENTS 3,971,373 A   7/1976  Braun
4,429,001 A   1/1984  Kolpin
(Continued)

FOREIGN PATENT DOCUMENTS

CN        1208666 A    2/1999
CN      102630176 A    8/2012
(Continued)

OTHER PUBLICATIONS

Partial European Search Report, EP15754444.6, dated Oct. 23, 2017, 3 pages.
(Continued)

*Primary Examiner* — Robert A Hopkins
(74) *Attorney, Agent, or Firm* — Kenneth B. Wood

(57) ABSTRACT

A filtration medium including a polymeric netting of polymeric ribbons and polymeric strands. Each of the polymeric ribbons and strands has a length and width, with the length being the longest dimension and the width being the shortest dimension. The polymeric ribbons have a height-to-width aspect ratio of at least three to one or five to one a major surface that is intermittently bonded to a polymeric strand,
(Continued)

and a height typically greater than the height of the one polymeric strand. A filter including the filtration medium and a method useful for making the polymeric netting are also disclosed.

15 Claims, 24 Drawing Sheets

Related U.S. Application Data filed on Feb. 28, 2014, provisional application No. 61/946,592, filed on Feb. 28, 2014.

(51) Int. Cl.

| | |
|---|---|
| *B32B 5/02* | (2006.01) |
| *B32B 5/08* | (2006.01) |
| *B29C 47/00* | (2006.01) |
| *B29C 47/04* | (2006.01) |
| *B29C 47/06* | (2006.01) |
| *B29C 47/14* | (2006.01) |
| *B29C 47/30* | (2006.01) |
| *B01D 39/08* | (2006.01) |
| *B01D 39/16* | (2006.01) |
| *B29D 28/00* | (2006.01) |
| *B29L 28/00* | (2006.01) |
| *B29L 31/48* | (2006.01) |

(52) U.S. Cl.
CPC ..... *B01D 46/0032* (2013.01); *B01D 46/0036* (2013.01); *B29C 47/0014* (2013.01); *B29C 47/043* (2013.01); *B29C 47/064* (2013.01); *B29C 47/145* (2013.01); *B29C 47/30* (2013.01); *B29D 28/00* (2013.01); *B32B 5/028* (2013.01); *B32B 5/08* (2013.01); *B01D 2239/0407* (2013.01); *B01D 2239/0435* (2013.01); *B29C 47/0021* (2013.01); *B29C 47/0033* (2013.01); *B29C 47/0064* (2013.01); *B29K 2995/0046* (2013.01); *B29L 2028/00* (2013.01); *B29L 2031/4878* (2013.01); *B32B 2262/0207* (2013.01); *B32B 2555/02* (2013.01); *D10B 2509/026* (2013.01); *Y10T 428/24273* (2015.01); *Y10T 428/298* (2015.01)

(58) Field of Classification Search
USPC .................................................. 55/486, 521
See application file for complete search history.

(56) References Cited

U.S. PATENT DOCUMENTS

| | | | |
|---|---|---|---|
| 4,588,537 A | 5/1986 | Klasse | |
| 4,634,485 A | 1/1987 | Welygan | |
| 4,636,419 A * | 1/1987 | Madsen | B29C 47/0033 428/131 |
| 4,798,575 A | 1/1989 | Siversson | |
| 4,976,677 A | 12/1990 | Siversson | |
| 5,389,175 A | 2/1995 | Wenz | |
| 5,496,507 A | 3/1996 | Angadjivand | |
| 5,534,339 A | 7/1996 | Stokes | |
| 5,908,598 A | 6/1999 | Rousseau | |
| 6,045,595 A | 4/2000 | Freudenberg | |
| 6,056,809 A * | 5/2000 | Chapman | B01D 39/083 264/258 |
| 6,102,039 A | 8/2000 | Springett | |
| 6,126,707 A | 10/2000 | Pitzen | |
| 6,280,824 B1 | 8/2001 | Insley | |
| 6,562,112 B2 | 5/2003 | Jones | |
| 6,589,317 B2 | 7/2003 | Zhang | |
| 6,752,889 B2 | 6/2004 | Insley | |
| 6,758,884 B2 | 7/2004 | Zhang | |
| 6,858,297 B1 | 2/2005 | Shah | |
| 7,141,098 B2 | 11/2006 | Zhang | |
| 7,235,115 B2 | 6/2007 | Duffy | |
| 7,503,953 B2 | 3/2009 | Sundet | |
| 7,897,078 B2 | 3/2011 | Petersen | |
| 8,889,243 B2 | 11/2014 | Hanschen | |
| 9,012,013 B2 * | 4/2015 | Duffy | A41D 13/1115 428/167 |
| 9,724,865 B2 | 8/2017 | Ausen | |
| 2003/0134515 A1 | 7/2003 | David | |
| 2006/0054023 A1 | 3/2006 | Raetz | |
| 2008/0026659 A1 | 1/2008 | Brandner | |
| 2008/0045616 A1 | 2/2008 | Wu | |
| 2008/0264259 A1 | 10/2008 | Leung | |
| 2010/0078379 A1 | 4/2010 | Rocklitz | |
| 2012/0017910 A1 | 1/2012 | Li | |
| 2013/0331247 A1 | 12/2013 | Yang | |
| 2014/0220328 A1 | 8/2014 | Ausen | |
| 2015/0238783 A1 | 8/2015 | Nguyen | |
| 2016/0002838 A1 | 1/2016 | Ausen | |
| 2016/0074552 A1 | 3/2016 | Liu | |
| 2016/0101590 A1 | 4/2016 | Kane et al. | |
| 2016/0354898 A1 | 12/2016 | Nienaber | |
| 2016/0362824 A1 | 12/2016 | Ausen | |
| 2017/0008242 A1 | 1/2017 | Legatt | |
| 2017/0066210 A1 | 3/2017 | Wood | |
| 2017/0081573 A1 | 3/2017 | Kipke | |
| 2017/0274228 A1 | 9/2017 | Nguyen | |
| 2017/0361518 A1 | 12/2017 | Ausen | |

FOREIGN PATENT DOCUMENTS

| | | |
|---|---|---|
| WO | WO 01/07144 A2 | 2/2001 |
| WO | WO 2009/147422 A2 | 12/2009 |
| WO | WO 2011/007144 A1 | 1/2011 |
| WO | WO 2011/062843 A2 | 5/2011 |
| WO | WO 2013-028654 | 2/2013 |
| WO | WO 2013-032683 | 3/2013 |
| WO | WO 2013-052371 | 4/2013 |
| WO | WO 2014/028470 A1 | 2/2014 |
| WO | WO 2014-164242 | 10/2014 |
| WO | WO 2015-130942 | 9/2015 |

OTHER PUBLICATIONS

International Search Report for PCT International Application No. PCT/US2015/017755, dated May 28, 2015, 3 pages.

* cited by examiner

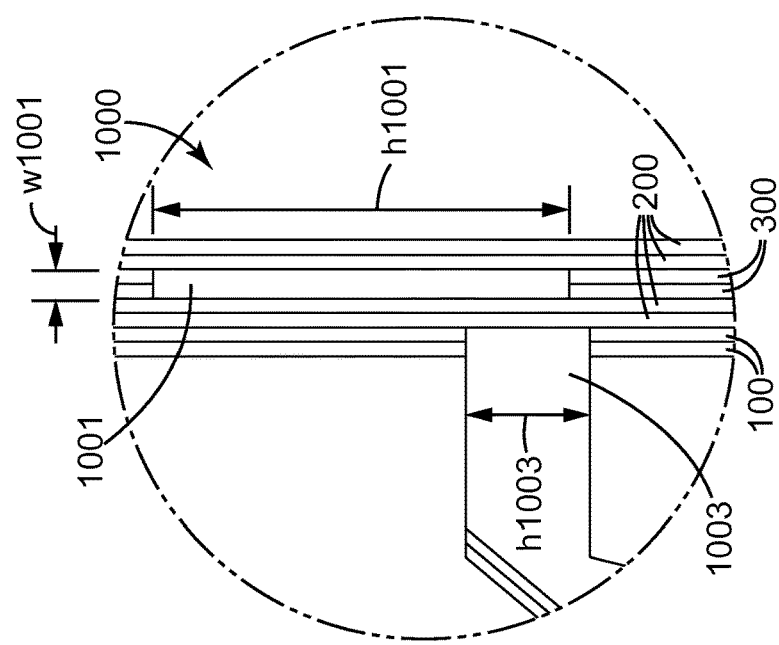
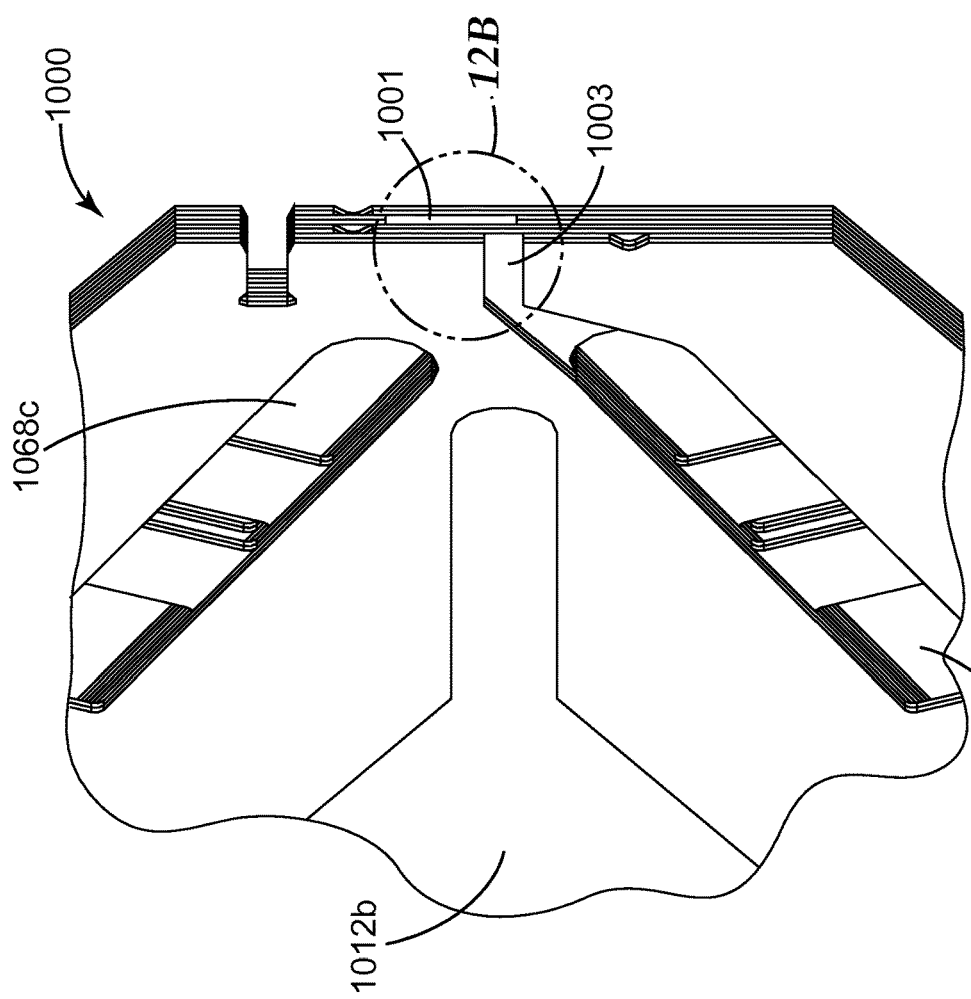
FIG. 12B
FIG. 12A

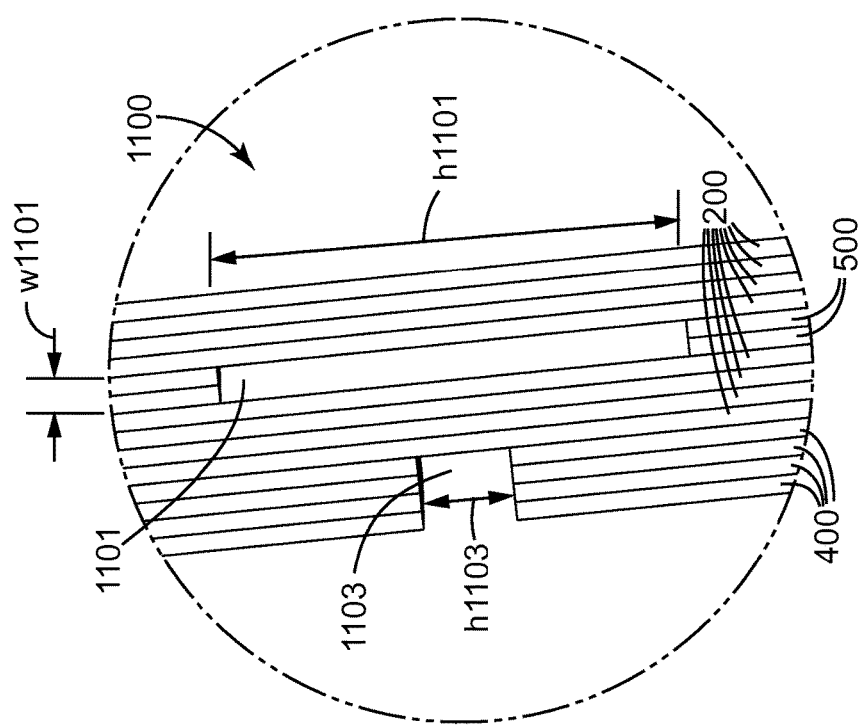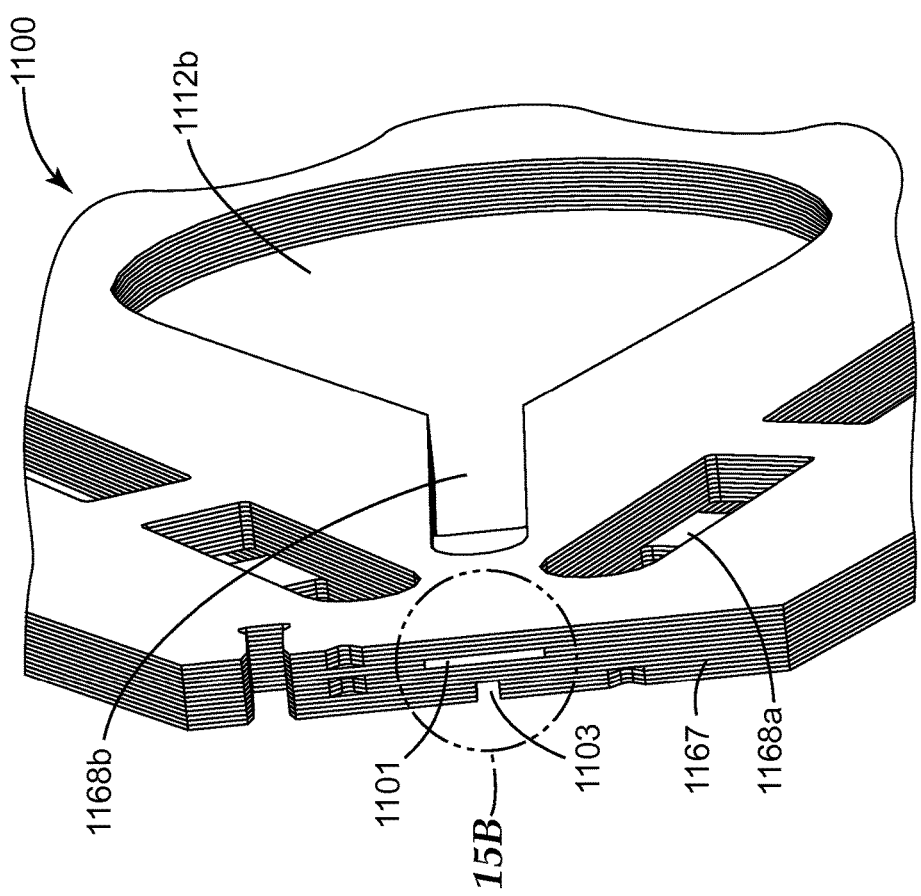

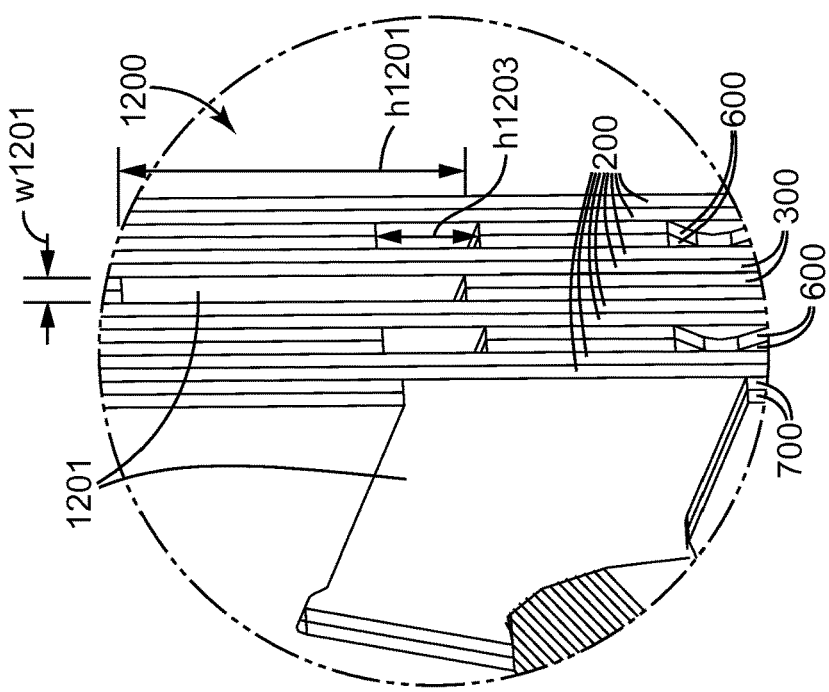
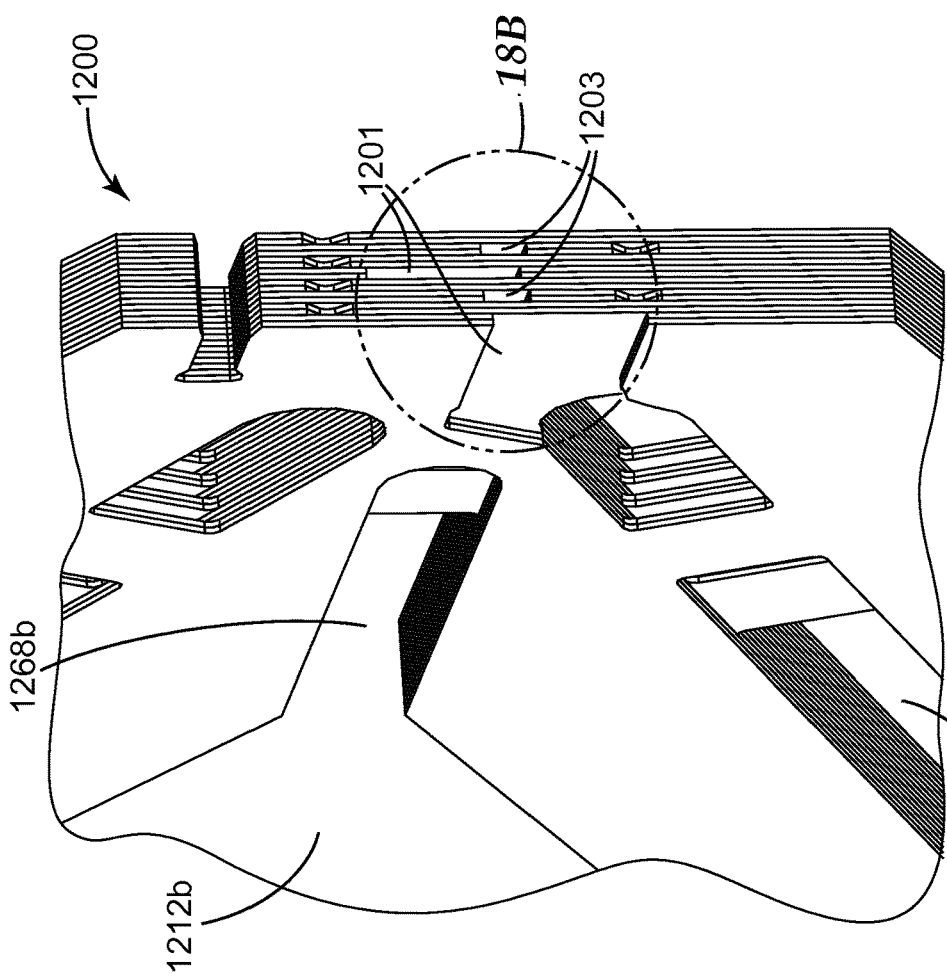
FIG. 18B
FIG. 18A

FILTRATION MEDIUM INCLUDING POLYMERIC NETTING OF RIBBONS AND STRANDS

CROSS-REFERENCE TO RELATED APPLICATIONS

This application claims priority to U.S. Provisional Application No. 62/042,066, filed Aug. 26, 2014; 61/946,601, filed Feb. 28, 2014; and 61/946,592, filed Feb. 28, 2014; the disclosures of which are incorporated by reference in their entirety herein.

BACKGROUND

Fibrous filter media, particularly nonwoven fibrous filter media, are commonly used for air filtration. Interactions between particles and the fibrous structure when air passes through the fibrous filter medium can result in particulate capture via several mechanisms. Typically, fibrous filtration media are fairly thin and have a relatively high airflow resistance, and the flow resistance can increase significantly over the lifetime of the filter. The fibrous structures may be imparted with electrostatic charge to increase the filtration efficiency without affecting the airflow resistance.

Less common air filtration materials employ a channel-flow design, in which flow channels are formed from filter media. When air passes through the flow channels, particles are captured when they contact the filter media sidewalls. The channels may be formed in a honeycomb-like structure (hexagonal or other). Or sheet-like materials may be corrugated and laminated together to form a channel flow structure. In other cases, three-dimensional replicated films in a T-shaped configuration may be stacked to form a channel flow structure. These channel-flow structures are often, but not exclusively, formed from films, and the films or other structures may be electrostatically charged to impart an improved filtration efficiency. Some filter media with flow channels are described in U.S. Pat. No. 6,280,824 (Insley et al.) and U.S. Pat. No. 6,589,317 (Zhang et al.).

In other technologies, extrusion processes for making polymeric nets are known in the art. For example, recently extrusion dies and methods using a plurality of shims have been reported to be capable of producing polymeric netting having a thickness up to 750 micrometers. The polymeric strands of the netting are described as being periodically joined together at bond regions throughout the array. See Int. Pat. Appl. Pub. Nos. WO2013/028654, WO2013/032683, and WO2013/052371, each to Ausen et al. Also, an extruded article including an undulating strand with an aspect ratio of at least about 2 to 1 is disclosed in U.S. Pat. No. 4,634,485 (Welygan et al.).

SUMMARY

The present disclosure provides a polymeric netting useful as a filtration medium. The polymeric netting includes at least two different types of generally continuous elements, one of which is ribbon like and oriented on its edge within the netting. The ribbon-like element can be at least partially held in place by a second element that typically has a smaller height. Unlike other channel-flow filter media, advantageously, the polymeric netting according to the present disclosure can be made in a continuous, one-step extrusion process.

In one aspect, the present disclosure provides a filtration medium that includes a polymeric netting of polymeric ribbons and polymeric strands. Each of the polymeric ribbons and strands has a length and width, with the length being the longest dimension and the width being the shortest dimension. In some embodiments, the polymeric ribbons have a height-to-width aspect ratio of at least five to one, a major surface that is intermittently bonded to only one polymeric strand at spaced-apart bonding sites, and a height that is at least two times greater than the height of the one polymeric strand. In some embodiments, the polymeric ribbons have a height-to-width aspect ratio of at least three to one, a major surface that is intermittently bonded to a polymeric strand at spaced-apart bonding sites, and a height that is greater than a height of the polymeric strand. In some embodiments, first and second polymeric ribbons each independently have a height-to-width aspect ratio of at least three to one, a major surface that is intermittently bonded to a polymeric strand, with a center line bisecting the major surface and first and second edges symmetrically disposed on opposite sides of the center line. In these embodiments, the polymeric netting has first and second opposing major surfaces transverse to the major surfaces of the first and second polymeric ribbons, the first major surface of the polymeric netting comprises the first edges of the first polymeric ribbons, and the second major surface comprises the second edges of the second polymeric ribbons, wherein the first polymeric ribbons do not extend to the second major surface, and wherein the second polymeric ribbons do not extend to the first major surface. In some embodiments, the polymeric netting is electrostatically charged, the polymeric netting further comprises sorbent particles attached to at least some of the polymeric ribbons or polymeric strands, the polymeric netting is pleated or any combination of these features.

In another aspect, the present disclosure provides filter including the filtration medium described above. In some embodiments, the filter includes a second, different filtration medium.

In another aspect, the present disclosure provides a method of making a polymeric netting. The method includes providing an extrusion die comprising at least one cavity, a dispensing surface, and fluid passageways between the at least one cavity and the dispensing surface. The dispensing surface has an array of first dispensing orifices separated by an array of second dispensing orifices. The first and second dispensing orifices each have a height and a width. The first dispensing orifices each have a height-to-width aspect ratio of at least three to one or five to one, and the height of the first dispensing orifices is larger (in some embodiments, at least two times larger) than the height of the second dispensing orifices. The method further includes dispensing polymeric ribbons from the first dispensing orifices at a first speed while simultaneously dispensing polymeric strands from the second dispensing orifices at a second speed that is at least twice the first speed to provide the polymeric netting. In some embodiments, the method further includes electrostatically charging the polymeric netting, pleating the polymeric netting, attaching sorbent particles to at least one of the polymeric ribbons or polymeric strands, or any combination of these processes.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g. 1 to 5 includes 1, 1.5, 2, 2.75, 3, 3.80, 4, and 5).

The terms "first" and "second" are used in this disclosure. It will be understood that, unless otherwise noted, those terms are used in their relative sense only. In particular, in some embodiments certain components may be present in interchangeable and/or identical multiples (e.g., pairs). For these components, the designation of "first" and "second" may be applied to the components merely as a matter of convenience in the description of one or more of the embodiments. However, when first and second edges are described, it should be understood that the first edges for a portion of polymeric ribbons are each in the same orientation. For example, when looking at a polymeric netting, the first edges may be all those defining the upper surface of the polymeric netting, and the second edges may be all those defining the lower surface of the polymeric netting, or vice versa.

The term "ribbon" refers to longitudinally extending elements in the polymeric netting having a generally rectangular or oblong cross section. There may be ribbons in the polymeric nettings disclosed herein other than those having a height-to-width aspect ratio of at least three to one, at least five to one, or at least seven to one. In other words, not all elements in the polymeric netting having rectangular cross sections are required to have a height-to-width aspect ratio of at least three to one, at least five to one, or at least seven to one. The polymeric strands may also have rectangular cross sections.

A major surface of the polymeric ribbons is a surface defined by the height and the length of the ribbon.

The terms "multiple" and "a plurality" refer to more than one.

The term "netting" is used to describe the constructions herein since there are spaces between the ribbons and strands, for example, between the sites where they are bonded together. Such spaces provide openings or channels in the filtration medium.

The term "pleated" describes a web wherein at least portions of which have been folded to form a configuration comprising rows of generally parallel, oppositely oriented folds. As such, the pleating of a web as a whole is distinguished from the crimping of individual ribbons or strands.

The term "charged" when used with respect to the polymeric netting refers to a polymeric netting that exhibits at least a 50 percent loss in Quality Factor (QF) after being exposed to a 20 Gray absorbed dose of 1 millimeter (mm) beryllium-filtered 80 peak kilo-voltage (KVp) X-rays when evaluated for percent dioctyl phthalate (% DOP) penetration at a face velocity of 7 centimeters per second (cm/sec).

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which:

FIG. 12A is a perspective assembly drawing of a sequence of shims employing the shims of FIGS. 9, 10, and 11 configured to form a portion of the polymeric netting as shown in FIG. 1;

FIG. 12B is an expanded view of the section referenced as "12B" in FIG. 12A;

FIG. 15A is a perspective assembly drawing of a sequence of shims employing the shims of FIGS. 10, 13, and 14 configured to form a portion of the polymeric netting as shown in FIG. 5;

FIG. 15B is an expanded view of the section referenced as "15B" in FIG. 15A;

FIG. 18A is a perspective assembly drawing of a sequence of shims employing the shims of FIGS. 10, 11, 16, and 17 configured to form a portion of the polymeric netting as shown in FIG. 6;

FIG. 18B is an expanded view of the section referenced as "18B" in FIG. 18A;

DETAILED DESCRIPTION

The polymeric netting according to the present disclosure may be useful as a filtration medium for a variety of applications, for example, high air-flow applications and water filtration. It may be useful, for example, in heating, ventilation, and air conditional (HVAC) filtration, automobile filtration, appliance filtration, mechanical or electronic equipment filtration, and in window filters. The polymeric netting may be useful as a stand-alone filter layer, without other filtration media. However, in some embodiments, the polymeric netting may be useful in combination with a second, different filtration medium. In some of these embodiments, the polymeric netting may be useful as a support layer for another filter (e.g., a pleated filter), as a pre-filtration layer to at least partially protect a particulate filter from excess contamination or large particles, as a substrate for flocking or sorbent particle loading when used, for example, with an electrostatically charged filter, or as a dust-cake breaking layer.

Figure 1:
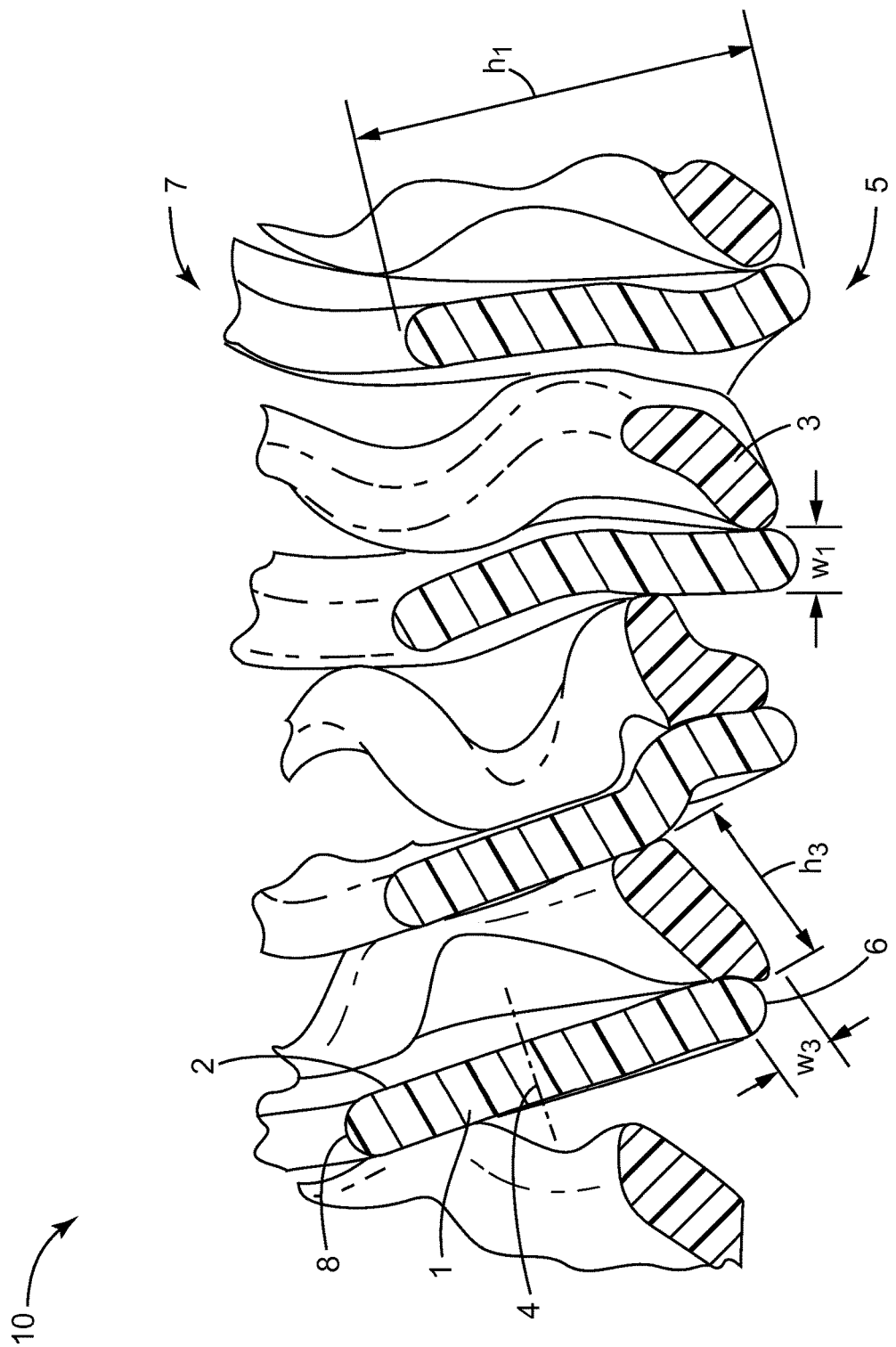
FIG. 1 is cross-sectional side view of an embodiment of a polymeric netting according to the present disclosure.

FIG. 1 illustrates a side view of an embodiment of a polymeric netting 10 according to the present disclosure. The polymeric netting 10 includes polymeric ribbons 1 and polymeric strands 3. The polymeric ribbons 1 and polymeric strands 3 each have a length, width "w1" and "w3", and height "h1" and "h3". The length of the polymeric ribbons 1 and strands 3 is the longest dimension and is not shown in FIG. 1. The width is the shortest dimension. The height "h1" of the ribbons and the height "h3" strands is typically between the length and width of each, respectively. However, the strands 3 can also have heights "h3" that are substantially the same as their widths "w3". For circular strands, the height and width may both be referred to as diameter. The height-to-width aspect ratio of at least some the polymeric ribbons is at least three to one. In some embodiments, the height-to-width aspect ratio of at least some of the polymeric ribbons is at least 5:1, 7:1, 8:1, 10:1, 11:1, 15:1, 20:1, 30:1, or 40:1. In some embodiments, the height of the polymeric ribbon is greater than that of the polymeric strands. In some embodiments, the height of each of the polymeric ribbons is at least 2, 2.5, 3, 5, 10, or 20 times greater than the height of the single polymeric strand. The height of the polymeric ribbons may be in a range from 50 micrometers to 15 millimeters (mm). In some embodiments, the height of the polymeric ribbons is greater than 750 micrometers. In some of these embodiments, the height of the polymeric ribbons is in a range from greater than 750 micrometers to 15 mm (e.g., 0.775 mm to 10 mm, 0.775 mm to 5 mm, 0.775 mm to 3 mm, 0.775 mm to 2 mm or 0.8 mm to 1.5 mm). In some embodiments, the height of at least one of the polymeric ribbons or polymeric strands is less than 750 micrometers. In some of these embodiments, the height of at least one of the polymeric ribbons or polymeric strands is in a range from 0.1 mm to less than 750 micrometers (e.g., 0.3 mm to 0.745 mm or 0.5 mm to 0.745 mm).

Figure 2:
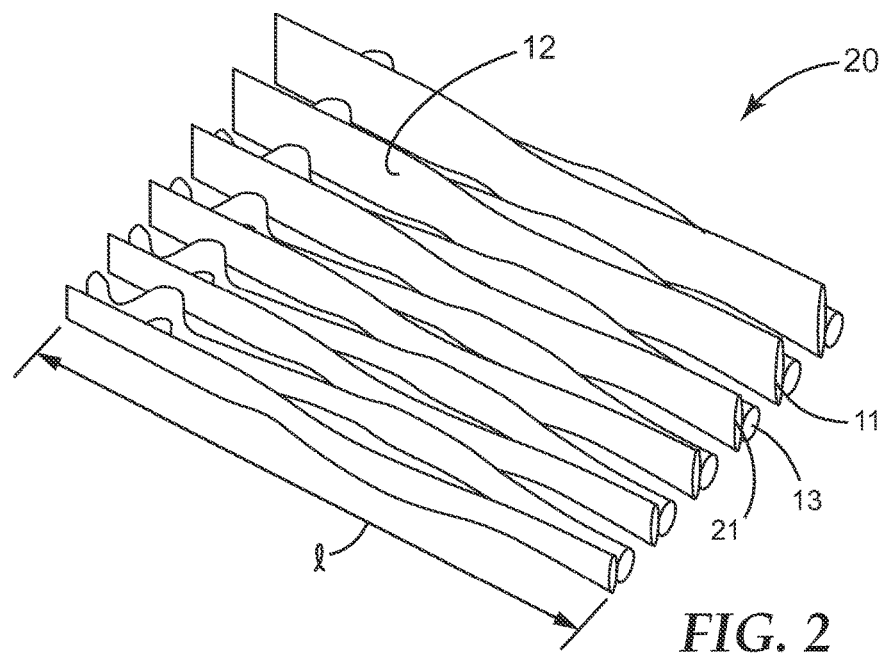
FIG. 2 is a perspective view of an embodiment of a polymeric netting according to the present disclosure.

FIG. 2 illustrates a perspective view of an embodiment of a polymeric netting according to the present disclosure. In this perspective view, the length "l" of the polymeric ribbons and strands can be observed.

Referring again to FIGS. 1 and 2, the polymeric ribbons 1, 11, 21, each have a first major surface 2, 12 that is intermittently joined to a single polymeric strand 3, 13. That is, in the illustrated embodiment, two or more polymeric strands are not joined to the first major surface of the polymeric ribbon. In other embodiments, in at least a portion of the polymeric netting, the major surface 2, 12 of at least one of the first or second polymeric ribbons 1, 11 is bonded to more than one polymeric strand. For example, the major surface 2, 12 of at least one of the first or second polymeric ribbons 1, 11 may be bonded to two polymeric strands.

When it is said that the first major surface of polymeric ribbon is intermittently joined to the single polymeric strand, it can be observed that the polymeric strand oscillates between bonding to the polymeric ribbon and another portion of the netting on the opposite side of the polymeric strand. In the embodiment illustrated in FIG. 2, two adjacent polymeric ribbons 11, 21 are joined together by a single polymeric strand 13 at least partially alternately bonded to the two adjacent polymeric ribbons 11, 21. However, this is not a requirement. For example, in some embodiments, the polymeric strand can oscillate between bonding to the polymeric ribbon and a non-oscillating strand that does not necessarily have a height-to-width aspect ratio of at least three to one. Since a major surface of the polymeric ribbon is intermittently bonded to a polymeric strand, which is at least partially alternately bonded to the polymeric ribbon and another strand or ribbon of the netting, the polymeric ribbons are typically not intersected by the polymeric strands. In any of the embodiments of the polymeric netting disclosed herein, the strands and ribbons of polymer typically do not substantially intersect each other (e.g., at least 50 (at least 55, 60, 65, 70, 75, 80, 85, 90, 95, 99, or even 100) percent by number do not intersect each other) either by forming a superimposed intersection point or an interlaid intersection point.

Figure 3:
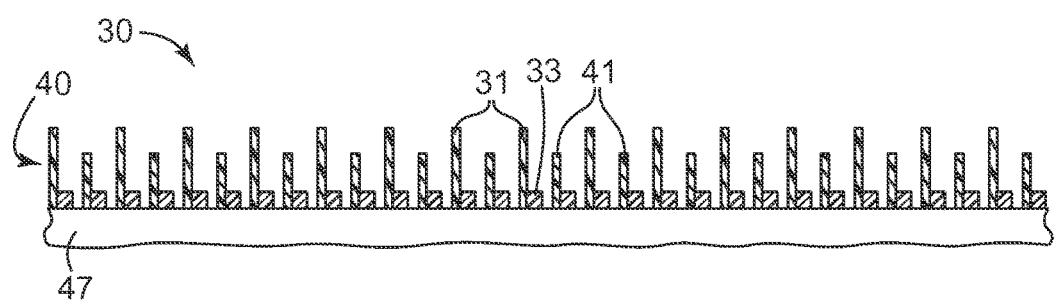
FIG. 3 is schematic cross-sectional view of a plane of another embodiment of a polymeric netting according to the present disclosure, in which the polymeric netting is joined to a substrate such as an absorbent component.
Figure 4:
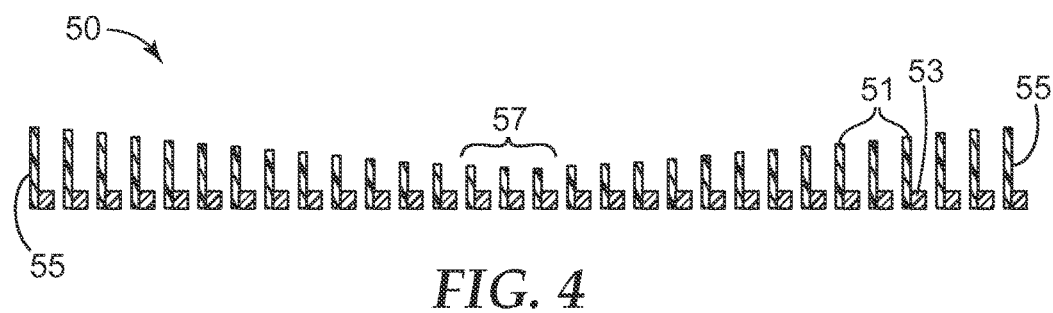
FIG. 4 is schematic cross-sectional view of a plane of yet another embodiment of a polymeric netting according to the present disclosure.

In FIG. 1, the heights h1 of the polymeric ribbons 1 are all about the same size, and the heights h3 of the polymeric strands 3 are all the same size, but as shown in FIGS. 2 to 4, this is not a requirement. For example, there may be two different types of polymeric ribbons 31, 41 as shown in FIG.

3. The height-to-width aspect ratio of polymeric ribbon 31 is greater than the height-to-width aspect ratio of polymeric ribbon 41. In FIGS. 2 and 4, the polymeric ribbons 11, 21, 51 have a range of heights. In FIG. 4, the height-to-width aspect ratio of the polymeric ribbons 51 is greater on the edges 55 of the polymeric netting 50 than in the center 57. In these embodiments, at least some of the polymeric ribbons 51 have a height-to-width aspect ratio of at least three to one.

While in FIGS. 1 to 4, the spacings between the various polymeric ribbons and polymeric strands in the polymeric netting are approximately equal, this is not a requirement. The spacing between any two adjacent polymeric ribbons 1, 11, 21, 31, 41, 51 or any two adjacent polymeric strands 3, 13, 33, 53 can vary in the cross-web direction. For example, any two adjacent polymeric ribbons or any two adjacent polymeric strands may be positioned more closely together at the center of the netting than on the edges or vice versa.

In the embodiments illustrated in FIGS. 1 to 4, the polymeric ribbons and polymeric strands alternate. In some embodiments of the polymeric netting according to the present disclosure and/or made according to the method disclosed herein, the polymeric ribbons and polymeric strands alternate in at least a portion of the netting. In these embodiments and even in other embodiments in which the polymeric ribbons and polymeric strands do not alternate, typically each major surface of the polymeric ribbon is intermittently bonded to only one polymeric strand. Furthermore, it should be noted that the spacing shown in the cross-sectional view of a plane of the polymeric netting shown in FIGS. 3, 4, 5, 6, and 8 (described below) is idealized. In a typically cross-sectional planar view, not all of the polymeric strands would appear to be identically bonded to the major surfaces of the polymeric ribbons. Instead, the positions of the strands may appear to be more like that shown in the cross-sectional planar view of FIG. 7 and in the side view shown in FIG. 1.

Figure 5:
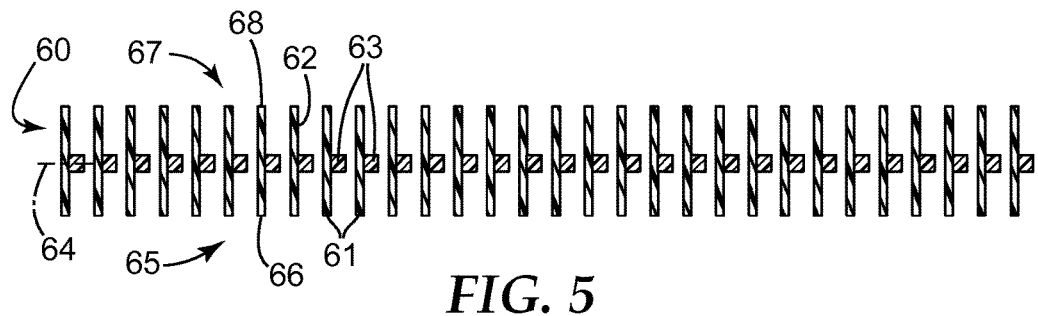
FIG. 5 is schematic cross-sectional view of a plane of still another embodiment of a polymeric netting according to the present disclosure.
Figure 6:
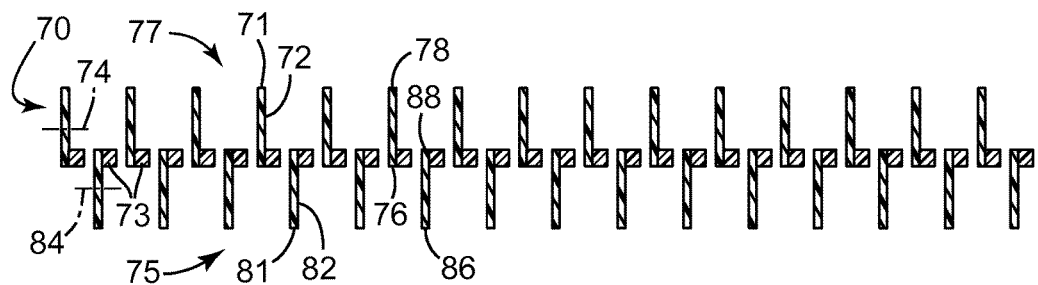
FIG. 6 is schematic cross-sectional view of a plane of still another embodiment of a polymeric netting according to the present disclosure.

Some embodiments of configurations of the polymeric netting according to the present disclosure are illustrated in FIGS. 1, 5, and 6. In FIG. 1, the polymeric ribbons 1 each have a center line 4 bisecting major surface 2 and first and second edges 6, 8 symmetrically disposed on opposite sides of the center line 4. For each of the polymeric ribbons 1, the associated single polymeric strand 3 is bonded to the major surface 2 at a location between the center line 4 and the first edges 6. In the illustrated embodiment, the single polymeric strand 3 is bonded to the two adjacent polymeric ribbons 1 at a location between the center line 4 and the first edges 6. In other words, the single polymeric strand 3 is bonded to major surface 2 closer to the first edge 6 than the second edge 8. Explained yet another way, the polymeric netting 10 has first and second opposing major surfaces 5, 7 transverse to the major surfaces 2 of the polymeric ribbons 1. The second major surface 7 of the polymeric netting 10 comprises the second edges 8 of the polymeric ribbons 1, and the first major surface 5 of the polymeric netting 10 comprises the first edges 6 of the polymeric ribbons 1 and portions of at least some of the polymeric strands 3.

In the embodiment shown in FIG. 5, the polymeric ribbons 61 and polymeric strands 63 are vertically aligned. In these embodiments, the single polymeric strand 63 is bonded to major surface 62 at a location including center line 64. Explained yet another way, the polymeric netting 60 has first and second opposing major surfaces 65, 67 transverse to the major surfaces 62 of the polymeric ribbons 61. The first major surface 65 of the polymeric netting 60 comprises the first edges 66 of the polymeric ribbons 61, and the second major surface 67 of the polymeric netting 60 comprises the second edges 68 of the polymeric ribbons 61. Neither the first nor second major surfaces 65, 67 comprise a portion of the polymeric strands 63.

In the embodiment shown in FIG. 6, the polymeric ribbons 71, 81 each have a center line 74, 84 bisecting major surface 72, 82, and second, top 78, 88 and first, bottom edges 76, 86 symmetrically disposed on opposite sides of the center line 74, 84, wherein some polymeric ribbons 81 are bonded to their single polymeric strand 73 at a location between the center line 84 and the second, top edge 88 and some of the polymeric ribbons 71 are bonded to their single polymeric strand 73 at a location between the center line 74 at the first, bottom edge 76. In other words, the single polymeric strands 73 are bonded to a major surface 72 of a first portion of polymeric ribbons 71 closer to the first edge 76 than the second edge 78, and the single polymeric strands 73 are bonded to major surface 82 of a second portion of polymeric ribbons 81 closer to the second edge 88 than the first edge 86. Explained another way, the polymeric netting 70 has first and second opposing major surfaces 75, 77 transverse to the major surfaces 72, 82 of the polymeric ribbons 71, 81. The first major surface 75 of the polymeric netting 70 comprises the first edges 86 of a first group of the polymeric ribbons 81, and the second major surface 77 of the polymeric netting 70 comprises the second edges 78 of a second group of the polymeric ribbons 71. Neither the first nor second major surfaces 75, 77 comprise a portion of the polymeric strands 73. The first group of the polymeric ribbons 81 does not extend to the second major surface 77, and the second group of the polymeric ribbons 71 does not extend to the first major surface 75. Further details about this embodiment can be found in U.S. Pat. App. Ser. No. 61/946,592 (Legatt et al.), filed on Feb. 28, 2014, and incorporated by reference herein in its entirety.

While in FIGS. 1 to 6, the widths w1 of the polymeric ribbons are each about the same, and the widths w3 of the polymeric strands are all about the same, this is also not a requirement. The widths of the polymeric ribbons and/or polymeric strands may change across the netting (e.g., in a direction transverse to the length of the polymeric ribbons and polymeric strands). For example, at least one of the polymeric ribbons or polymeric strands may have a larger width w1 or w3 at the center of the netting than on the edges or vice versa.

Figure 7:
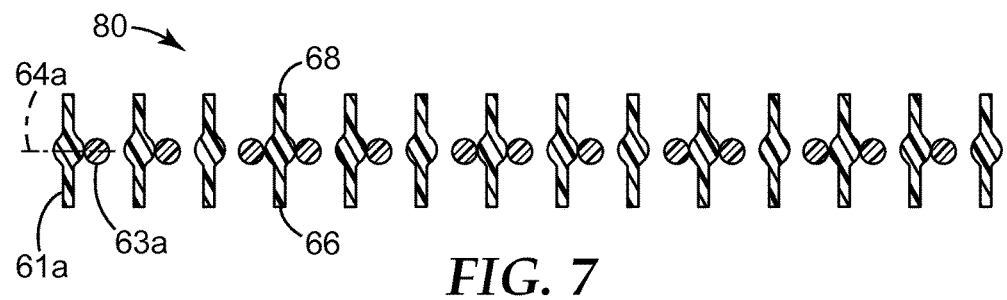
FIG. 7 is schematic cross-sectional view of a plane of still another embodiment of a polymeric netting according to the present disclosure.

In the embodiments illustrated in FIGS. 1 to 6, the width w1 of the polymeric ribbons is uniform from the second edge 8, 78, 88 to the first edge 6, 76, 86. Again, this is not a requirement. For example, a polymeric netting 80 having ribbons with non-uniform widths between the top and bottom edges is shown in FIG. 7. This embodiment is like the embodiment shown in FIG. 5 in which the polymeric ribbons 61a and polymeric strands 63a are vertically centered. In polymeric netting 80, however, the width of the polymeric ribbon 61a is wider at a location including a center line 64a than it is at the top and bottom edges 68 and 66. That is, in the illustrated embodiment, the polymeric ribbon 61a is wider at the location where it is bonded to the polymeric strand 63a.

In the polymeric netting 80 illustrated in FIG. 7, the polymeric ribbon 61a is designed to have a greater width near the center line 64a than at the top and bottom edges 68 and 66. The width of the polymeric ribbon can also be designed to change from the top edge to bottom edge in other ways. For example, the width can be greater at the top edge 68 and/or bottom edge 66 than near the center line 64a. The polymeric strands may be bonded to the polymeric ribbons at these locations. The polymeric ribbons may also have random fluctuations in width caused by the extrusion process. In any situation in which the width of the polymeric ribbon is non-uniform, the width w1 of the polymeric ribbon for the purposes of determining the height-to-width aspect ratio is measured at its smallest width.

Similarly, the height of the polymeric ribbon may be measured at its tallest height. The heights of the polymeric ribbons are generally uniform. The polymeric ribbons in any of the embodiments of polymeric nettings disclosed herein typically would not have any discrete posts (e.g., mechanical fasteners or hooks) upstanding from the edges of the polymeric ribbons. Similarly, the polymeric nettings disclosed herein in any of their embodiments typically would not have any discrete posts (e.g., mechanical fasteners or hooks) on their first or second major surfaces.

Figure 8:
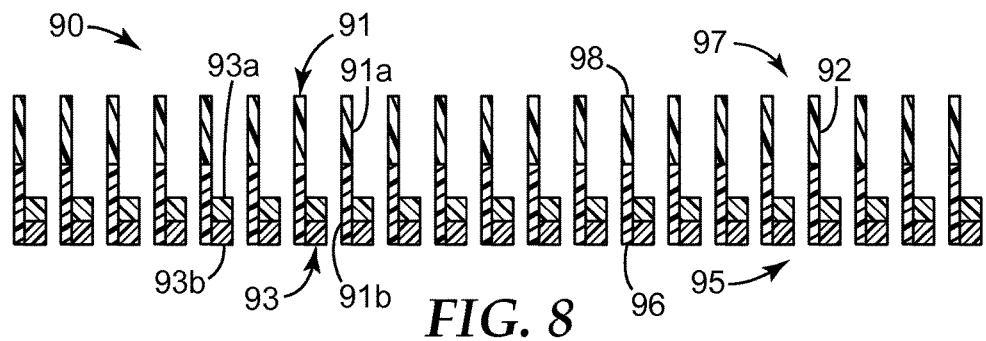
FIG. 8 is schematic cross-sectional view of a plane of yet another embodiment of a polymeric netting according to the present disclosure.

In some embodiments in which the polymeric ribbons each have a center line bisecting the major surface and first and second edges symmetrically disposed on opposite sides of the center line, the first edges of the polymeric ribbons comprise a different composition than the second edges of the polymeric ribbons. An embodiment of such a polymeric netting is shown in FIG. 8. In FIG. 8, the polymeric netting 90 includes polymeric ribbons 91 and polymeric strands 93. The polymeric ribbons 91 each have a first portion 91a and a second portion 91b. The first and second portions 91a and 91b are made from different polymeric compositions. Likewise, the polymeric strands 93 each have a first portion 93a and a second portion 93b. In these embodiments, the polymeric netting 90 has first and second opposing major surfaces 95, 97 transverse to the major surfaces 92 of the polymeric ribbons 91. The first major surface 95 of the polymeric netting 90 comprises the first edges 96 of polymeric ribbons 91 and second portions 93b of polymeric strands 93, and the second major surface 97 of the polymeric netting 90 comprises the second edges 98 of polymeric ribbons 91. The first portions 91a of the polymeric ribbons 91 and consequently the second edges 98 comprise a first polymeric composition, and the second portions 91b of the polymeric ribbons 91 and consequently the first edges 96 comprise a second polymeric composition. The first portions 93a of the polymeric strands comprise a third polymeric composition, and the second portions 93b of the polymeric strands 93 comprise a fourth polymeric composition. In the illustrated embodiment, at least the first and second polymeric compositions are different, and the first polymeric composition does not extend to the first edges 96 of the polymeric ribbons 91.

Although other methods may be useful, the polymeric nettings disclosed herein in any of their embodiments can conveniently and advantageously be prepared by extrusion using an extrusion die and method described herein. The extrusion die useful for making the polymeric netting according to the present disclosure has a variety of passageways from cavities within the die to dispensing orifices. The dispensing orifices each have a width, which is the dimension that corresponds to the width of a particular polymeric ribbon or polymeric strand, and a height, which is the dimension that corresponds to the thickness of the resulting extruded polymeric netting and the height of a particular polymeric ribbon or polymeric strand.

In the extrusion die and method for making the polymeric netting according to the present disclosure, the extrusion die has at least one cavity, a dispensing surface, and fluid passageways between the at least one cavity and the dispensing surface. The dispensing surface has an array of first dispensing orifices separated by an array of second dispensing orifices. This means that for any two first dispensing orifices, there is at least one second dispensing orifice between them. However, it is possible that for any two first dispensing orifices, there is more than one second dispensing orifice between them, and there may be dispensing orifices other than the second dispensing orifices between them in a side-by-side configuration.

The fluid passageways are capable of physically separating the polymers from the at least one cavity (e.g., first and second cavities and optionally any further die cavities within the extrusion die) until the fluid passageways enter the dispensing orifices. The shape of the different passageways within the die may be identical or different. Examples of passageway cross-sectional shapes include round, square, and rectangular shapes. These cross-sectional shapes, selection of polymeric material, and die swell can influence the cross-sectional shape of the ribbons and strands.

In many embodiments, including the embodiments illustrated in FIGS. 9 to 27A and 27B, the extrusion die includes at least a first and second cavity, with first fluid passageways between the first cavity and the first dispensing orifices and second fluid passageways between the second cavity and the second dispensing orifices. The first and second dispensing orifices each have a height and a width, the first dispensing orifices each have a height-to-width aspect ratio of at least 3:1 (in some embodiments, at least 5:1, 8:1, 10:1, 11:1, 15:1, 20:1, 30:1, or 40:1), and the height of the first dispensing orifices is larger (in some embodiments, at least 2, 2.5, 3, 5, 10, or 20 times larger) than the height of the second dispensing orifices. In some embodiments, the first dispensing orifices, second dispensing orifices, and any other dispensing orifices are arranged one-by-one across the dispensing surface. That is, in these embodiments, in the width dimension of the die, the dispensing orifices are arranged singly or one-by-one regardless of the alignment of the dispensing orifices in these embodiments. For example, the dispensing orifices are not stacked in a group of two, three, or more in the height direction. In other embodiments, there may be more than one second dispensing orifices (e.g., two) stacked in the height direction and interspersed between the first and third dispensing orifices.

In some embodiments of the method according to the present disclosure, polymeric ribbons are dispensed from the first dispensing orifices at a first speed while simultaneously polymeric strands are dispensed from the second dispensing orifices at a second speed, and the second speed is at least 2 times the first speed. In some embodiments, the second speed is in a range from 2 to 6 or from 2 to 4 times the first speed. In some embodiments in which the extrusion die includes at least first and second cavities, the first cavity of the extrusion die is supplied with a first polymeric composition at a first pressure so as to dispense the polymeric ribbons from the array of first dispensing orifices at a first speed, the second cavity of the extrusion die is supplied with a second polymeric composition at a second pressure so as to dispense the polymeric strands from the array of second dispensing orifices at a second speed, wherein the second speed is at least 2 (in some embodiments, 2 to 6, or 2 to 4) times the first speed.

In other embodiments of the method according to the present disclosure, polymeric ribbons are dispensed from the first dispensing orifices at a first speed while simultaneously polymeric strands are dispensed from the second dispensing orifices at a second speed, and the first speed is at least 2 times the second speed. In some embodiments, the first speed is in a range from 2 to 6 or from 2 to 4 times the second speed. In some embodiments in which the extrusion die includes at least first and second cavities, the first cavity of the extrusion die is supplied with a first polymeric composition at a first pressure so as to dispense the polymeric ribbons from the array of first dispensing orifices at a first speed, the second cavity of the extrusion die is supplied with a second polymeric composition at a second pressure so as to dispense the polymeric strands from the array of second dispensing orifices at a second speed, wherein the first speed is at least 2 (in some embodiments, 2 to 6, or 2 to 4) times the second speed.

While either the polymeric ribbons or polymeric strands may be made to oscillate, typically larger bond areas are observed when the polymeric strands (which are shorter in some embodiments) are oscillating. Therefore, in the methods described below, the polymeric strand is described as the oscillating strand.

The size of the polymeric ribbons and polymeric strands can be adjusted, for example, by the composition of the extruded polymers, velocity of the extruded strands, and/or the orifice design (e.g., cross sectional area (e.g., height and/or width of the orifices)). As taught in Int. Pat. App. Pub. No. WO 2013/028654 (Ausen et al.), a dispensing surface with a first polymer orifice three times greater in area than the second polymer orifice may not generate a net with polymeric ribbons with a height greater than the polymeric stands depending on the identity of the polymeric compositions and the pressure within the cavities. In the embodiments of the extrusion die and method according to the present disclosure, the height-to-width aspect ratio of the orifices is at least 5:1.

Conveniently, the extrusion die useful for practicing the present disclosure may be comprised of a plurality of shims. The plurality of shims together define the at least one cavity, the dispensing surface, and the fluid passageways between the at least one cavity and the dispensing surface. In some embodiments, the plurality of shims comprises a plurality of sequences of shims wherein each sequence comprises at least one first shim that provides a first fluid passageway between the at least one cavity and at least one of the first dispensing orifices, and at least one second shim that provides a second fluid passageway between the at least one cavity and at least one of the second dispensing orifices. In some embodiments, the shims together define a first cavity and a second cavity, the extrusion die having a plurality of first dispensing orifices in fluid communication with the first cavity and having a plurality of second dispensing orifices in fluid communication with the second cavity. In some embodiments (e.g., for embodiments of making a polymeric netting as depicted in FIG. 6), the extrusion die has a plurality of third dispensing orifices in fluid communication with the first cavity or a third cavity (in some embodiments, the third cavity).

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used.

Figure 9:
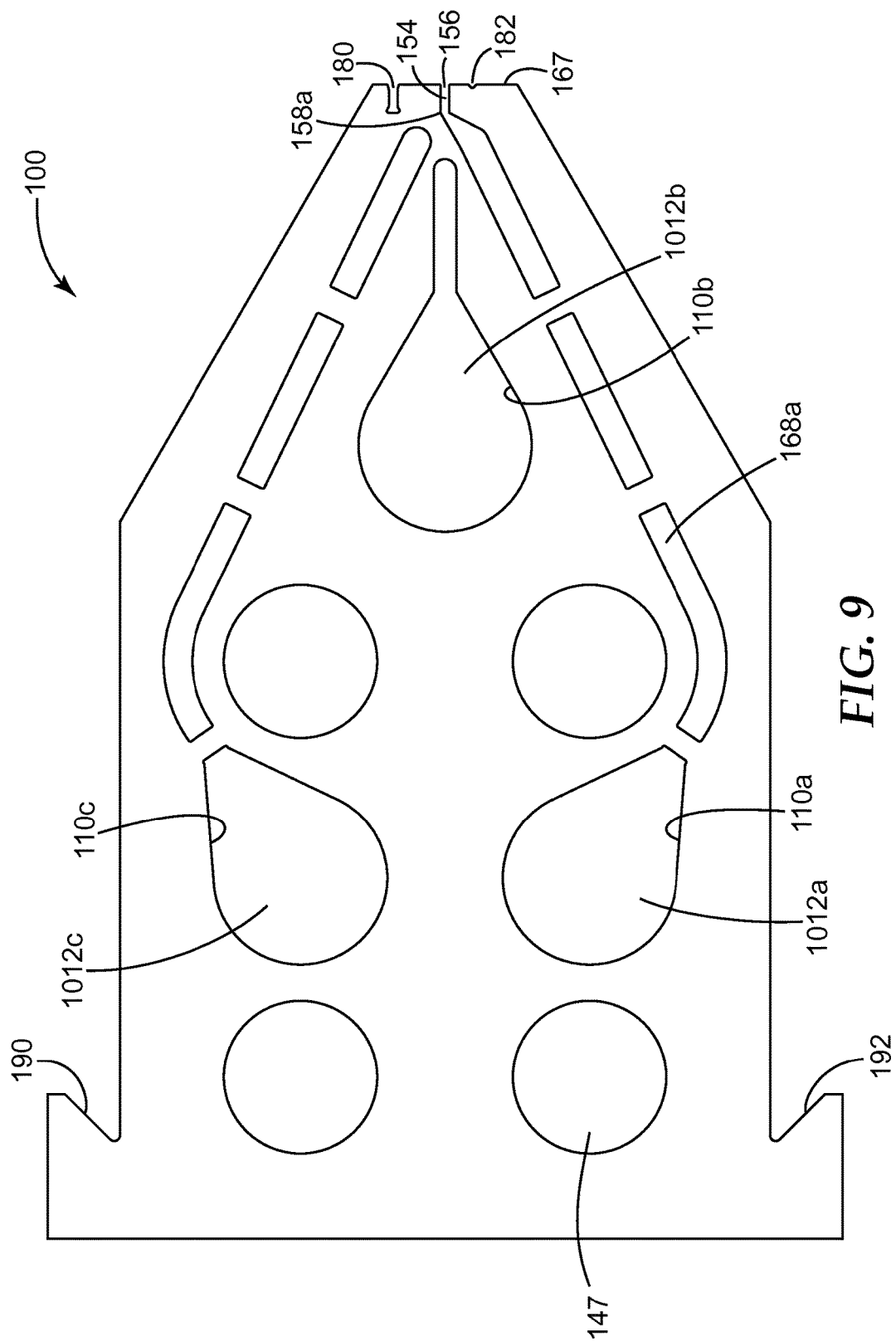
FIG. 9 is a plan view of an embodiment of a shim suitable for a sequence of shims capable of forming a polymeric netting as shown, for example, in FIGS. 1 to 4.
Figure 10:
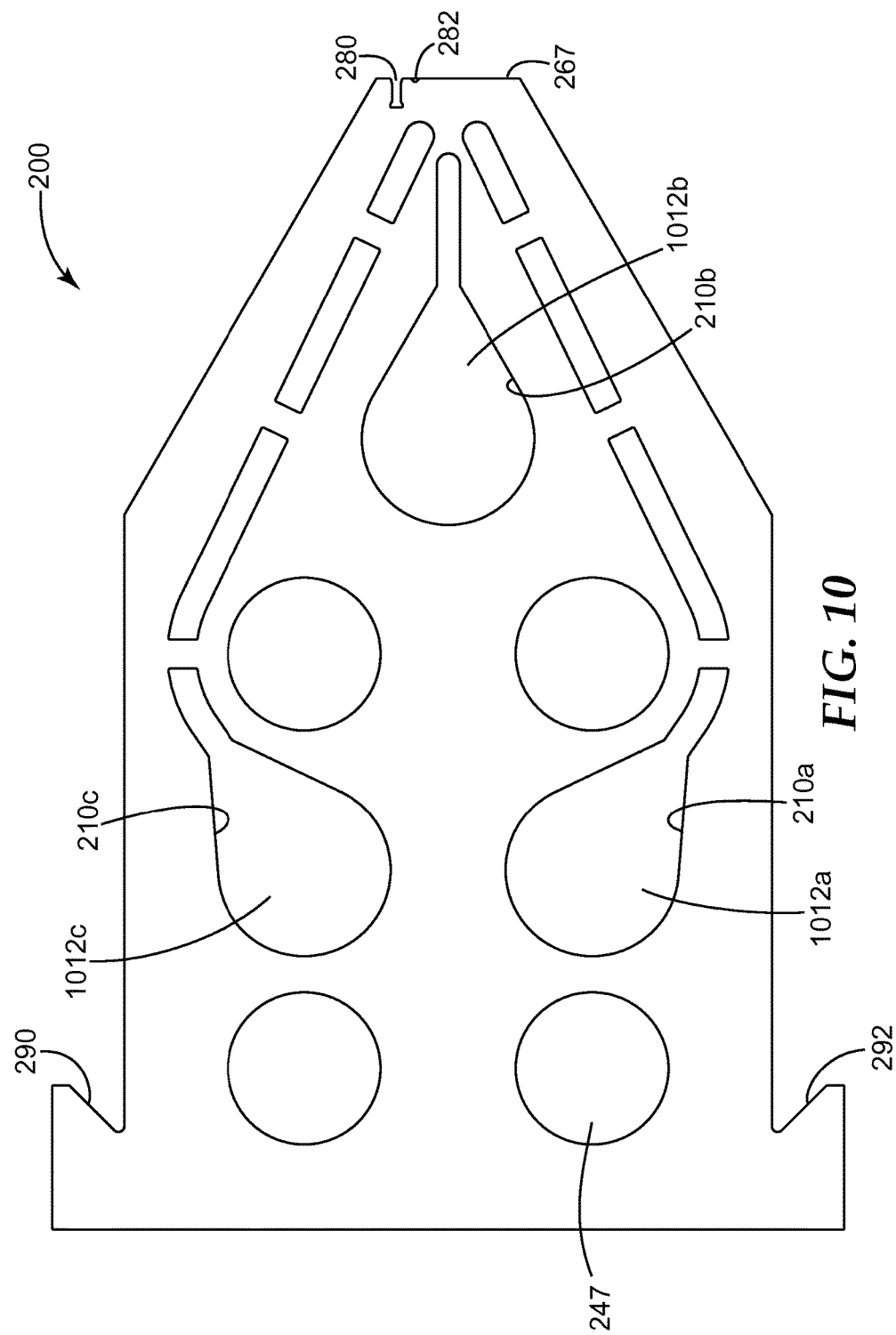
FIG. 10 is a plan view of another embodiment of a shim suitable for a sequence of shims capable of forming a polymeric netting as shown, for example, in FIGS. 1 to 7.
Figure 11:
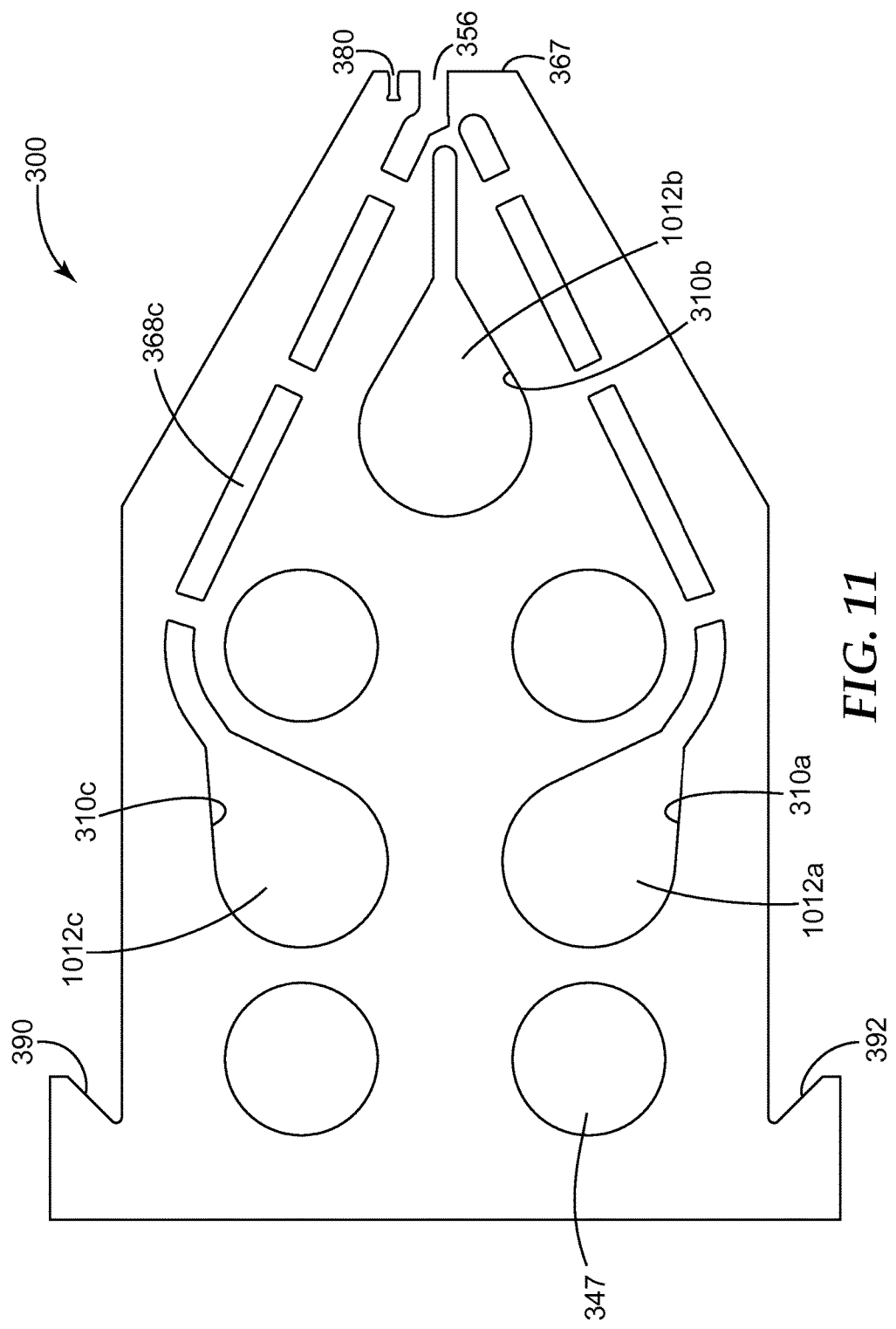
FIG. 11 is a plan view of another embodiment of a shim suitable for a sequence of shims capable of forming a polymeric netting as shown, for example, in FIGS. 1 to 4.

A plurality of shims that is useful for providing a polymeric netting according to the present disclosure is shown in FIGS. 9 to 11, 12A, and 12B. Referring now to FIG. 9, a plan view of shim 100 is illustrated. Shim 100 is useful in a sequence of shims 1000 shown in FIGS. 12A and 12B. Other shims useful in this sequence are shown in FIGS. 10 and 11. Shim 100 has first aperture 110a, second aperture 110b, and third aperture 110c. When shim sequence 1000 is assembled, first apertures 110a, 210a, and 310a in shims 100, 200, and 300 together define at least a portion of first cavity 1012a. Similarly, second apertures 110b, 210b, and 310b in shims 100, 200, and 300 together define at least a portion of second cavity 1012b, and third apertures 110c, 210c, and 310c in shims 100, 200, and 300 together define at least a portion of third cavity 1012c. Shim 100 has several holes 147 to allow the passage of, for example, bolts to hold shim 100 and others to be described below into an assembly. Shim 100 has dispensing surface 167, and in this particular embodiment, dispensing surface 167 has indexing groove 180, which is useful for conveniently aligning the shims with an appropriately shaped key during assembly of the shims into a die, and identification notch 182 to help verify that the die has been assembled in the desired manner. Shim 100 has shoulders 190 and 192, which can be conveniently engaged by compression blocks 2204 described below in connection with FIGS. 22 and 23. Shim 100 has dispensing opening 156 but no integral connection between dispensing opening 156 and any of apertures 110a, 110b, or 110c. There is no connection, for example, from first aperture 110a to dispensing opening 156, via, for example, passageway 168a, but the flow has a route 1068a to the dispensing surface when shim 100 is assembled with shims 200 and 300 as illustrated in assembly drawing 1000 (see FIG. 12A). The dimensions of duct 154, and especially dispensing opening 156 at its end, can be designed to provide the dimensions desired in the polymer strands extruded from them. The dimensions of dispensing opening 156 and the dimensions of passageway 158a also influence the desired strand speed.

Referring now to FIG. 10, a plan view of shim 200 is illustrated. Shim 200 has first aperture 210a, second aperture 210b, and third aperture 210c. When shim 200 is assembled with others as shown in FIG. 12A, aperture 210a helps define first cavity 1012a, aperture 210b helps define second cavity 1012b, and aperture 210c helps define third cavity 1012c. Shim 200 has several holes 247 to allow the passage of, for example, bolts to hold shim 200 and others to be described below into an assembly. Shim 200 has dispensing surface 267, and in this particular embodiment, dispensing surface 267 has indexing groove 280 and identification notch 282. Shim 200 also has shoulders 290 and 292. There is no passage from any of the cavities to dispensing surface 267 since this shim creates a non-dispensing area along the width of the die. In use, shim(s) 200 separates shims 100 producing polymeric strands 3 from shims 300 producing polymeric ribbons 1.

Referring now to FIG. 11, a plan view of shim 300 is illustrated. Shim 300 has first aperture 310a, second aperture 310b, and third aperture 310c. When shim 300 is assembled with others as shown in FIG. 12A, aperture 310a helps define first cavity 1012a, aperture 310b helps define second cavity 1012b, and aperture 310c helps define third cavity 1012c. Shim 300 has several holes 347 to allow the passage of, for example, bolts to hold shim 300 and others to be described below into an assembly. Shim 300 has dispensing surface 367, and in this particular embodiment, dispensing surface 367 has indexing groove 380. Shim 300 also has shoulders 390 and 392. Shim 300 has dispensing opening 356 but no integral connection between dispensing opening 356 and any of and any of apertures 310a, 310b, or 310c. There is no connection, for example, from aperture 310c to dispensing opening 356, via, for example, passageway 368c, but the flow has a route 1068c to the dispensing surface when shim 300 is assembled with shims 100 and 200 as illustrated in sequence 1000 (see FIG. 12A). Comparing FIG. 11 with FIG. 9, one observes that dispensing opening 356 is bigger than dispensing opening 156. In some embodiments, dispensing opening 356 is at least twice the size of dispensing opening 156. In some embodiments, dispensing opening 356 is at least 2.5, 3, 5, 10, or 20 times bigger than dispensing opening 156.

FIGS. 12A and 12B illustrate a perspective assembly drawing of a sequence of shims, collectively 1000, employing the shims of FIGS. 9 to 11 so as to produce a polymeric netting 10 as shown in FIG. 1. Proceeding left to right, sequence 1000 includes two shims 100 that can extrude polymeric strands 3, two shims 200, two shims 300 that can extrude polymeric ribbons 1, and two shims 200. The first dispensing orifices 1001 each have an aspect ratio defined by height h1001 and width w1001. The height-to-width aspect ratio is at least three to one (in some embodiments, at least 5:1, 8:1, 10:1, 11:1, 15:1, 20:1, 30:1, or 40:1). First dispensing orifices 1001 and second dispensing orifices 1003 are separated by two instances of shims 200. The separation causes the separation of polymeric ribbons 1 from polymeric strands 3 in the polymeric netting 10. The height h1001 of the first dispensing orifices is greater than the height h1003 of the second dispensing orifices. In some embodiments, the height of the first dispensing orifices h1001 is at least 2, 2.5, 3, 5, 10, or 20 times larger than the height of the second dispensing orifices h1003.

Modifications of the sequence 1000 shown in FIGS. 12A and 12B can be used in combination with sequence 1000, for example, to make the polymeric nettings 20, 40, and 50, as shown in FIGS. 2, 3, and 4. To make polymeric netting 40 shown in FIG. 3, sequence 1000 can be alternated with another sequence similar to 1000 in which shim 300 has a somewhat smaller opening 356, for example. While shim 300 can be useful for extruding polymeric ribbons 31, a shim with a somewhat smaller opening 356 can be useful for extruding polymeric ribbons 41. In some embodiments, sequence 1000 can be alternated with another sequence similar to 1000 in which shim 300 is replaced by shim 100, and the flow rate of the polymer coming from cavity 1012c can be adjusted so that this strand does not oscillate. This sequence can make a polymeric netting in which a polymeric strand 33 oscillates between bonding to the polymeric ribbon 31 and bonding to a non-oscillating strand that does not necessarily have a height-to-width aspect ratio of at least three to one. To make polymeric netting 20 shown in FIG. 2, sequence 1000 can be combined with similar sequences in which shim 300 is modified to have progressively smaller openings 356, for example, to provide a plurality of shim sequences. While shim 300 can be useful for extruding polymeric ribbons 11, a shim with a somewhat smaller opening 356 can be useful for extruding polymeric ribbons 21. Such a plurality of shim sequences can be repeated in the opposite order to provide a polymeric netting 50 as shown in FIG. 4.

In a method using the extrusion die shown in FIGS. 12A and 12B to make a polymeric netting as shown in FIG. 1, for example, polymer from first cavity 1012a emerges as polymeric strands 3 from second dispensing orifices 1003, and polymer from third cavity 1012c emerges as polymeric ribbons 1 from first dispensing orifices 1001. The dimensions of the fluid passageways and the pressures in cavities 1012a and 1012c are typically selected so that the speed of oscillating polymeric strands 3 is between about 2 and 6 (in some embodiments, 2 and 4) times greater than the speed of polymeric ribbons 1. To make a polymeric netting as shown in FIG. 1, second cavity 1012b is unused, but this cavity could be used to introduce another polymeric composition in polymeric netting 10.

A polymeric netting such as that indicated by polymeric netting 60 in FIG. 5 can be made, for example, using a shim sequence shown in FIGS. 15A and 15B. FIGS. 15A and 15B show a perspective assembly of a sequence of shims including shims 200 as described above in connection with FIG. 10 and shims 400 and 500, described below in connection with FIGS. 13 and 14, respectively.

Figure 13:
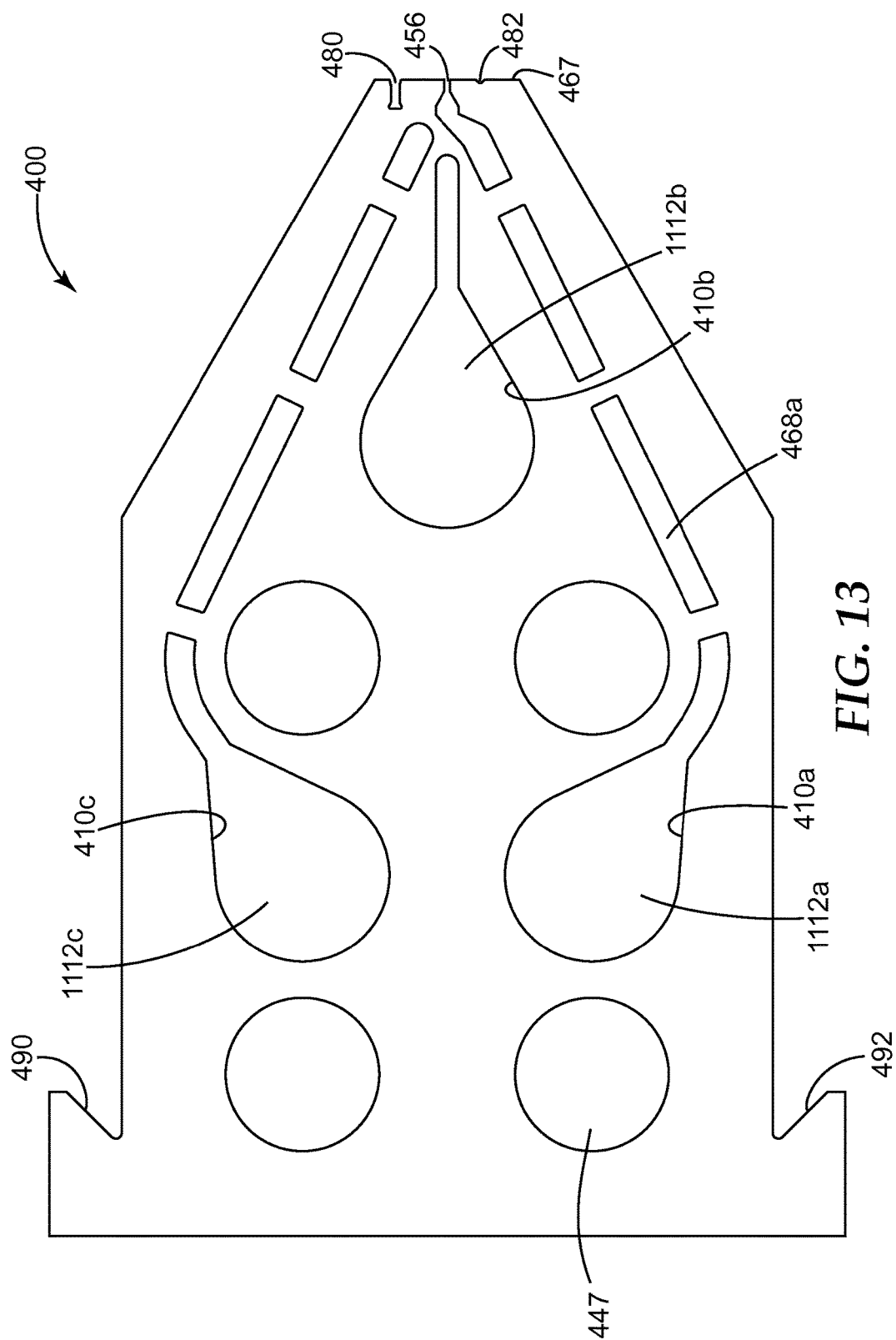
FIG. 13 is a plan view of an embodiment of a shim suitable for a sequence of shims capable of forming a polymeric netting as shown, for example, in FIG. 5.

Referring now to FIG. 13, a plan view of shim 400 is illustrated. Shim 400 has first aperture 410a, second aperture 410b, and third aperture 410c. When shim 400 is assembled with others as shown in FIG. 15, aperture 410a helps define first cavity 1112a, aperture 410b helps define second cavity 1112b, and aperture 410c helps define third cavity 1112c. Shim 400 has several holes 447 to allow the passage of, for example, bolts to hold shim 400 and others to be described below into an assembly. Shim 400 has dispensing surface 467, and in this particular embodiment, dispensing surface 467 has indexing groove 480 and identification notch 482. Shim 400 also has shoulders 490 and 492. Shim 400 has dispensing opening 456 but no integral connection between dispensing opening 456 and any of apertures 410a, 410b, or 410c. There is no connection, for example, from aperture 410c to dispensing opening 456, via, for example, passageway 468a, but the flow has a route 1168a to the dispensing surface in the perpendicular-to-the-plane-of-the-drawing dimension when shim 400 is assembled with shims 200 and 500 as illustrated in sequence 1100 (see FIG. 15A). The dimensions of 456 can be designed to provide the dimensions desired in the polymer strands extruded therefrom. The dimensions of dispensing opening 456 and the dimensions of passageway leading to it also influence the strand speed.

Figure 14:
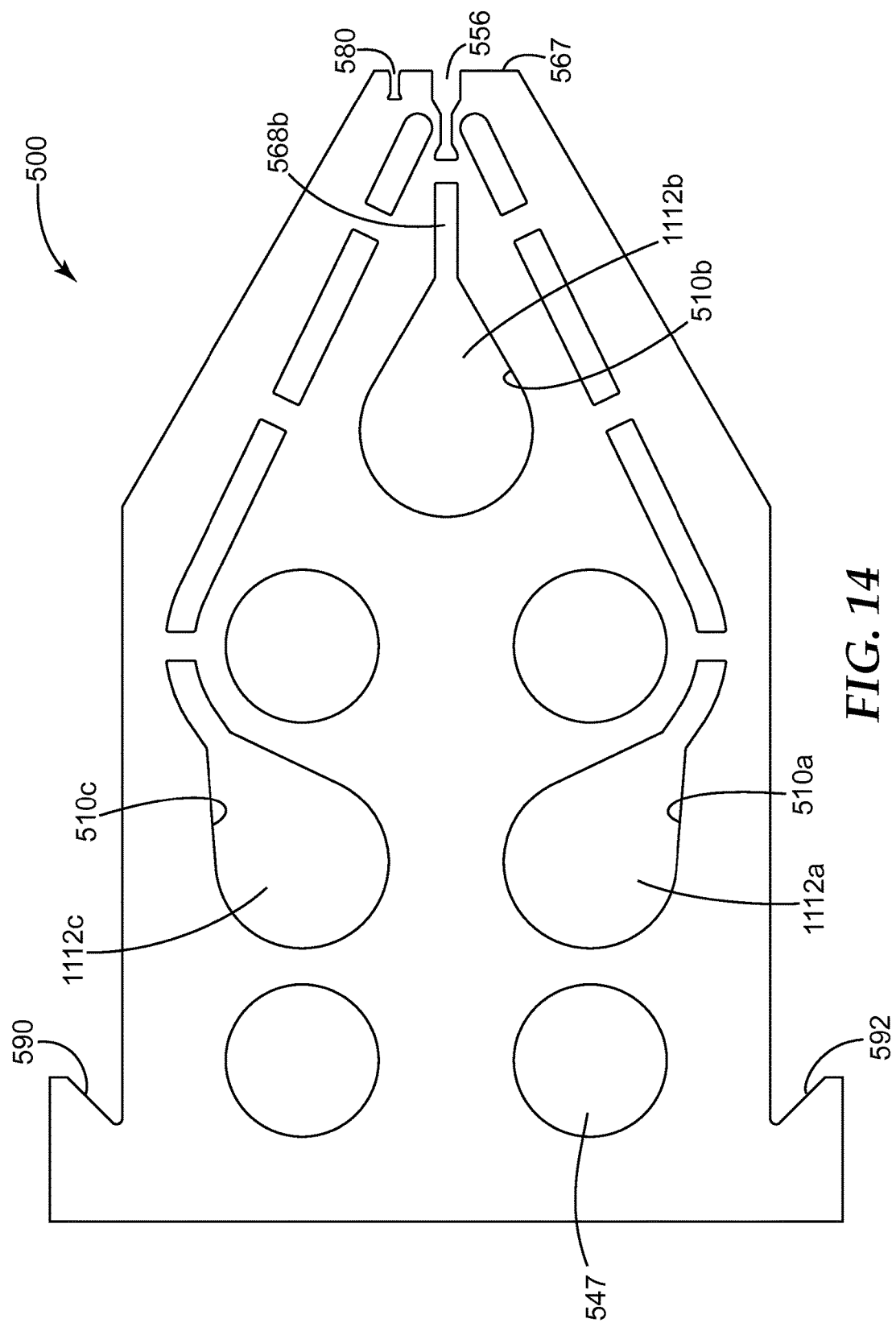
FIG. 14 is a plan view of another embodiment of a shim suitable for a sequence of shims capable of forming a polymeric netting as shown, for example, in FIG. 5.

Referring now to FIG. 14, a plan view of shim 500 is illustrated. Shim 500 has first aperture 510a, second aperture 510b, and third aperture 510c. When shim 500 is assembled with others as shown in FIGS. 15A and 15B, aperture 510a helps define first cavity 1112a, aperture 510b helps define second cavity 1112b, and aperture 510c helps define third cavity 1112c. Shim 500 has several holes 547 to allow the passage of, for example, bolts to hold shim 500 and others to be described below into an assembly. Shim 500 has dispensing surface 567, and in this particular embodiment, dispensing surface 567 has indexing groove 580. Shim 500 also has shoulders 590 and 592. Shim 500 has dispensing opening 556 but has no integral connection between dispensing opening 556 and any of apertures 510a, 510b, or 510c. There is no connection, for example, from aperture 510b to dispensing opening 556, via, for example, passageway 568b, but the flow has a route 1168b to the dispensing surface when shim 500 is assembled with shims 200 and 400 as illustrated in assembly drawing (see FIG. 15A).

FIGS. 15A and 15B illustrate a perspective assembly drawing of a sequence of shims, collectively 1100, employing the shims of FIGS. 10, 13, and 14 so as to produce a polymeric netting 60 as shown in FIG. 5. Proceeding left to right, sequence 1100 includes four shims 400 that can extrude polymeric strands 63, four shims 200, two shims 500 that can extrude polymeric ribbons 61, and four shims 200. Dispensing orifices 1101 and 1103 are separated by four instances of shims 200. The separation causes the separation of polymeric ribbons 61 from polymeric strands 63 in the polymeric netting 60. The sequence of shims 1100 is similar to that of 1000 except that the dispensing orifices 1101 and 1103 are vertically aligned so that the second dispensing orifices are located in the cross-sectional middle of the dispensing surface 1167. As in the embodiment shown in FIG. 12B, the first dispensing orifices 1101 each have an aspect ratio defined by height h1101 and width w1101 of at least three to one (in some embodiments, at least 5:1, 8:1, 10:1, 11:1, 15:1, 20:1, 30:1, or 40:1), and the height h1101 of the first dispensing orifices is at least 2, 2.5, 3, 5, 10, or 20 times larger than the height h1103 of the second dispensing orifices.

In a method using the extrusion die shown in FIGS. 15A and 15B to make a polymeric netting as shown in FIG. 5, for example, polymer from first cavity 1112a emerges as polymeric strands 63 from second dispensing orifices 1103, and polymer from second cavity 1112b emerges as polymeric ribbons 61 from first dispensing orifices 1101. The dimensions of the fluid passageways and the pressures in cavities 1112a and 1112b are typically selected so that the speed of oscillating polymeric strands 63 is between about 2 and 6 (in some embodiments, 2 and 4) times greater than the speed of polymeric ribbons 61. To make a polymeric netting as shown in FIG. 5, third cavity 1112c is unused, but this cavity could be used to introduce another polymeric composition in polymeric netting 60.

A polymeric netting such as that indicated by polymeric netting 70 in FIG. 6 can be made, for example, using a shim sequence shown in FIGS. 18A and 18B. FIGS. 18A and 18B show a perspective assembly of a sequence of shims including shims 200 and 300 as described above in connection with FIGS. 10 and 11, respectively, and shims 600 and 700, described below.

Figure 16:
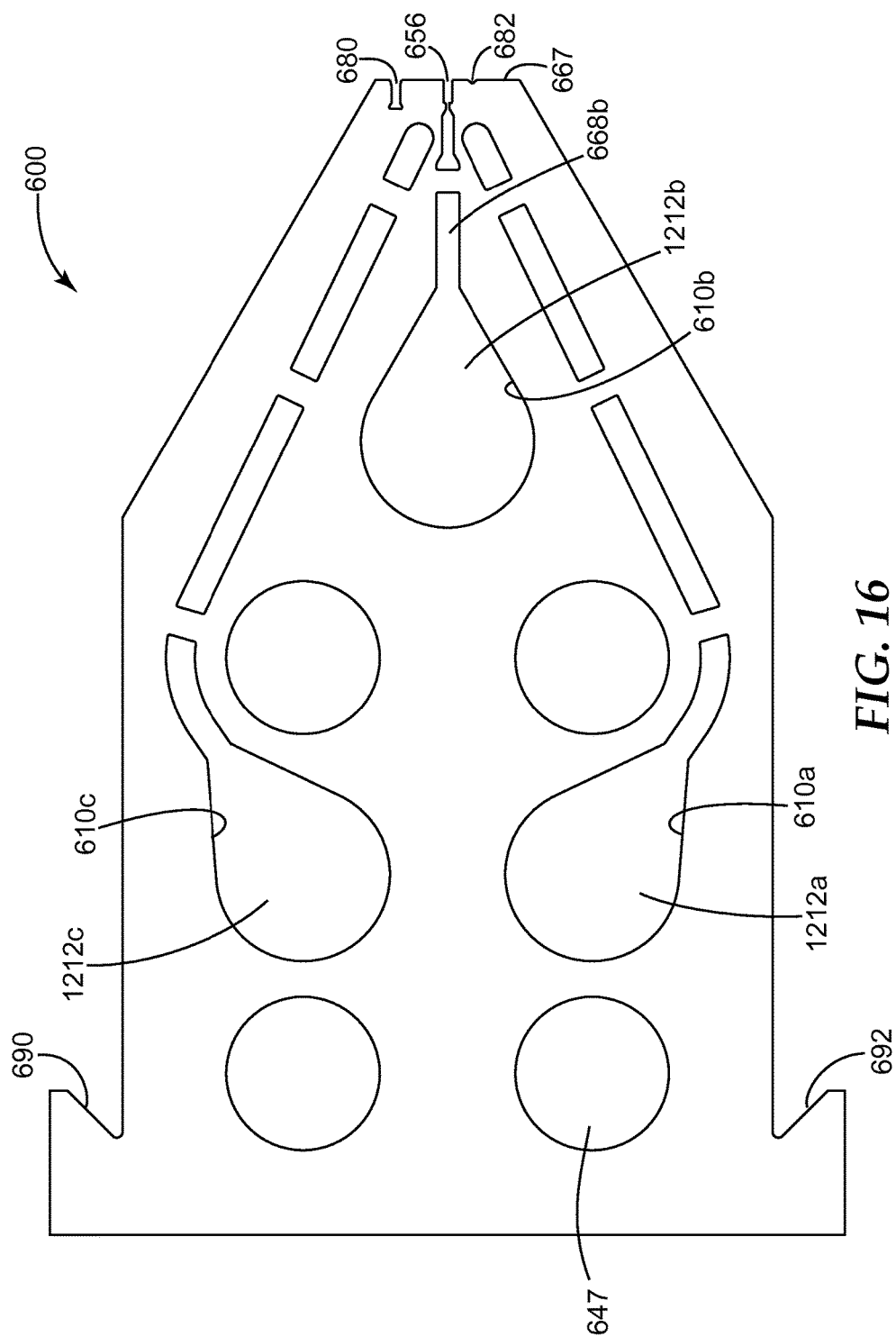
FIG. 16 is a plan view of an embodiment of a shim suitable for a sequence of shims capable of forming a polymeric netting as shown, for example, in FIG. 6.

Referring now to FIG. 16, a plan view of shim 600 is illustrated. Shim 600 has first aperture 610a, second aperture 610b, and third aperture 610c. When shim 600 is assembled with others as shown in FIG. 18A, aperture 610a helps define first cavity 1212a, aperture 610b helps define second cavity 1212b, and aperture 610c helps define third cavity 1212c. Shim 600 has several holes 647 to allow the passage of, for example, bolts to hold shim 600 and others to be described below into an assembly. Shim 600 has dispensing surface 667, and in this particular embodiment, dispensing surface 667 has indexing groove 680 and identification notch 682. Shim 600 also has shoulders 690 and 692. Shim 600 has dispensing opening 656 but has no integral connection between dispensing opening 656 and any of apertures 610a, 610b, or 610c. There is no connection, for example, from aperture 610b to dispensing opening 656, via, for example, passageway 668b, but the flow has a route 1268b to the dispensing surface when shim 600 is assembled with shims 200, 300, and 700 as illustrated in sequence 1200 (see FIG. 18A). The dimensions of 656 can be designed to provide the dimensions desired in the polymer strands extruded therefrom. The dimensions of dispensing opening 656 and the dimensions of passageway leading to it also influence the strand speed.

Figure 17:
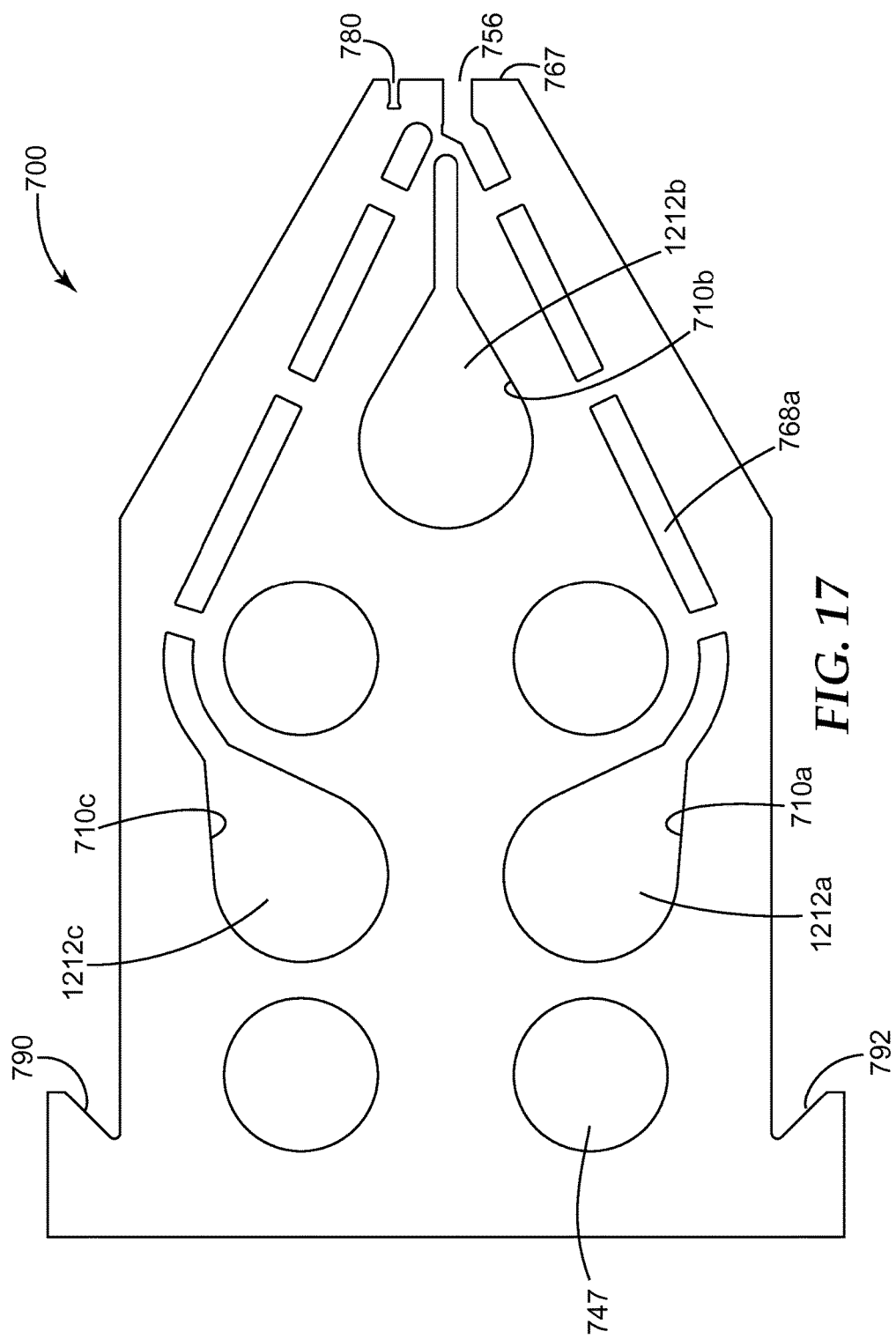
FIG. 17 is a plan view of another embodiment of a shim suitable for a sequence of shims capable of forming a polymeric netting as shown, for example, in FIG. 6.

Referring now to FIG. 17, a plan view of shim 700 is illustrated. Shim 700 is similar to shim 300, shown in FIG. 11. Shim 700 has first aperture 710a, second aperture 710b, and third aperture 710c. When shim 700 is assembled with others as shown in FIGS. 18A and 18B, aperture 710a helps define first cavity 1212a, aperture 710b helps define second cavity 1212b, and aperture 710c helps define third cavity 1212c. Shim 700 has several holes 747 to allow the passage of, for example, bolts to hold shim 700 and others to be described below into an assembly. Shim 700 has dispensing surface 767, and in this particular embodiment, dispensing surface 767 has indexing groove 780. Shim 700 also has shoulders 790 and 792. Shim 700 has dispensing opening 756 but has no integral connection between dispensing opening 756 and any of apertures 710a, 710b, or 710c. There is no connection, for example, from aperture 710a to dispensing opening 756, via, for example, passageway 768a, but the flow has a route 1268a to the dispensing surface when shim 700 is assembled with shims 200, 300, and 600 as illustrated in assembly drawing (see FIG. 18A). As in FIG. 11, dispensing opening 756 is bigger than dispensing opening 656. In some embodiments, dispensing opening 756 is at least twice the size of dispensing opening 656. In some embodiments, dispensing opening 756 is at least 2.5, 3, 5, 10, or 20 times bigger than dispensing opening 656.

FIGS. 18A and 18B illustrate a perspective assembly drawing of a sequence of shims, collectively 1200, employing the shims of FIGS. 10, 11, 16, and 17 so as to produce a polymeric netting 70 as shown in FIG. 6. Proceeding left to right, the sequence 1200 comprises two shims 700 that can extrude polymeric ribbons 81, two shims 200, two shims 600 that can extrude polymeric strands 73, two shims 200, two shims 300 that can extrude polymeric ribbons 71, two shims 200, two shims 600 that can extrude polymeric strands 73, and two shims 200. The first dispensing orifices 1201 each have a height-to-width aspect ratio of at least three to one (in some embodiments, at least 5:1, 8:1, 10:1, 11:1, 15:1, 20:1, 30:1, or 40:1). Dispensing orifices 1201 and 1203 are separated by shims 200, which causes the separation of polymeric ribbons 71 and 81 from polymeric strands 73 in the polymeric netting 70. As in the embodiment shown in FIG. 12B, the height h1201 of the first dispensing orifices is at least 2, 2.5, 3, 5, 10, or 20 times larger than the height h1203 of the second dispensing orifices. In the method disclosed herein polymer from first cavity 1212a emerges as polymeric ribbons 81 from first dispensing orifices 1201, polymer from second cavity 1212b emerges as oscillating strands 73 from second dispensing orifices 1203, and polymer from third cavity 1212c emerges as polymeric ribbons 71 from first dispensing orifices 1201. The dimensions of the fluid passageways and the pressures in the cavities are typically selected so that the speed of oscillating polymeric strands 73 is between about 2 and 6 (in some embodiments, 2 and 4) times greater than the speed of polymeric ribbons 71 and 81.

In the embodiment illustrated in FIGS. 18A and 18B, the second dispensing orifices 1203 are positioned closer to the top edges than the bottom edges of some of the first dispensing orifices 1201, and the second dispensing orifices 1203 are positioned closer to the bottom edges than the top edges of some of the first dispensing orifices 1201. In other embodiments, it is possible to make the top edges of some of the first dispensing orifices substantially aligned with the top edges of the second dispensing orifices and the bottom edges of some of the first dispensing openings substantially aligned with the bottom edges of the second dispensing orifices. However, it can be useful to have the second dispensing openings positioned somewhat above the bottom and below the top of the first dispensing openings, because the oscillating strand typically has more die swell, and a larger bond area can be achieved.

A polymeric netting such as that indicated by polymeric netting 80 in FIG. 7 can be made, for example, using a shim sequence shown in FIGS. 21A and 21B. FIGS. 21A and 21B show a perspective assembly of a sequence of shims including shims 200 and 500 as described above in connection with FIGS. 10 and 14, respectively, and shims 800 and 900, described below.

Figure 19:
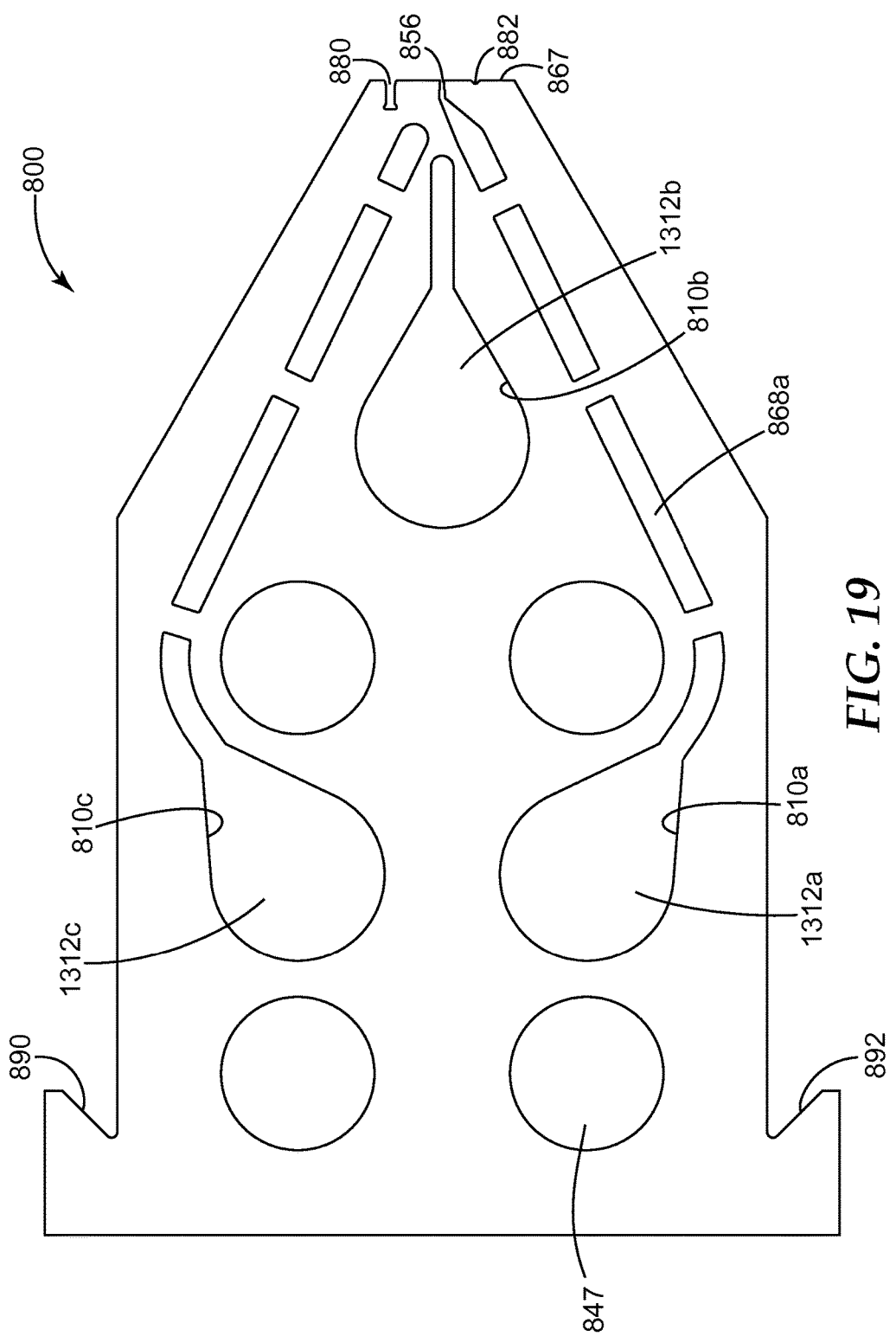
FIG. 19 is a plan view of an embodiment of a shim suitable for a sequence of shims capable of forming a polymeric netting as shown, for example, in FIG. 7.

Referring now to FIG. 19, a plan view of shim 800 is illustrated. Shim 800 has first aperture 810a, second aperture 810b, and third aperture 810c. When shim 800 is assembled with others as shown in FIGS. 21A and 21B, aperture 810*a* helps define first cavity 1312*a*, aperture 810*b* helps define second cavity 1312*b*, and aperture 810*c* helps define third cavity 1312*c*. Shim 800 has several holes 847 to allow the passage of, for example, bolts to hold shim 800 and others to be described below into an assembly. Shim 800 has dispensing surface 867, and in this particular embodiment, dispensing surface 867 has indexing groove 880 and identification notch 882. Shim 800 also has shoulders 890 and 892. Shim 800 has dispensing opening 856 but has no integral connection between dispensing opening 856 and any of apertures 810*a*, 810*b*, or 810*c*. There is no connection, for example, from aperture 810*a* to dispensing opening 856, via, for example, passageway 868*a*, but the flow has a route 1368*a* to the dispensing surface when shim 800 is assembled with shims 200, 500, and 900 as illustrated in sequence 1300 (see FIG. 21A).

Figure 20:
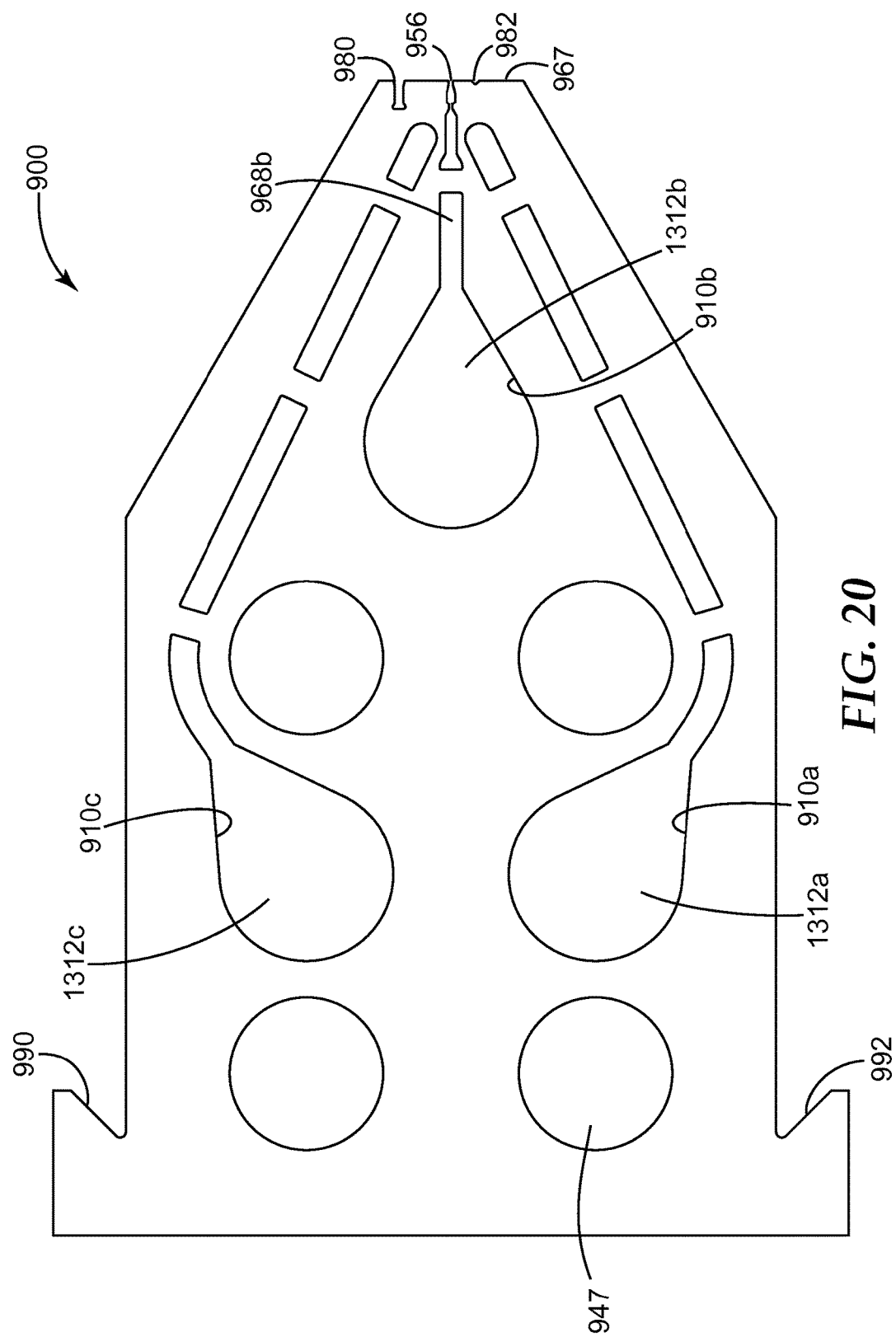
FIG. 20 is a plan view of another embodiment of a shim suitable for a sequence of shims capable of forming a polymeric netting as shown, for example, in FIG. 7.
Figure 21:
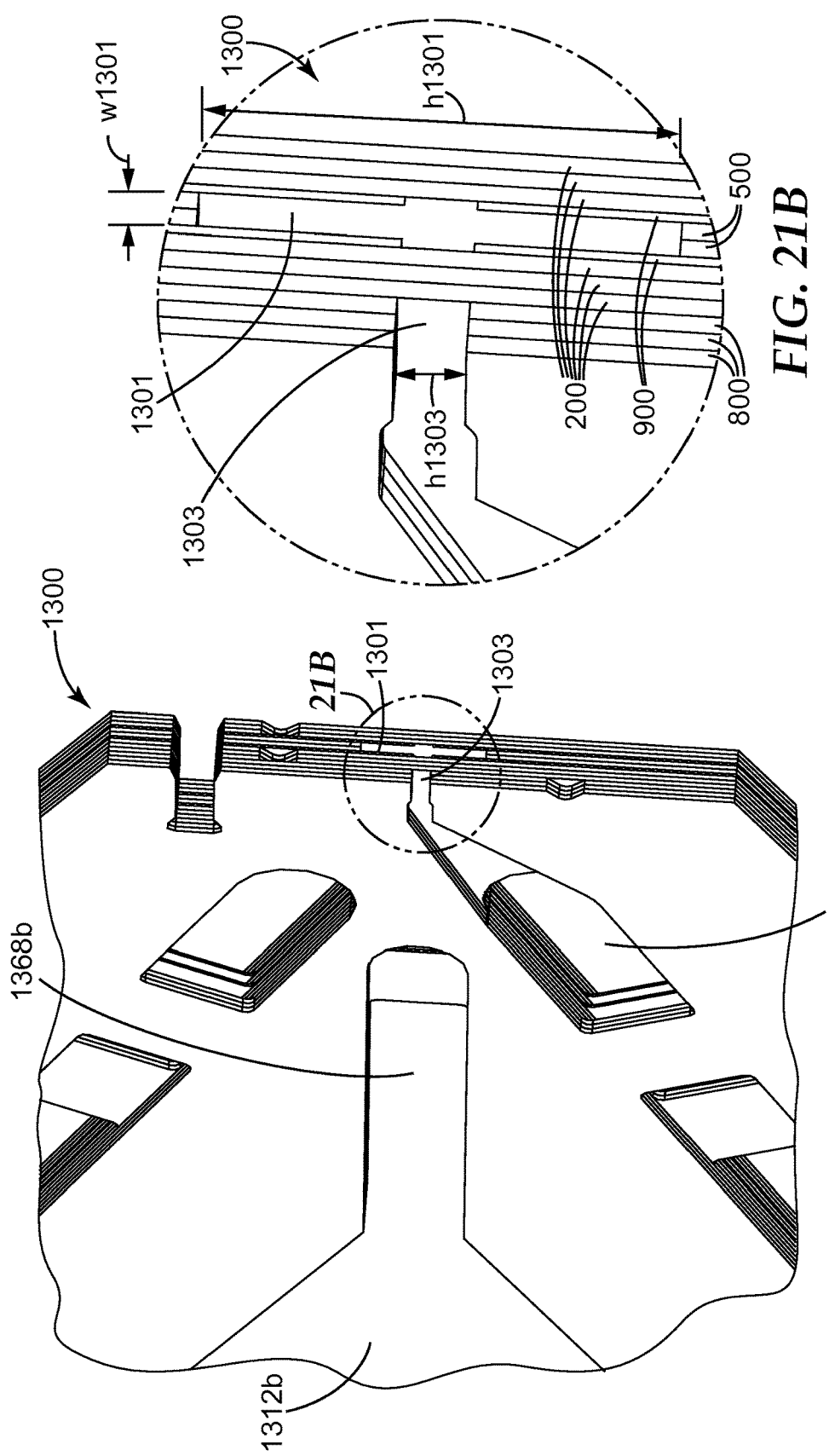
FIG. 21A is a perspective assembly drawing of a sequence of shims employing the shims of FIGS. 10, 14, 19, and 20 configured to form a portion of the polymeric netting as shown in FIG. 7.
FIG. 21B is an expanded view of the section referenced as "21B" in FIG. 21A.

Referring now to FIG. 20, a plan view of shim 900 is illustrated. Shim 900 has first aperture 910*a*, second aperture 910*b*, and third aperture 910*c*. When shim 900 is assembled with others as shown in FIGS. 21A and 21B, aperture 910*a* helps define first cavity 1312*a*, aperture 910*b* helps define second cavity 1312*b*, and aperture 910*c* helps define third cavity 1312*c*. Shim 900 has several holes 947 to allow the passage of, for example, bolts to hold shim 900 and others to be described below into an assembly. Shim 900 has dispensing surface 967, and in this particular embodiment, dispensing surface 967 has indexing groove 980 and identification notch 982. Shim 900 also has shoulders 990 and 992. Shim 900 has dispensing opening 956 but no integral connection between dispensing opening 956 and any of apertures 910*a*, 910*b*, or 910*c*. There is no connection, for example, from aperture 910*b* to dispensing opening 956, via, for example, passageway 968*b*, but the flow has a route 1368*b* to the dispensing surface when shim 900 is assembled with shims 200, 500, and 800 as illustrated in assembly drawing (see FIG. 21A). The dimensions of 956 can be designed to provide the dimensions desired in the polymer strands extruded therefrom. FIGS. 21A and 21B illustrate a perspective assembly drawing of a sequence of shims, collectively 1300, employing the shims of FIGS. 10, 14, 19, and 20 so as to produce a polymeric netting 80 as shown in FIG. 7. Proceeding left to right, the sequence 1300 comprises three shims 800 that can extrude polymeric strands 63*a*, three shims 200, one shim 900 that can extrude a portion of the polymeric ribbons 61*a* around center line 64*a*, two shims 500 that can extrude polymeric ribbons 61*a*, one more shim 900 that can extrude a portion of the polymeric ribbons 61*a* around center line 64*a*, and three shims 200. Shim 900 and shim 500 both extrude polymer from cavity 1312*b* although the dispensing opening 956 is much smaller than dispensing opening 556. Openings 956 and 556 are vertically centered so that more polymer is extruded from cavity 1312*b* to the central portion of polymeric ribbon 61*a*. Dispensing orifices 1301 and 1303 are separated by shims 200, which causes the separation of polymeric ribbons 61*a* from polymeric strands 63*a* in the polymeric netting 80. The first dispensing orifices 1301 each have a height $h1301$ to width $w1301$ aspect ratio of at least three to one (in some embodiments, at least 5:1, 8:1, 10:1, 11:1, 15:1, 20:1, 30:1, or 40:1), when width $w1301$ is measured at its narrowest point. As in the embodiment shown in FIG. 12B, the height $h1301$ of the first dispensing orifices is larger (in some embodiments, at least 2, 2.5, 3, 5, 10, or 20 times larger) than the height $h1303$ of the second dispensing orifices.

In a method using the extrusion die shown in FIGS. 21A and 21B to make a polymeric netting as shown in FIG. 7, for example, polymer from first cavity 1312*a* emerges as polymeric strands 63*a* from second dispensing orifices 1303, and polymer from second cavity 1312*b* emerges as polymeric ribbons 61*a* from first dispensing orifices 1301. The dimensions of the fluid passageways and the pressures in cavities 1312*a* and 1312*b* are typically selected so that the speed of oscillating polymeric strands 63*a* is between about 2 and 6 (in some embodiments, 2 and 4) times greater than the speed of polymeric ribbons 61*a*. To make a polymeric netting as shown in FIG. 7, third cavity 1312*c* is unused, but this cavity could be used to introduce another polymeric composition in polymeric netting 80.

A modification of the shim sequence shown in FIGS. 21A and 21B may be useful for providing polymeric nettings that are similar to those shown in FIG. 7 but have polymeric ribbons in which more polymer is extruded from cavity 1312*b* to at least one of the bottom edges 66 or top edges 68 instead of at the central portion 64*a*.

Figure 22:
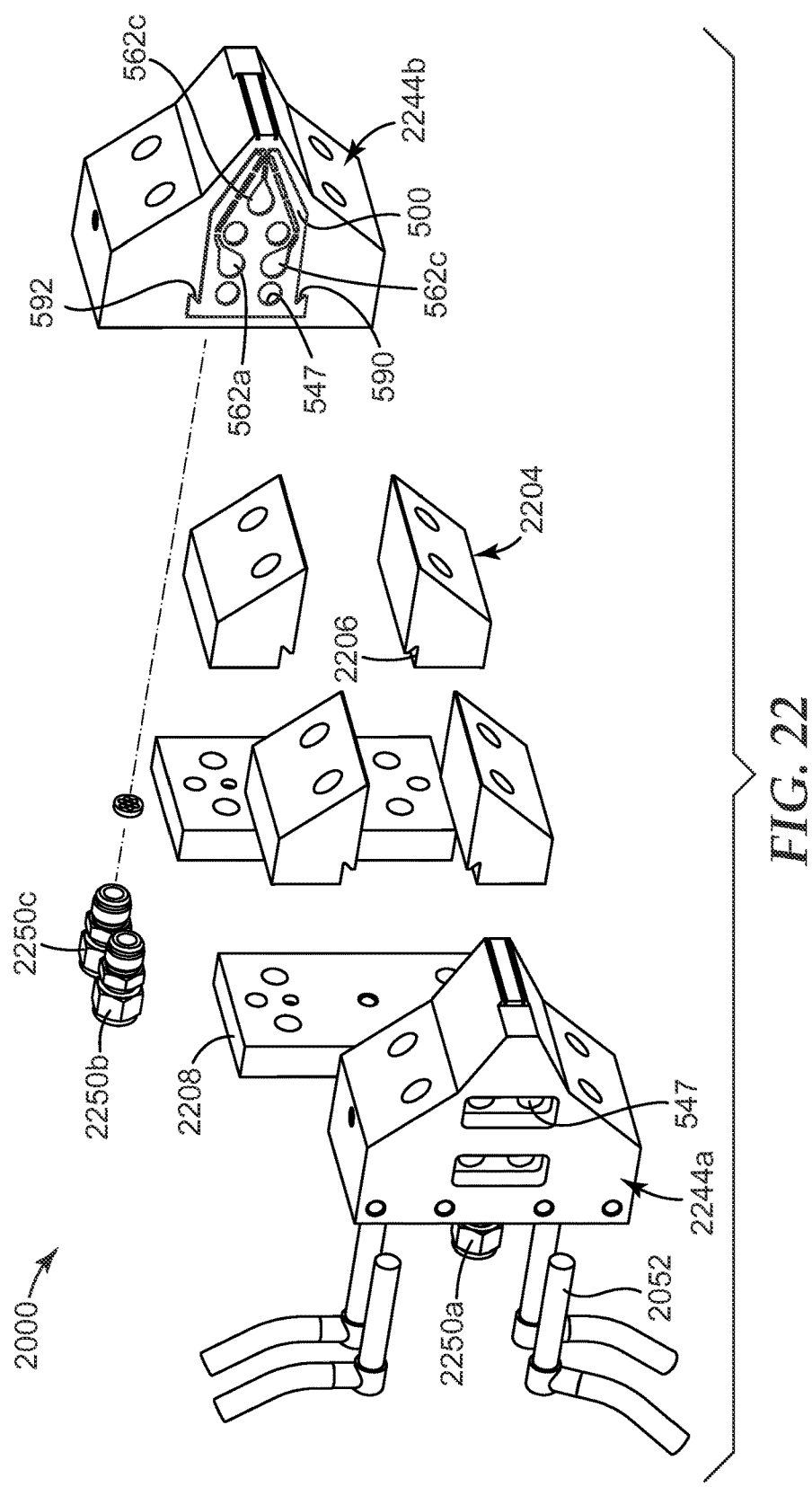
FIG. 22 is an exploded perspective view of an example of a mount suitable for an extrusion die composed of multiple repeats of the sequence of shims shown in FIG. 12A, 15A, 18A, 21A, or 27A.
Figure 23:
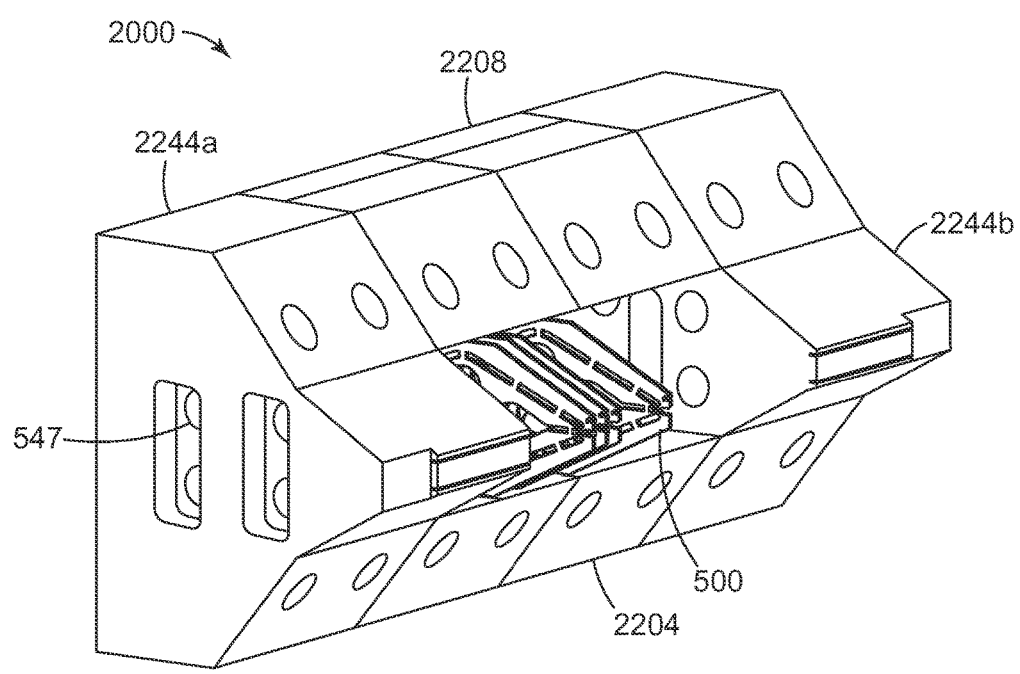
FIG. 23 is a perspective view of the mount of FIG. 22 in an assembled state.

An exploded perspective view of an embodiment of a mount suitable for an extrusion die composed of multiple repeats of the sequence of shims is illustrated in FIGS. 22 and 23. In some embodiments of extrusion dies described herein, there will be a large number of very thin shims (typically several thousand shims; in some embodiments, at least 1000, 2000, 3000, 4000, 5000, 6000, 7000, 8000, 9000, or even at least 10,000), of diverse types (e.g., shims 100, 200, and 300), compressed between two end blocks (e.g., 2244*a* and 2244*b*). Conveniently, through bolts can be used to assemble the shims to the end blocks 2244*a* and 2244*b*, passing through holes 547 in the shims. Inlet fittings 2250*a*, 2250*b*, and 2250*c* are provided on end blocks 2244*a* and 2244*b* respectively to introduce the materials to be extruded into extrusion die 2000. In some embodiments, inlet fittings 2250*a*, 2250*b*, and 2250*c* are connected to melt trains of conventional type. In some embodiments, cartridge heaters 2052 are inserted into receptacles extrusion die 2000 to maintain the materials to be extruded at a desirable temperature while in the die. The ordinary artisan may perceive alternatives for assembling the extrusion die other than that shown in the illustrated embodiment. In some embodiments, the assembled shims (conveniently bolted between the end blocks) further comprise a manifold body (not shown) for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of all the cavities), and such that the expansion seal allows a conduit between the manifold and the cavity.

Compression blocks 2204 have a notch 2206 that conveniently engages the shoulders on the shims (e.g., 590 and 592 on 500). When mount 2000 is completely assembled, compression blocks 2204 are attached by, for example, machine bolts to backplates 2208. Referring now to FIG. 23, a perspective view of mount 2000 of FIG. 22 is illustrated in a partially assembled state. A few shims (e.g., 500) are in their assembled positions to show how they fit within mount 2000, but most of the shims that would make up an assembled die have been omitted for visual clarity.

In any of the shims and sequences described above, the shims can have thicknesses in the range from 50 micrometers to 500 micrometers, although thicknesses outside of this range may also be useful. For wider fluid passageways and dispensing orifices, several smaller thickness shims may be stacked together, or single shims of the desired passageway width may be used. The shims are typically metal, for example, stainless steel. To reduce size changes with heat cycling, metal shims are typically heat-treated. The shims can be made by conventional techniques, including wire electrical discharge and laser machining. Often, a plurality of shims are made at the same time by stacking a plurality of sheets and then creating the desired openings simultaneously. Variability of the flow channels is preferably within 0.025 mm (1 mil), more preferably, within 0.013 mm (0.5 mil). The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. As described above, to aid in alignment, an indexing groove can be cut into the shims to receive an alignment key. Also, a vibrating table can be useful to provide a smooth surface alignment of the extrusion tip.

Typically, the fluid passageways have heights in a range from 50 micrometers to 3 mm, and lengths less than 5 mm (with generally a preference for smaller lengths for decreasingly smaller passageway thicknesses), although heights and lengths outside of these ranges may also be useful. The height of the first dispensing orifices may be in a range from 50 micrometers to 15 millimeters (mm). In some embodiments, the height of the first dispensing orifices is greater than 750 micrometers. In some of these embodiments, the height of the first dispensing orifices is in a range from greater than 750 micrometers to 15 mm (e.g., 0.775 mm to 10 mm, 0.775 mm to 5 mm, 0.775 mm to 3 mm or 0.8 mm to 2.6 mm). In some embodiments, the height of at least one of the first dispensing orifices or the second dispensing orifices is less than 750 micrometers. In some of these embodiments, the height of the first dispensing orifices and second dispensing orifices is in a range from 0.1 mm to less than 750 micrometers (e.g., 0.3 mm to 0.745 mm or 0.5 mm to 0.745 mm).

In some embodiments of the dies useful for extruding a polymer, each of the first and the second dispensing orifices have a width, and each of the first and the second dispensing orifices are separated by at least the width of the respective dispensing orifice and up to 2 times the width of the respective dispensing orifice. When the dispensing orifices have different widths, the separation between the first and second orifices may be at least the width of the wider opening and up to 2 times the width of the wider opening. The spacing between orifices should be sufficient to maintain a distance between adjacent strands as they exit the die. This spacing accommodates die swell at the dispensing tip. If the spacing between orifices is too great, the strands and ribbons after extrusion at different speeds will not repeatedly collide with each other and will not form the repeating bonds of the polymeric netting In general, it has been observed that the rate of strand bonding is proportional to the extrusion speed of the polymeric strands or ribbons that are extruded at the faster speed. Further, it has been observed that this bonding rate can be increased, for example, by increasing the polymer flow rate for a given orifice size, or by decreasing the orifice area for a given polymer flow rate. It has also been observed that the distance between bonds is inversely proportional to the rate of strand bonding, and proportional to the speed that the net is drawn away from the die. Thus, it is believed that the distance between bonds and the net basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small second orifice area.

In some embodiments, it may be useful to have the number of polymeric ribbons present per centimeter of cross direction width vary across the width of the polymeric netting. One way of achieving this is to apply a spreading force to at least a portion of the polymeric netting, such as by running the web over a bowed roller, diverging rails, or diverging disks. Once spread, attaching polymeric netting to another layer (e.g., a carrier or a layer in an absorbent article as described below) can be useful for maintaining the web in this spread open condition. Spreading in the cross direction causes the openings in the polymeric netting to become larger in the cross direction with the original dimension of the individual openings in the machine direction defined by the average machine direction spacing of contacts between the polymeric ribbons and the polymeric strands. In some embodiments it may be desirable to stretch the polymeric netting in the machine direction or in both a cross direction and the machine direction to create larger opening and/or to reduce the weight and cost of the polymeric netting on a per unit area basis. Monoaxial stretching in the machine direction, which is the lengthwise direction of the polymeric ribbons and polymeric strands, can be performed by propelling the web over rolls of increasing speed. A versatile stretching method that allows for monoaxial, sequential biaxial, or simultaneous biaxial stretching of a thermoplastic web employs a flat film tenter apparatus. Such an apparatus grasps the web using a plurality of clips, grippers, or other edge-grasping means along opposing edges of the thermoplastic web in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Monoaxial and biaxial stretching can be accomplished, for example, by the methods and apparatus disclosed in U.S. Pat. No. 7,897,078 (Petersen et al.) and the references cited therein. Flat film tenter stretching apparatuses are commercially available, for example, from Brückner Maschinenbau GmbH, Siegsdorf, Germany.

Although in the embodiments shown in FIGS. 9 to 21, the first and second dispensing orifices are collinear, this is not a requirement. In some embodiments, the first dispensing orifices are collinear with each other, and the second dispensing orifices are collinear with each other, but the first and second dispensing orifices do not overlap. When the first and second dispensing orifices do not overlap with each other, it may be desirable to extrude the strands horizontally.

While the embodiments of the extrusion die and method described above in connection with FIGS. 9 to 21 supply polymeric ribbons and polymeric strands of a polymer netting from separate cavities, other embodiments include providing an extrusion die comprising a plurality of shims positioned adjacent to one another, the shims together defining a cavity, the extrusion die having a plurality of first dispensing orifices in fluid communication with the cavity and a plurality of second dispensing orifices in fluid communication with the cavity, such that the first and second dispensing orifices are alternated. In these embodiments, polymeric ribbons are dispensed from the first dispensing orifices at a first speed while simultaneously polymeric strands are dispensed from the second dispensing orifices at a second speed, wherein the second speed is at least 2 (in some embodiments, in a range from 2 to 6 or 4 to 6) times the first speed. Since there is only one cavity, the polymeric ribbons and polymeric strands in the resulting netting are made from the same composition. To prepare a polymeric netting from an extrusion die having only one cavity, a shim sequence such as that shown in FIGS. 44 to 48 in Int. Pat. Appl. Pub. No. WO 2013/028654 (Ausen et al.) may be useful, with the modification that the shims providing the first dispensing orifices providing the polymeric ribbons have an aspect ratio of at least 3:1, 5:1, 7:1, or more and may lack a restriction set back from the dispensing orifice.

The shape of the individual polymeric ribbons and polymeric strands in a polymeric netting disclosed herein can depend on a variety of factors. As described above, the polymeric strands, which are lower in height than the polymeric ribbons, may exit the die at a faster rate than the polymeric ribbons and may be oscillating. Therefore, in some embodiments, the polymeric ribbons may be substantially straight, for example, when no extension force is placed on the polymeric netting. However, depending on the different in height between the polymeric ribbons and strands, the placement of the polymeric strands on the major surface of the polymeric ribbons, and the modulus of the materials from which the polymeric ribbons and polymeric strands are made, both the polymeric ribbons and polymeric strands may occupy a sinusoidal path in the lengthwise direction as shown, for example, in FIG. 2. In some embodiments, the polymeric ribbons may exit the die at a faster rate than the polymeric strands and may be oscillating. In these embodiments, the polymeric strands may appear substantially straight, for example, when no extension force is placed on the polymeric netting.

In any of the aforementioned embodiments of the polymeric netting according to and/or made from the method according to the present disclosure, the distance between bonds can be in a range from 0.5 mm to 20 mm (in some embodiments, in a range from 0.5 mm to 10 mm). Also, in any of the aforementioned embodiments, the polymeric netting according to the present disclosure or made from the method disclosed herein can have a basis weight in a range from 5 g/m$^2$ to 2500 g/m$^2$ (in some embodiments, 5 g/m$^2$ to 1000 g/m$^2$, 5 g/m$^2$ to 750 g/m$^2$, 5 g/m$^2$ to 400 g/m$^2$ or 10 g/m$^2$ to 200 g/m$^2$). In some embodiments, the polymeric netting disclosed herein in any of the aforementioned embodiments has a thickness up to 15 mm (in some embodiments, up to 10 mm, 5 mm, 4 mm, 3.5 mm, 3 mm, 2 mm, 1 mm, 0.75 mm, or less than 0.75 mm), in some embodiments, in a range from 10 micrometers to 15 mm, 10 micrometers to 10 mm, 10 micrometers to 5 mm, 10 micrometers to 4 mm, 10 micrometers to 3.5 mm, 10 micrometers to 3 mm, 10 micrometers to 2 mm, 10 micrometers to 1 mm, 10 micrometers to 750 micrometers, 10 micrometers to less than 750 micrometers, 10 micrometers to 749 micrometers, 10 micrometers to 700 micrometers, or 10 micrometers to 650 micrometers.

The polymeric compositions useful in the polymeric nettings and methods described above in any of their embodiments may be the same or different. In some embodiments, the polymeric ribbons and polymeric strands comprise different polymeric compositions. These nets can be prepared, for example, by extrusion using any embodiments of the method described above by using different polymeric compositions in the first and second cavities. The different polymeric compositions in the polymeric ribbons and polymeric strands may be selected for their surface properties or their bulk properties (e.g., tensile strength, elasticity, microstructure, color, refractive index, volume resistivity, etc). Furthermore, polymeric compositions can be selected to provide specific functional or aesthetic properties to the polymeric netting such as hydrophilicity/hydrophobicity, elasticity, softness, hardness, stiffness, bendability, or colors. The term "different" in terms of polymeric compositions can also refer to at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity.

In some embodiments, polymeric materials from which polymeric netting can be made comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.).

In the polymeric netting according to the present disclosure the polymeric ribbons are bonded to the polymeric strands. Bonding generally refers to melt-bonding, and the bonds between polymer strands and polymer ribbons can be considered to be melt-bonded. The bonding occurs in a relatively short period of time (typically less than 1 second). The bond regions on the major surface of the polymeric ribbons, as well as the polymeric strands, typically cool through air and natural convection and/or radiation. Bonding between strands has been observed to be improved by increasing the time that the polymeric ribbons and polymeric strands are molten to enable more interaction between polymers. When the polymeric ribbons and polymeric strands in the netting are made from different polymers, polymers used to make the polymeric ribbons and polymeric strands are selected to be compatible with each other such that the polymeric ribbons and polymeric strands bond together at bond regions. In selecting polymers for the polymeric ribbons and polymeric strands, in some embodiments, it may be desirable to select polymers of bonding strands that have dipole interactions (or H-bonds) or covalent bonds. Bonding of polymers has generally been observed to be improved by reducing the molecular weight of at least one polymer and or introducing an additional co-monomer to improve polymer interaction and/or reduce the rate or amount of crystallization.

Examples of polymeric materials from which the polymeric netting can be made include thermoplastic polymers. Suitable thermoplastic polymers for the polymeric nettings include polyolefin homopolymers such as polyethylene and polypropylene, copolymers of ethylene, propylene and/or butylene; copolymers containing ethylene such as ethylene vinyl acetate and ethylene acrylic acid; ionomers based on sodium or zinc salts of ethylene methacrylic acid or ethylene acrylic acid; polyvinyl chloride; polyvinylidene chloride; polystyrenes and polystyrene copolymers (styrene-maleic anhydride copolymers, styrene acrylonitrile copolymers); nylons; polyesters such as poly(ethylene terephthalate), polyethylene butyrate, polybutylene terephthalate, polytrimethylene terephthalate, and polyethylene napthalate; polyamides such as poly(hexamethylene adipamide); polyurethanes; polycarbonates; poly(vinyl alcohol); polybutene;

polylactic acid; ketones such as polyetheretherketone; polyphenylene sulfide; polyhydroxy alkonates (PHA); polyhydroxybutyrates (PHB), liquid crystalline polymer; polyacrylates; polyacrylonitrile; cyclic polyolefin; polyoxymethylene; polyolefinic thermoplastic elastomers; cellulosics; fluoroplastics; polysulfones; silicone polymers; and mixtures thereof. The die and method according to the present disclosure may also be useful for co-extruding polymeric materials that can be crosslinked (e.g., by heat or radiation). When a heat curable resin is used, the die can be heated to start the cure so as to adjust the viscosity of the polymeric material and/or the pressure in the corresponding die cavity.

In some embodiments, including embodiments in which the polymeric netting according to the present disclosure is used as a stand-alone filtration medium and in which it is used in combination with a second, different filtration medium, the polymeric netting is electrostatically charged. For these embodiments, the polymeric netting may be made from any extrudable material that will maintain satisfactory electret properties or charge separation. In some embodiments, at least one of the polymeric ribbons or polymeric strands are made from non-conductive thermoplastics resins having a volume resistivity of at least $10^{14}$ ohm-centimeters at room temperature (22° C.). In some embodiments, the volume resistivity is at least about $10^{16}$ ohm-centimeters. Resistivity of the extrudable material for the polymeric nettings may be measured according to standardized test ASTM D 257-93. Polymeric materials for use in chargeable polymeric nettings are also typically substantially free from components such as antistatic agents that could significantly increase electrical conductivity or otherwise interfere with the polymeric netting's ability to accept and hold electrostatic charges. Examples of polymeric compositions that may be used advantageously in chargeable polymeric nettings include thermoplastic compositions containing polyolefins such as polyethylene, polypropylene, polybutylene, poly(4-methyl-1-pentene), cyclic olefin copolymers, and blends and copolymers of any of these. In some embodiments, at least one of the polymeric ribbons or polymeric strands comprise at least one of poly-4-methyl-1 pentene or polypropylene. In some embodiments, the polymeric nettings are prepared from polypropylene homopolymer because of its ability to retain electric charge, particularly in moist environments.

Other polymeric compositions for at least one of the polymeric ribbons or polymeric strands, which may be used but may be difficult to charge or may lose charge rapidly, include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. Accordingly, in some embodiments, particularly embodiments in which the polymeric netting is electrostatically charged, the polymeric netting according to the present disclosure (e.g., neither the polymeric ribbons or polymeric strands) are not made from block copolymers or elastomers in general. In these embodiments, materials to make the polymeric nettings may be considered non-elastic. However, in some embodiments, it may be useful to have at least one of the polymeric ribbons or the polymeric strands made from elastomers (e.g., any of the elastomeric materials described herein below). For example, polymeric ribbons may be made from any of the thermoplastics described above suitable for electrostatic charging, and polymeric strands may be made from elastomers.

Electric charge can be imparted to the disclosed polymeric nettings in a variety of ways. For example, the polymeric netting may be electrostatically charged by contacting the web with water as disclosed in U.S. Pat. No. 5,496,507 (Angadjivand et al.), corona-treating as disclosed in U.S. Pat. No. 4,588,537 (Klasse et al.), hydrocharging as disclosed, for example, in U.S. Pat. No. 5,908,598 (Rousseau et al.), plasma treating as disclosed in U.S. Pat. No. 6,562,112 (Jones et al.) and U.S. Pat. Appl. Pub. No. US2003/0134515 A1 (David et al.), or combinations thereof. Electric charge-enhancing additives may also be incorporated into the polymeric nettings. This may be carried out, for example, by incorporating materials such as those taught in U.S. Pat. Appl. Pub. No. US2012/0017910 (Li et al.). The desirability of the polymeric netting to be electrostatically charged depends upon, for example, the nature of the contaminant to be removed.

In some embodiments, a single strand of the polymeric strands or a single ribbon of the polymeric ribbons in the netting may include different polymeric compositions. For example, one or more of the polymeric strands in the polymeric netting may have a core made of one polymeric composition and a sheath of a different polymeric composition. Such nets can be extruded as described in International Patent Applicaton Publication No. WO 2013/032683 (Ausen et al.), the disclosure of which is incorporated herein by reference. Nets in which their opposing major surfaces are made from different polymeric compositions are described in International Application No. PCT/US2014/021494, filed Mar. 7, 2014.

Figure 27B:
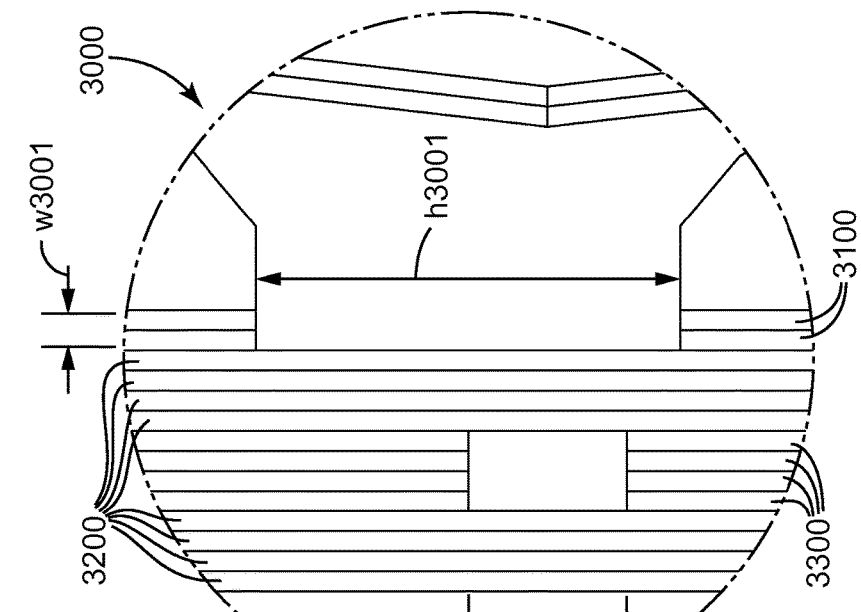
FIG. 27B is an expanded view of the section referenced as "27B" in FIG. 27A.
Figure 27A:
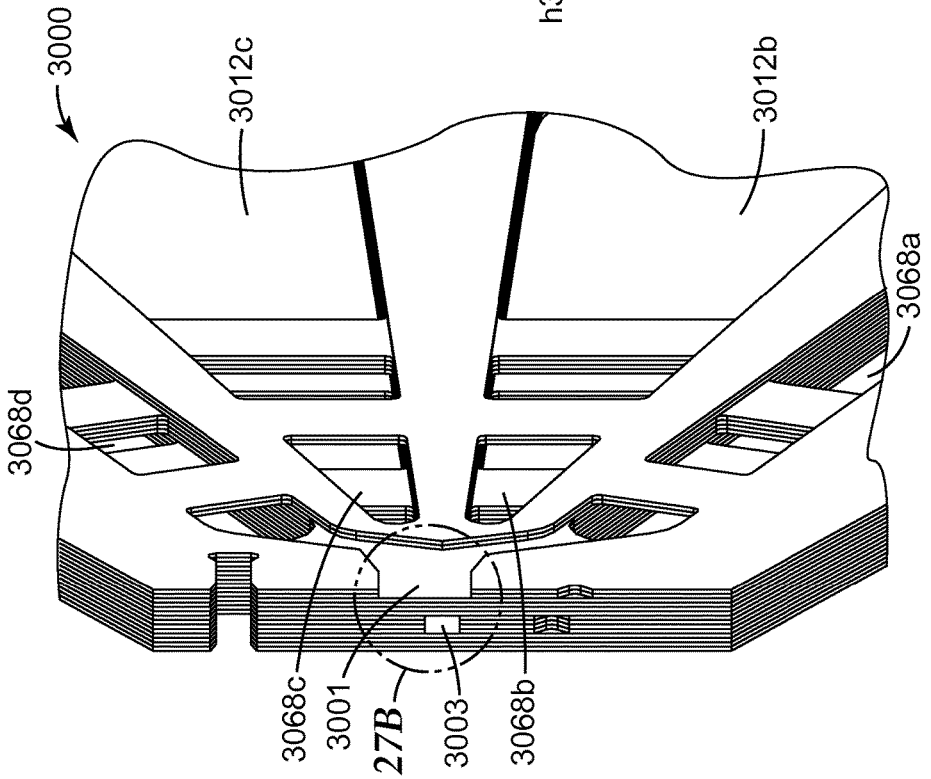
FIG. 27A is a perspective drawing of a sequence of shims employing the shims of FIGS. 24 to 26 configured to form a portion of a polymeric netting as shown, for example, in FIG. 8.

As described above in connection with FIG. 8, in some embodiments, the polymeric ribbons each have a center line bisecting the major surface and first and second edges symmetrically disposed on opposite sides of the center line, wherein the first edges of the polymeric ribbons comprise a different composition than the second edges of the polymeric ribbons. In the illustrated embodiment, the polymeric strands also have a center line bisecting a major surface and first and second edges symmetrically disposed on opposite sides of the center line, wherein the first edges of the polymeric strands comprise a different composition than the second edges of the polymeric strands. A polymeric netting such as that indicated by polymeric netting 90 in FIG. 8 can conveniently be made, for example, using a shim sequence 3000 shown in FIGS. 27A and 27B. FIGS. 27A and 27B show a perspective assembly of a sequence of shims including shims 3100, 3200, and 3300, described below.

Figure 24:
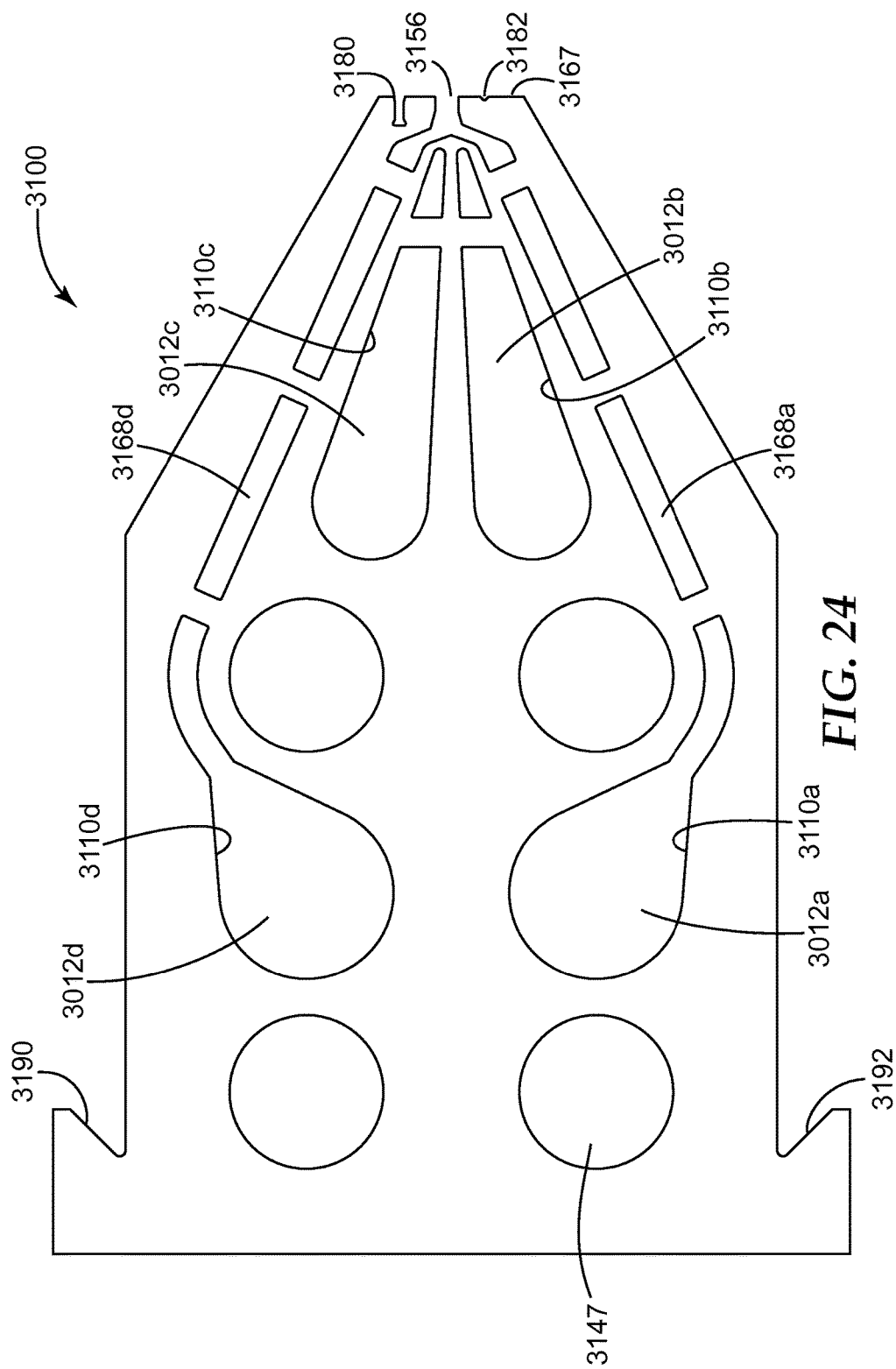
FIG. 24 is a plan view of an embodiment of a shim suited to form a sequence of shims useful for making a polymeric netting as shown, for example, in FIG. 8.

Referring now to FIG. 24, a plan view of shim 3100 is illustrated. Shim 3100 has first aperture, 3110*a*, second aperture 3110*b*, a third aperture 3110*c*, and a fourth aperture 3110*d*. When shim 3100 is assembled with others as shown in FIGS. 27A and 27B, first aperture 3110*a* will help define first cavity 3012*a*, second aperture 3110*b* will help define second cavity 3012*b*, third aperture 3110*c* will help define third cavity 3012*c*, and fourth aperture 3110*d* will help define fourth cavity 3012*d*. As will be discussed with more particularity below, molten polymer in cavities 3012*a* and 3012*d* can be extruded into polymeric ribbons 91 having 91*a* and 91*b* two layers, and molten polymer in cavities 3012*b* and 3012*c* can be extruded into polymeric strands 93 having two layers 93*a* and 93*b* as shown in FIG. 8.

Shim 3100 has several holes 3147 to allow the passage of, for example, bolts to hold shim 3100 and others to be described below into an assembly. Shim 3100 has dispensing opening 3156 in dispensing surface 3167. It might appear that there are no paths from apertures 3110*a* and 3110*d* to dispensing opening 3156, via, for example, passageways 3168a and 3168d, but the flows have routes 3068a and 3068d in the perpendicular-to-the-plane-of-the-shim dimension when the sequence of FIG. 27A, for example, is completely assembled. Similar to shim 100, dispensing surface 3167 of shim 3100 has indexing groove 3180, identification notch 3182, and shoulders 3190 and 3192.

Figure 25:
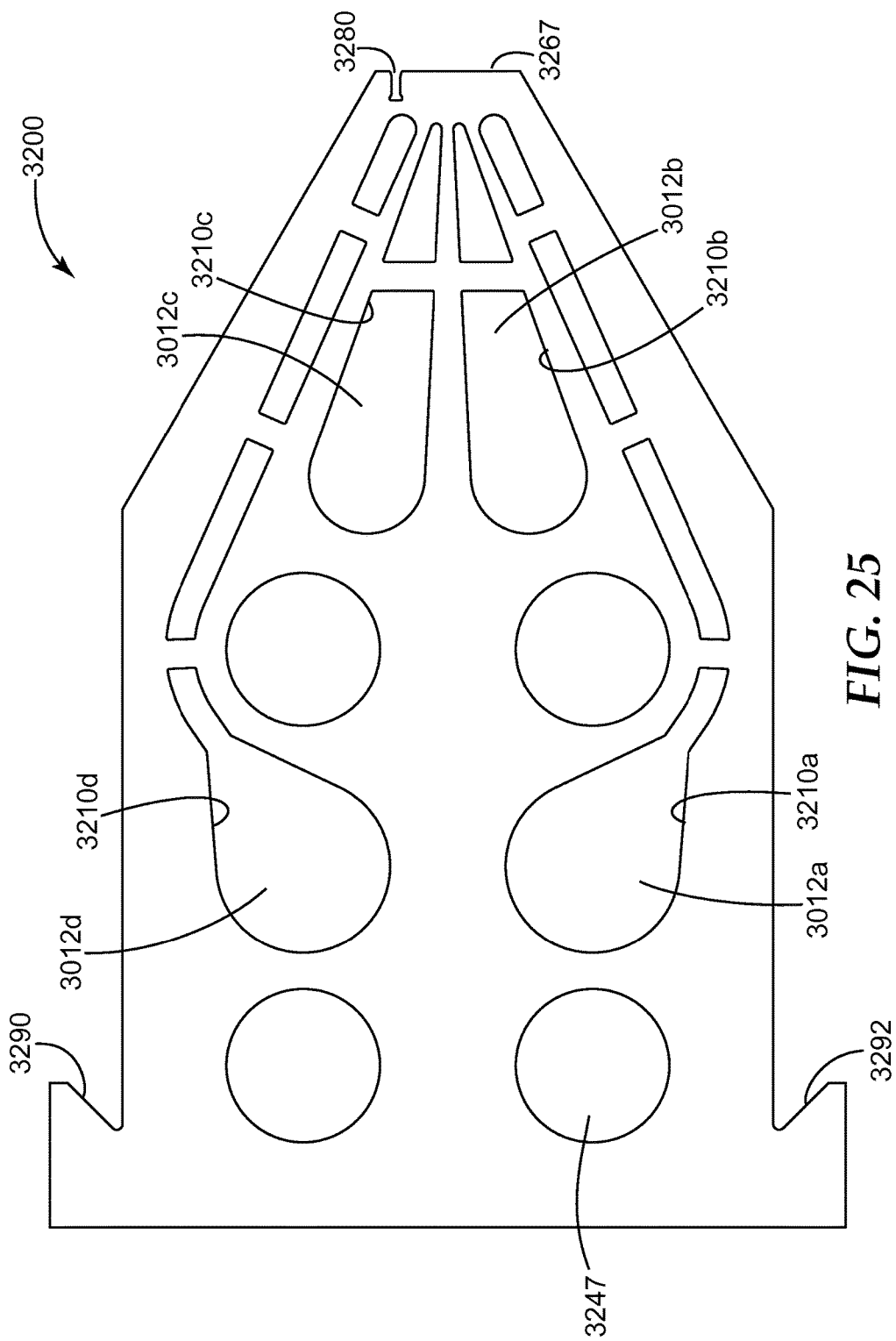
FIG. 25 is a plan view of another embodiment of a shim suited to form a sequence of shims useful for making a polymeric netting as shown, for example, in FIG. 8.

Referring now to FIG. 25, a plan view of shim 3200 is illustrated. Shim 3200 has first aperture, 3210a, second aperture 3210b, third aperture 3210c, and fourth aperture 3210d. When shim 3200 is assembled with others as shown in FIGS. 27A and 27B, first aperture 3210a will help define first cavity 3012a, second aperture 3210b will help define second cavity 3012b, third aperture 3210c will help define third cavity 3012c, and fourth aperture 3210d with help define fourth cavity 3012d. Analogous to shim 3100, shim 3200 has dispensing surface 3267, and in this particular embodiment, dispensing surface 3267 has indexing groove 3280. Also analogous to shim 3100, shim 3200 has shoulders 3290, 3292 and holes 3247. There is no passage from any of the cavities to dispensing surface 3267 since this shim creates a non-dispensing area along the width of the die. Referring again to FIG. 8, shim(s) 3200 are useful for separating shims 3100 producing polymeric ribbons 91 from shims 3300 producing polymeric strands 93.

Figure 26:
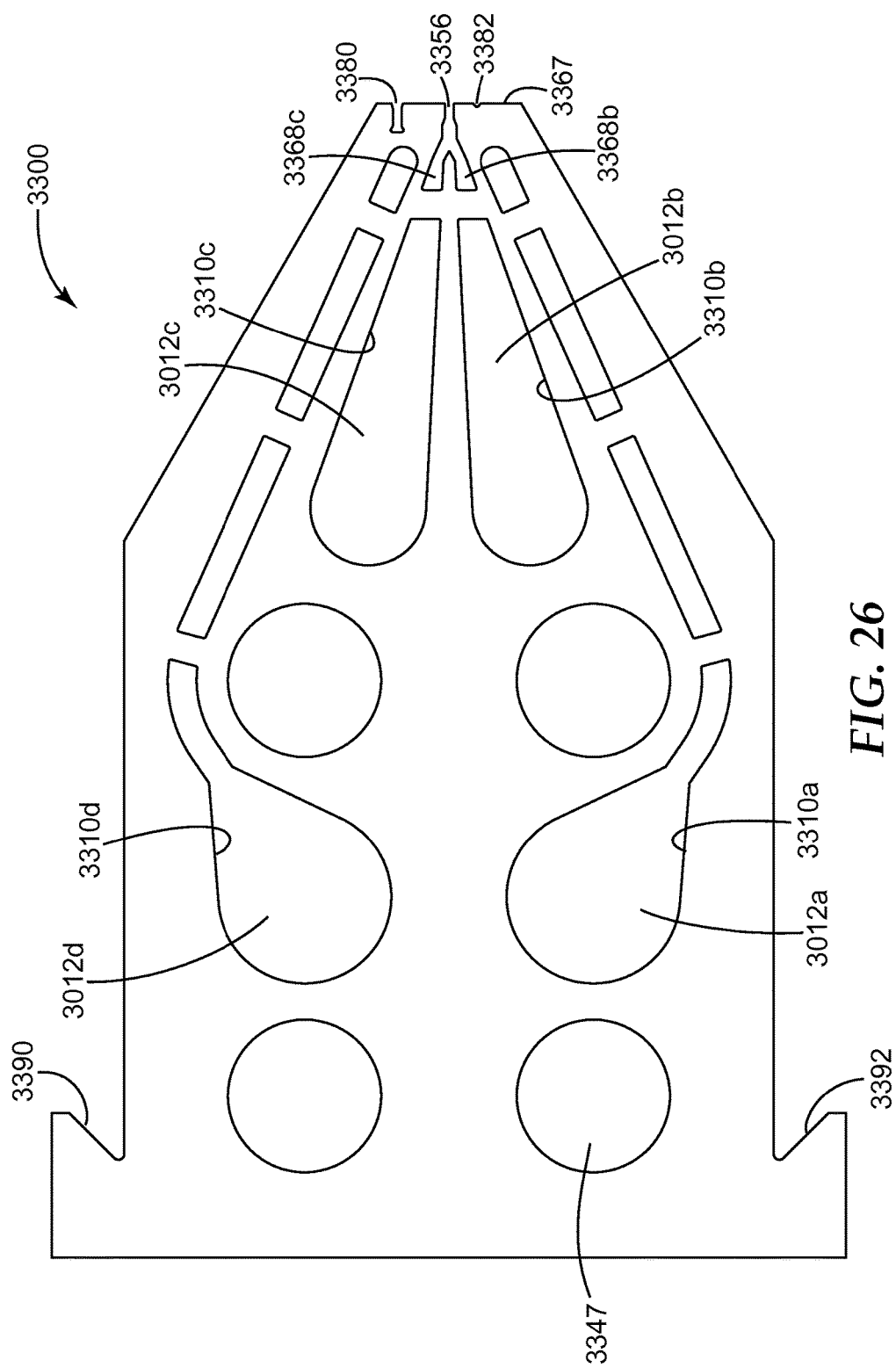
FIG. 26 is a plan view of yet another embodiment of a shim suited to form a sequence of shims useful for a polymeric netting as shown, for example, in FIG. 8.

Referring now to FIG. 26, a plan view of shim 3300 is illustrated. Shim 3300 has first aperture 3310a, second aperture 3310b, third aperture 3310c, and fourth aperture 3310d. When shim 3300 is assembled with others as shown in FIGS. 27A and 27B, first aperture 3310a will help define first cavity 3012a, second aperture 3310b will help define second cavity 3012b, third aperture 3310c will help define third cavity 3012c, and fourth aperture 3310d with help define fourth cavity 3012d. Analogous to shim 3100, shim 3300 has dispensing surface 3367, and in this particular embodiment, dispensing surface 3367 has indexing groove 3380 and identification notch 3382. Also analogous to shim 3100, shim 3300 has shoulders 3390, 3392 and holes 3347. Shim 3300 has dispensing opening 3356 in dispensing surface 3367. It might appear that there are no paths from apertures 3310b and 3310c to dispensing opening 3356, via, for example, passageway 3368b and 3368c, respectively, but the flows have routes in the perpendicular-to-the-plane-of-the-shim dimension when the sequence of FIG. 27A, for example, is completely assembled.

Referring now to FIGS. 27A and 27B, a perspective assembly drawing of a sequence of shims, collectively 3000, employing the shims of FIGS. 24, 25 and 26 so as to produce polymeric netting 90 shown in FIG. 8 is shown. More particularly, proceeding from left to right in FIG. 27B, sequence 3000 includes four instances of shim 3200, four instances of shim 3300 that can extrude polymeric strands 93, four instances of shim 3200, and two instances of shim 3100 that can extrude polymeric ribbons 91. Dispensing orifices 3001 and 3003 are separated by shims 3200, which causes the separation of polymeric ribbons 91 from polymeric strands 93 in the polymeric netting 90. The first dispensing orifices 3001 each have a height h3001 to width w3001 aspect ratio of at least three to one (in some embodiments, at least 5:1, 8:1, 10:1, 11:1, 15:1, 20:1, 30:1, or 40:1). In FIG. 27B, the width of the first dispensing orifices can be considered to be the width of two shims 3100. As in the embodiment shown in FIG. 12B, the height h3001 of the first dispensing orifices 3001 is at least 2, 2.5, 3, 5, 10, or 20 times larger than the height h3003 of the second dispensing orifices. In this embodiment, at least the first dispensing orifices 3001 are defined by an array of first vestibules, and the die includes a first fluid passageway 3068a between the first cavity 3012a and one of the first vestibules, and a fourth passageway 3068d extending from the fourth cavity 3012d to the same vestibule, such that the area where the first fluid passageway 3068a enters the first vestibules is below the area where the fourth fluid passageway 3068d enters the first vestibules. The extrusion die also includes fluid passageways extending from one of the cavities with the die to the second dispensing orifices. In the illustrated embodiment, the second dispensing orifices 3003 are defined by an array of second vestibules, and the die includes a second fluid passageway 3068b between the second cavity 3012b and one of the second vestibules, and a third passageway 3068c extending from a third cavity 3012c to the same vestibule, such that the area where the second fluid passageway 3068b enters the second vestibules is below the area where the third fluid passageway 3068c enters the second vestibules.

In other embodiments in which the first edges of the polymeric ribbons comprise a different composition than the second edges of the polymeric ribbons, the polymeric netting can be surface treated with a surfactant (e.g., in an amount between about 0.05 and 0.5 weight percent). If a surfactant is used, it can be an internal additive in a polymeric composition that migrates to the surface, or a surfactant can be applied to the web by any conventional means (e.g., spraying, printing, dipping, or brush coating). Polymer compositions (e.g., those providing second portions 91b and 93b shown in FIG. 8) may be selected to be hydrophilic or to include a surfactant, or a surfactant can be applied to a major surface of the polymeric netting to impart a desired level of wettability and hydrophilicity to at least a portion of the polymeric netting for certain applications. In some embodiments, the surfactant is fluorinated.

In some embodiments, the polymeric netting according to the present disclosure further comprises sorbent particles attached to at least some of the polymeric ribbons or polymeric strands. In some embodiments, a polymeric netting according to the present disclosure may be used in combination with a second, different filtration medium that includes sorbent particles. A variety of sorbent particles may be useful as long as they possess the desired sorbent properties for the intended end use application for the filter. Desirably the sorbent particles will be capable of absorbing or adsorbing gases, aerosols, or liquids expected to be present under the intended use conditions. Sorbent particles may be useful, for example, for absorbing odor-producing vapors. The sorbent particles may be provided in any usable form including beads, flakes, granules or agglomerates. Suitable sorbent particles include activated carbon; alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. In some embodiments, the sorbent particles comprise at least one of activated carbon or alumina. Other suitable sorbent particles are disclosed in U.S. Pat. No. 3,971,373 (Braun), U.S. Pat. No. 4,429,001 (Kolpin et al.), and U.S. Pat. No. 6,102,039 (Springett et al.).

In some embodiments, the polymeric netting comprises at least about 100 g/m², at least about 150 g/m², or at least about 200 g/m² of the sorbent particles. In some embodiments, the polymeric netting comprises up to about 500 g/m², up to about 400 g/m², or up to about 300 g/m² of the sorbent particles.

The sorbent particle size may vary. In some embodiments, the sorbent particles have a standard U.S. mesh size of at least about 12 mesh (1680 micrometers), at least about 16 mesh (1190 micrometers), or at least about 20 mesh (840 micrometers), and no greater than about 325 mesh (44 micrometers), no greater than about 150 mesh (105 micrometers), or no greater than about 60 mesh (250 micrometers). If the particle size of a material is described as 12×20 mesh, then 90% or more of the material will pass through a 12-mesh sieve (i.e. particles smaller than about 1680 micrometers will pass through a 12-mesh sieve) and be retained by a 20-mesh sieve (i.e. particles larger than about 841 micrometers will not pass through a 20-mesh sieve). Suitable sorbent particles include 12×20, 25×45, 30×60, 40×140, and 80×325 mesh sized granular activated carbon available from Kuraray Chemical Corporation, Canoga Park, Calif. Mixtures (e.g., bimodal mixtures) of sorbent particles having different size ranges may also be employed although in practice it may be more desirable to fabricate a multilayer sheet article employing larger sorbent particles in an upstream layer and smaller sorbent particles in a downstream layer.

Sorbent particles may be added to polymeric nettings according to the present disclosure, for example, after extrusion. Therefore, it may be useful for at least some of the polymeric ribbons and polymeric strands to remain tacky after extrusion for a sufficient length of time that the sorbent particles will adhere to them. Accordingly, in some of these embodiments, at least one of the polymeric ribbons or polymeric strands or at least a portion thereof comprises an elastomeric material. Examples of suitable elastomeric materials include polyurethane elastomeric materials (e.g., those available under the trade designations "IROGRAN" thermoplastic polyurethane from Huntsman International, LLC, The Woodlands, Tex., and "ESTANE" thermoplastic polyurethane from Lubrizol Corporation, Cleveland, Ohio), polybutylene elastomeric materials (e.g., those available under the trade designation "CRASTIN" from E.I. DuPont de Nemours & Co., Wilmington, Del.), polyester elastomeric materials (e.g., those available under the trade designation "HYTREL" from E.I. DuPont de Nemours & Co.), polyether block copolyamide elastomeric materials (e.g., those available under the trade designation "PEBAX" from Arkema Inc. Philadelphia, Pa.), elastomeric styrenic block copolymers (e.g., those available under the trade designations "KRATON" from Kraton Polymers, Houston, Tex., and "SOLPRENE" from Dynasol Elastomers, Houston, Tex.), and polyolefin based elastomers (e.g., those obtained from Exxonmobil Chemical Company, Houston, Tex., under the trade designation "VISTAMAXX" such as "VISTAMAXX 2125"). In other embodiments, sorbent particles may be adhered to polymeric nettings according to the present disclosure (e.g., after the polymeric netting is made) using any curing or non-curing adhesive.

In embodiments in which the polymeric netting comprises sorbent particles attached to at least one of the polymeric ribbons or polymeric strands, the polymeric nettings according to the present disclosure may be useful for a variety of water filtration applications as well as air filtration applications. The polymeric netting may be rolled into a cylindrical shape to provide a cartridge type filter, for example.

In some embodiments, the polymeric netting according to the present disclosure is pleated. Pleating a filtration medium can be useful for decreasing air flow resistance and providing a greater surface area for capturing particulates. Pleat formation and pleat spacing may be performed using a variety of known techniques including those disclosed in U.S. Pat. No. 4,798,575 (Siversson), U.S. Pat. No. 4,976,677 (Siversson), and U.S. Pat. No. 5,389,175 (Wenz). In some embodiments, the polymeric netting may include about 0.5 to about 5 pleats per 2.54 centimeters (1 inch).

Filters that include the polymeric netting according to the present disclosure may include a frame, for example, arranged around a perimeter edge of the polymeric netting. Suitable materials for the frame include chip board, or paperboard, and synthetic plastic materials. Suitable frame constructions include the "pinch" frame construction illustrated in FIGS. 1-4 of U.S. Pat. No. 6,126,707 (Pitzen), the "box" frame construction illustrated in FIGS. 5 and 6 of U.S. Pat. No. 6,126,707 (Pitzen), the hybrid frame construction illustrated in FIGS. 7-11 of U.S. Pat. No. 6,126,707 (Pitzen), any of the frame constructions disclosed in U.S. Pat. No. 7,503,953 (Sundet et al.), and any of the frame constructions disclosed in U.S. Pat. No. 7,235,115 (Duffy, et al.), the entire contents of which are herein incorporated by reference.

In some embodiments, the frame may include a reinforcing or support structure attached along one or more major surfaces of the filter medium, which may include the polymeric netting according to the present disclosure and/or a second, different filter medium. Or the polymeric netting according to the present disclosure may be useful as a support structure in a frame. Other support structures useful in combination with a polymeric netting according to the present disclosure include mesh, scrims, screens, or elongated strips, strands, or filaments of material. Such support structures may be formed of, for example, paper products, such as chipboard, polymeric materials, metals, glues, or combinations thereof. The configuration of the support structure may match the contour of the pleats in a pleated filter or may be generally planar and generally bonded to the tips of the pleated filter. The support structure may also be generally continuously bonded to one of the major surfaces of the filter medium. The support structure serves to add strength to the frame and helps retain the shape of the pleats. During use, the support structure is typically positioned downstream of the air flow when the filter is positioned across an air duct.

Figure 30:
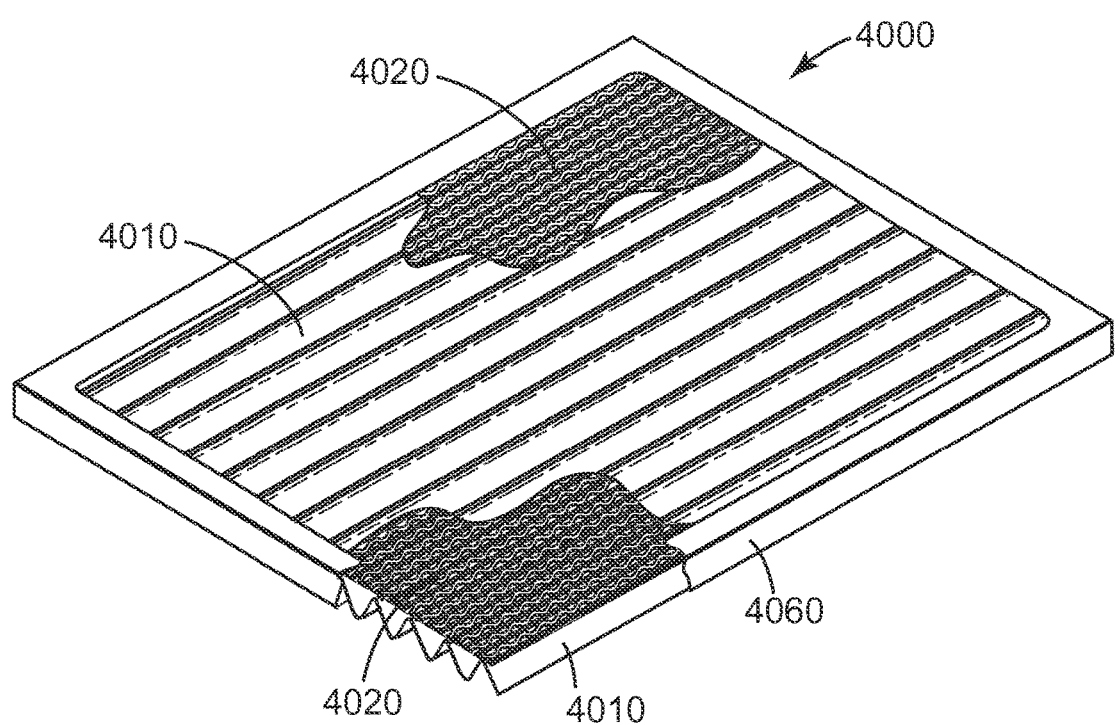
FIG. 30 is a perspective view of an embodiment of a filter according to the present disclosure.

An embodiment of filter according to the present disclosure is shown in FIG. 30. Filter 4000 includes pleated filtration medium 4010, polymeric netting 4020 as a planar support layer or pre-filter layer for the pleated filter, and a frame 4060 arranged around the perimeter edge of the pleated filtration medium. Although the polymeric netting extends across the entire area of the pleated filtration medium 4010, which is beneath the polymeric netting 4020 in the drawing, for simplicity, the polymeric netting is only shown in the indicated corners of the drawing. If the airflow goes through the pleated filtration medium 4010 first, the polymeric netting 4020 can serve as a support layer. If the airflow goes through the polymeric netting 4020, the polymeric netting 4020 can serve as a pre-filter layer for removing coarse particles. In other embodiments, as described above, the polymeric netting in the filter may also be pleated to support the pleated structure of the pleated filtration medium 4010. In still other embodiments, the polymeric netting may be the only filtration medium, pleated or not pleated, in a filter according to the present disclosure.

In some embodiments, the polymeric netting according to the present disclosure may be used in an air filtration system that uses an ionizer to create ions, which attach themselves to dirt particles. The ionizer may be a point source ionizer.

Examples of these air filtration systems are described in U.S. Pat. Nos. 6,758,884 and 7,141,098 (both to Zhang et al.). In such an air filtration system, the polymeric netting according to the present disclosure may be useful as a particle collection surface, which may be electrostatically charged as described above, or a pre-filter upstream from the particle collection surface.

When the polymeric netting according to the present disclosure is used in combination with a second, different filtration medium, the second, different filter medium may be one of variety of conventional filters. For example, the second, different filtration medium can be a fibrous nonwoven web formed of polymeric fibers of any of the polymeric materials described above using a meltblowing apparatus such as the one shown in FIG. 1 of U.S. Pat. No. 6,858,297 (Shah et al.). A variety of suitable die tip may be useful in connection with the meltblowing apparatus including the dip tip shown in FIG. 3 of U.S. Pat. Pub. No. 2008/0026659 (Brandner et al.). In some embodiments, the nonwoven web comprises polypropylene fibers.

In some embodiments, the second, different filtration medium may be made from polypropylene having a melt flow rate index of 70 available from Total Petrochemicals, Houston, Tex., under the trade designation "FINA 3860", 0.8% by weight "CHIMASSORB 944" available from Ciba Specialty Chemicals, now part of BASF, Florham Park, N.J., and 1.2% by weight polymethylpentene available from Mitsui Chemicals America, Rye Brook, N.Y., under the trade designation "DX820". In some embodiments, the second, different filtration medium is available under the trade designation "FILTRETE GDU-60", from 3M Company, St. Paul, Minn.

In some applications, the polymeric netting according to the present disclosure and/or made according to a method disclosed herein can be used, for example, to provide spacers between filtering layers for filtration packs and/or to provide rigidity and support for filtration media. In some embodiments, several layers of the polymeric netting are used, where each layer is positioned to provide optimal filtering. Also, in some embodiments, the elastic feature of some polymeric nettings disclosed herein can accommodate expansion of the filter as the filter fills up.

In some embodiments, the polymeric netting may be used in connection with a second, different filtration medium without directly attaching the polymeric netting and second, different filtration medium. In other embodiments, the polymeric netting may be joined to the second, different filtration medium or other carrier 47 as shown in article 30 in FIG. 3. The polymeric netting may be joined to the second, different filtration medium or carrier, for example, by lamination (e.g., extrusion lamination), adhesives (e.g., pressure sensitive adhesives), or other bonding methods (e.g., ultrasonic bonding, compression bonding, or surface bonding).

A carrier may be continuous (i.e., without any through-penetrating holes) or discontinuous (e.g. comprising through-penetrating perforations or pores). The carrier may comprise a variety of suitable materials including woven webs, non-woven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, the carrier is a fibrous material (e.g., a woven, nonwoven, or knit material). Examples of materials for forming thermoplastic films or thermoplastic fibers for a fibrous carrier include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer. Useful carriers may have any suitable basis weight or thickness that is desired for a particular application. For a fibrous carrier, the basis weight may range, e.g., from at least about 5, 8, 10, 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness.

With the polymeric nettings according to the present disclosure and/or made according to a method disclosed herein, it may be useful to have the polymeric ribbons spread apart from one another to a greater extent in one portion of the filtration article than in the other (e.g., using the methods described above.) Attaching the spread polymeric netting to the second, different filtration medium or other carrier may be useful for holding the web in this spread open condition. Spreading in certain locations allows the performance of the polymeric netting to be tailored to provide, for example, different performance characteristics in different locations of a filter, for example. However, in some embodiments it may be desired to spread the web in the cross direction uniformly across the entire width of the polymeric netting.

The polymeric nettings according to the present disclosure have a unique, three-dimensional structure. The structure is provided by the polymeric ribbons having an aspect ratio of at least 3:1 in combination with the polymeric strands which typically have a smaller height than the polymeric ribbons. However, in the embodiment shown in FIG. 6, for example, a unique structure is provided even if the polymeric ribbons and polymeric strands have the same height since the first polymeric ribbons do not extend to the second major surface, and the second polymeric ribbons do not extend to the first major surface. The structure of the polymeric netting offers many useful advantages as a filtration medium. Since the polymeric netting does not have a flat major surface, it can break up dust cake formation. Also, when the polymeric ribbons are separated from each other by shorter strands or offset from each as shown in FIG. 6, the structure creates a plurality of air flow channels along the lengths of the polymeric ribbons in addition to the flow channels formed by the openings. The airflow in two directions, which is not available in other channel-flow filtration media, may increase the opportunity of the polymeric netting to capture particulates or may increase the useful positions where the polymeric netting may be placed in a filter system. The aspect ratio of the polymeric ribbons can provide a long residence time for the air in the filter, providing a greater opportunity for particles to be separated.

Moreover, while various other three dimensional air filtration structures are available by performing corrugating, multi-layer laminating, and/or honeycomb-forming operations on films, the manufacture of these channel-flow structures requires multiple layers to be combined, bonded together, and cut to the proper thickness. While providing low airflow resistance, the additional process steps impart a more complicated and expensive manufacturing path to the materials. The polymeric netting according to the present disclosure bypasses the need for combining, bonding, and cutting process steps because it can be directly extruded as a three-dimensional structure, useful as a channel-flow filtration medium.

Some Embodiments of the Disclosure

In a first embodiment, the present disclosure provides a filtration medium comprising a polymeric netting, wherein the polymeric netting comprises polymeric ribbons and polymeric strands, each of the polymeric ribbons and strands having a length and width, wherein the length is the longest dimension and the width is the shortest dimension, wherein the polymeric ribbons have a height-to-width aspect ratio of at least five to one, a major surface that is intermittently bonded to only one polymeric strand at spaced-apart bonding sites, and a height that is at least two times greater than a height of the one polymeric strand.

In a second embodiment, the present disclosure provides the filtration medium of the first embodiment, wherein the polymeric ribbons each have a center line bisecting the major surface and first and second edges symmetrically disposed on opposite sides of the center line, wherein the major surface is intermittently bonded to only one polymeric strand at a location closer to the first edge than the second edge.

In a third embodiment, the present disclosure provides the filtration medium of the first or second embodiment, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons and portions of at least some of the polymeric strands.

In a fourth embodiment, the present disclosure provides the filtration medium of the first embodiment, wherein the polymeric ribbons each have a center line bisecting the major surface, and wherein the major surface is intermittently bonded to only one polymeric strand at a location including the center line.

In a fifth embodiment, the present disclosure provides the filtration medium of the first or fourth embodiment, wherein the polymeric ribbons and polymeric strands are vertically centered.

In a sixth embodiment, the present disclosure provides the filtration medium of the first, second, fourth, or fifth embodiment, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons, and wherein neither the first nor second major surfaces comprise a portion of the polymeric strands.

In a seventh embodiment, the present disclosure provides the filtration medium of the first embodiment, wherein the polymeric ribbons each have a center line bisecting the major surface and first and second edges symmetrically disposed on opposite sides of the center line, wherein the major surface of a first portion of the polymeric ribbons is bonded to only one polymeric strand at a location closer to the first edge than the second edge and the major surface of a second portion of the polymeric ribbons is bonded to only one polymeric strand at a location closer to the second edge than the first edge.

In an eighth embodiment, the present disclosure provides a filtration medium comprising a polymeric netting, wherein the polymeric netting comprises first and second polymeric ribbons and polymeric strands, each of the first and second polymeric ribbons and polymeric strands having a length and width, wherein the length is the longest dimension and the width is the shortest dimension, wherein the first and second polymeric ribbons each independently have a height-to-width aspect ratio of at least three to one, a major surface that is intermittently bonded to a polymeric strand, with a center line bisecting the major surface and first and second edges symmetrically disposed on opposite sides of the center line, wherein the polymeric netting has first and second opposing major surfaces transverse to the major surfaces of the first and second polymeric ribbons, wherein the first major surface of the polymeric netting comprises the first edges of the first polymeric ribbons, wherein the second major surface comprises the second edges of the second polymeric ribbons, wherein the first polymeric ribbons do not extend to the second major surface, and wherein the second polymeric ribbons do not extend to the first major surface.

In a ninth embodiment, the present disclosure provides the filtration medium of the eighth embodiment, wherein the height of at least one of the first and second polymeric ribbons is greater than the height of the polymeric strands for at least a portion of the polymeric netting.

In a tenth embodiment, the present disclosure provides the filtration medium of the eighth or ninth embodiment, wherein the height of at least one of the first and second polymeric ribbons is independently at least twice the height of the polymeric strands for at least a portion of the polymeric netting.

In an eleventh embodiment, the present disclosure provides the filtration medium of any one of the eighth to tenth embodiments, wherein neither the first nor second major surface of the polymeric netting comprises a portion of the polymeric strands.

In a twelfth embodiment, the present disclosure provides the filtration medium any one of the eighth to eleventh embodiments, wherein the major surface of the first polymeric ribbons is bonded to its polymeric strand at a location closer to the second edge than the first edge, and the major surface of the second polymeric ribbons is bonded to its polymeric strand at a location closer to the first edge than the second edge.

In a thirteenth embodiment, the present disclosure provides the filtration medium of any one of the eighth to twelfth embodiments, wherein one first polymeric ribbon is disposed between any two adjacent second polymeric ribbons, and wherein one second polymeric ribbon is disposed between any two adjacent first polymeric ribbons.

In a fourteenth embodiment, the present disclosure provides the filtration medium of any one of the eighth to thirteenth embodiments, wherein the height-to-width aspect ratio of at least one of the first polymeric ribbons or second polymeric ribbons is independently at least 5 to 1.

In a fifteenth embodiment, the present disclosure provides the filtration medium of any one of the first to fourteenth embodiments, wherein the polymeric ribbons each have a center line bisecting the major surface and first and second edges symmetrically disposed on opposite sides of the center line, wherein the first edges of the polymeric ribbons comprise a different composition than the second edges of the polymeric ribbons.

In a sixteenth embodiment, the present disclosure provides the filtration medium of any one of the first to fifteenth embodiments, wherein the polymeric ribbons and polymeric strands alternate in at least a portion of the polymeric netting.

In a seventeenth embodiment, the present disclosure provides the filtration medium of any one of the first to sixteenth embodiments, wherein the polymeric strands and polymeric ribbons do not intersect each other.

In an eighteenth embodiment, the present disclosure provides the filtration medium of any one of the first to seventeenth embodiments, wherein the height-to-width aspect ratio of at least some of the polymeric ribbons is greater than 7 to 1.

In a nineteenth embodiment, the present disclosure provides the filtration medium of any one of the first to eighteenth embodiments, wherein the height of at least some of the polymeric ribbons is greater than 750 micrometers.

In a twentieth embodiment, the present disclosure provides the filtration medium of any one of the first to eighteenth embodiments, wherein the height of at least some of the polymeric ribbons is less than 750 micrometers.

In a twenty-first embodiment, the present disclosure provides the filtration medium of any one of the first to fourteenth embodiments, wherein at least some of the polymeric ribbons have a different color than at least some of the polymeric strands.

In a twenty-second embodiment, the present disclosure provides the filtration medium of any one of the first to twenty-first embodiments, wherein at least some of the polymeric ribbons have a different polymeric composition than at least some of the polymeric strands.

In a twenty-third embodiment, the present disclosure provides the filtration medium of any one of the first to twenty-second embodiments, wherein the polymeric ribbons are elastic, the polymeric strands are elastic, or both the polymeric ribbons and the polymeric strands are elastic.

In a twenty-fourth embodiment, the present disclosure provides the filtration medium of any one of the first to twenty-second embodiments, wherein the polymeric ribbons are non-elastic, the polymeric strands are non-elastic, or both the polymeric ribbons and the polymeric strands are non-elastic.

In twenty-fifth embodiment, the present disclosure provides the filtration medium of any one of the first to twenty-fourth embodiments, wherein the polymeric ribbons are substantially straight.

In a twenty-sixth embodiment, the present disclosure provides the filtration medium of any one of the first to twenty-fifth embodiments, wherein the polymeric ribbons do not have a uniform height.

In a twenty-seventh embodiment, the present disclosure provides a filtration medium comprising a polymeric netting, wherein the polymeric netting comprises polymeric ribbons and polymeric strands, each of the polymeric ribbons and strands having a length and width, wherein the length is the longest dimension and the width is the shortest dimension, wherein the polymeric ribbons have a height-to-width aspect ratio of at least three to one, a major surface that is intermittently bonded to a polymeric strand at spaced-apart bonding sites, and a height that is greater than a height of the polymeric strand, and wherein at least one of the following limitations is met:
the polymeric netting is electrostatically charged;
the polymeric netting further comprises sorbent particles attached to at least some of the polymeric ribbons or polymeric strands; or
the polymeric netting is pleated.

In a twenty-eighth embodiment, the present disclosure provides the filtration medium according to the twenty-seventh embodiment, wherein the major surface of each of the polymeric ribbons is intermittently bonded to only one polymeric strand at spaced-apart bonding sites.

In a twenty-ninth embodiment, the present disclosure provides the filtration medium of any one of the twenty-seventh to twenty-eighth embodiments, wherein the polymeric ribbons each have a center line bisecting the major surface and first and second edges symmetrically disposed on opposite sides of the center line, wherein the major surface is intermittently bonded to the polymeric strand at a location closer to the first edge than the second edge.

In a thirtieth embodiment, the present disclosure provides the filtration medium of any one of the twenty-seventh to twenty-ninth embodiments, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons and portions of at least some of the polymeric strands.

In a thirty-first embodiment, the present disclosure provides the filtration medium of any one of the twenty-seventh to twenty-ninth embodiments, wherein the polymeric ribbons each have a center line bisecting the major surface, and wherein the major surface is intermittently bonded to the polymeric strand at a location including the center line.

In a thirty-second embodiment, the present disclosure provides the filtration medium of any one of the twenty-seventh, twenty-eighth, or thirty-first embodiments, wherein the polymeric ribbons and polymeric strands are vertically centered.

In a thirty-third embodiment, the present disclosure provides the filtration medium of any one of the twenty-seventh, twenty-eighth, thirty-first, or thirty-second embodiment, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons, and wherein neither the first nor second major surfaces comprise a portion of the polymeric strands.

In a thirty-fourth embodiment, the present disclosure provides the filtration medium of the twenty-seventh or twenty-eighth embodiment, wherein the polymeric ribbons each have a center line bisecting the major surface and first and second edges symmetrically disposed on opposite sides of the center line, wherein the major surface of a first portion of the polymeric ribbons is bonded to the polymeric strand at a location to the first edge than the second edge and the major surface of a second portion of the polymeric ribbons is bonded to the polymeric strand at a location closer to the second edge than the first edge.

In a thirty-fifth embodiment, the present disclosure provides the filtration medium of any one of the twenty-seventh, twenty-eighth, or thirty-fourth embodiments, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of a first portion of the polymeric ribbons, wherein the second major surface comprises the second edges of the polymeric ribbons, wherein the first portion of the polymeric ribbons does not extend to the second major surface, and wherein the second portion of the polymeric ribbons does not extend to the first major surface.

In a thirty-sixth embodiment, the present disclosure provides the filtration medium of any one of the twenty-seventh to thirty-fifth embodiments, wherein the polymeric ribbons each have a center line bisecting the major surface and first and second edges symmetrically disposed on opposite sides of the center line, wherein the first edges of the polymeric ribbons comprise a different composition than the second edges of the polymeric ribbons.

In a thirty-seventh embodiment, the present disclosure provides the filtration medium of any one of the twenty-seventh to thirty-sixth embodiments, wherein the polymeric ribbons and polymeric strands alternate in at least a portion of the polymeric netting.

In thirty-eighth embodiment, the present disclosure provides the filtration medium of any one of the twenty-seventh to thirty-seventh embodiments, wherein the polymeric strands and polymeric ribbons do not intersect each other.

In a thirty-ninth embodiment, the present disclosure provides the filtration medium of any one of the twenty-seventh to thirty-eighth embodiments, wherein the height-to-width aspect ratio of at least some of the polymeric ribbons is at least 5 to 1 or 7:1.

In a fortieth embodiment, the present disclosure provides the filtration medium of any one of the twenty-seventh to thirty-ninth embodiments, wherein the height of at least some of the polymeric ribbons is greater than 750 micrometers.

In a forty-first embodiment, the present disclosure provides the filtration medium of any one of the twenty-seventh to thirty-ninth embodiments, wherein the height of at least some of the polymeric ribbons is less than 750 micrometers.

In a forty-second embodiment, the present disclosure provides the filtration medium of any one of the twenty-seventh to forty-first embodiments, wherein at least some of the polymeric ribbons have a different color than at least some of the polymeric strands.

In a forty-third embodiment, the present disclosure provides the filtration medium of any one of the twenty-seventh to forty-first embodiments, wherein at least some of the polymeric ribbons have a different polymeric composition than at least some of the polymeric strands.

In a forty-fourth embodiment, the present disclosure provides the filtration medium of any one of the twenty-seventh to fortieth embodiments, wherein the polymeric ribbons are elastic, the polymeric strands are elastic, or both the polymeric ribbons and the polymeric strands are elastic.

In a forty-fifth embodiment, the present disclosure provides the filtration medium of any one of the twenty-seventh to fortieth embodiments, wherein the polymeric ribbons are non-elastic, the polymeric strands are non-elastic, or both the polymeric ribbons and the polymeric strands are non-elastic.

In forty-sixth embodiment, the present disclosure provides the filtration medium of any one of the twenty-seventh to forty-fifth embodiments, wherein the polymeric ribbons are substantially straight.

In a forty-seventh embodiment, the present disclosure provides the filtration medium of any one of the twenty-seventh to forty-sixth embodiments, wherein the polymeric ribbons do not have a uniform height.

In a forty-eighth embodiment, the present disclosure provides the filtration medium of any one of the twenty-seventh to forty-seventh embodiments, the height of the polymeric ribbon is at least two times greater than the height of the polymeric strand.

In a forty-ninth embodiment, the present disclosure provides the filtration medium of any one of the first to forty-eighth embodiments, wherein the polymeric netting is electrostatically charged.

In a fiftieth embodiment, the present disclosure provides the filtration medium of the forty-ninth embodiment, wherein the polymeric netting comprises at least one polypropylene or polymethylpentene.

In a fifty-first embodiment, the present disclosure provides the filtration medium of any one of the first to fiftieth embodiments, wherein the polymeric netting further comprises sorbent particles attached to at least some of the polymeric ribbons or polymeric strands.

In a fifty-second embodiment, the present disclosure provides the filtration medium of the fifty-first embodiment, wherein the sorbent particles comprise at least one of activated carbon or alumina.

In a fifty-third embodiment, the present disclosure provides the filtration medium of any one of the first to fifty-second embodiments, wherein the polymeric netting is pleated.

In a fifty-fourth embodiment, the present disclosure provides a filter comprising the filtration medium of any one of the first to fifty-third embodiments.

In a fifty-fifth embodiment, the present disclosure provides a method of making a filtration medium, the method comprising:

providing an extrusion die comprising at least one cavity, a dispensing surface, and fluid passageways between the at least one cavity and the dispensing surface, wherein the dispensing surface has an array of first dispensing orifices separated by an array of second dispensing orifices, wherein the first and second dispensing orifices each have a top edge, a bottom edge, a height that is the distance between the top edge and the bottom edge, and a width, wherein the first dispensing orifices each have a height-to-width aspect ratio of at least three to one or at least five to one, and wherein the height of the first dispensing orifices is larger (in some embodiments, at least two times larger) than the height of the second dispensing orifices;

dispensing polymeric ribbons from the first dispensing orifices at a first speed while simultaneously dispensing polymeric strands from the second dispensing orifices at a second speed to provide the polymeric netting, wherein the second speed is at least twice the first speed.

In a fifty-sixth embodiment, the present disclosure provides the method of the fifty-fifth embodiment, wherein the fluid passageways are provided by a plurality of sequences of shims, wherein each sequence comprises at least one first shim that provides a fluid passageway.

In a fifty-seventh embodiment, the present disclosure provides the method of the fifty-fifth embodiment, wherein the extrusion die comprises at least a first and second cavity, first fluid passageways between the first cavity and the first dispensing orifices, and second fluid passageways between the second cavity and the second dispensing orifices.

In a fifty-eighth embodiment, the present disclosure provides the method of the fifty-seventh embodiment, wherein the fluid passageways are provided by a plurality of sequences of shims, wherein each sequence comprises at least one first shim that provides the first fluid passageway, and at least one second shim that provides the second fluid passageway.

In a fifty-ninth embodiment, the present disclosure provides the method of the fifty-fifth or fifty-seventh embodiment, wherein at least the first dispensing orifices are defined by an array of first vestibules, the die further comprising a third cavity, a first fluid passageway between the first cavity and one of the first vestibules, a third passageway extending from the third cavity to the same vestibule, such that the area where the third fluid passageway enters the first vestibule is above or below the area where the first fluid passageway enters the first vestibule.

In a sixtieth embodiment, the present disclosure provides the method of the fifty-ninth embodiment, wherein the fluid passageways are provided by a plurality of sequences of shims, wherein each sequence comprises at least one first shim that provides the first fluid passageway, and at least one third shim that provides the third fluid passageway.

In a sixty-first embodiment, the present disclosure provides the method of any one of the fifty-fifth to sixtieth embodiments, wherein the polymeric ribbons are substantially straight.

In a sixty-second embodiment, the present disclosure provides the method of any one of the fifty-fifth to sixty-first embodiments, wherein the polymeric strands oscillate to at least partially alternately bond to two adjacent polymeric ribbons.

In a sixty-third embodiment, the present disclosure provides the method of any one of the fifty-fifth to sixty-second embodiments, wherein the polymeric strands and polymeric ribbons do not intersect each other.

In a sixty-fourth embodiment, the present disclosure provides the method of any one of the fifty-fifth to sixty-third embodiments, wherein the height-to-width aspect ratio of at least some of the first dispensing orifices is at least 11 to 1.

In a sixty-fifth embodiment, the present disclosure provides the method of any one of the fifty-fifth to sixty-fourth embodiments, wherein the height of at least some of the polymeric ribbons is greater than 750 micrometers.

In a sixty-sixth embodiment, the present disclosure provides the method of any one of the fifty-fifth to sixty-fourth embodiments, wherein the height of at least some of the polymeric ribbons is less than 750 micrometers.

In a sixty-seventh embodiment, the present disclosure provides the method of any one of the fifty-fifth to sixty-sixth embodiments, wherein at least some of the polymeric ribbons have a different color than at least some of the polymeric strands.

In a sixty-eighth embodiment, the present disclosure provides the method of any one of the fifty-fifth to sixty-seventh embodiments, wherein at least some of the polymeric ribbons have a different polymeric composition than at least some of the polymeric strands.

In a sixty-ninth embodiment, the present disclosure provides the method of any one of the fifty-fifth to sixty-eighth embodiments, wherein the polymeric ribbons are elastic, the polymeric strands are elastic, or both the polymeric ribbons and the polymeric strands are elastic.

In a seventieth embodiment, the present disclosure provides the method of any one of the fifty-fifth to sixty-ninth embodiments, wherein the second dispensing orifices are vertically aligned closer to the bottom edges than the top edges of the first dispensing orifices.

In a seventy-first embodiment, the present disclosure provides the method any one of the fifty-fifth to seventieth embodiments, wherein the polymeric ribbons each have a center line bisecting the major surface and first and second edges symmetrically disposed on opposite sides of the center line, wherein the major surface is intermittently bonded to only one polymeric strand at a location between the center line and the first edge.

In a seventy-second embodiment, the present disclosure provides the method of the seventieth or seventy-first embodiment, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons and portions of at least some of the polymeric strands.

In a seventy-third embodiment, the present disclosure provides the method of any one of the fifty-fifth to sixty-ninth embodiments, wherein the first and second dispensing orifices are vertically centered.

In a seventy-fourth embodiment, the present disclosure provides the method of any one of the fifty-fifth to sixty-ninth and seventy-third embodiments, wherein the polymeric ribbons each have a center line bisecting the major surface, and wherein the major surface is intermittently bonded to only one polymeric strand at a location including the center line.

In a seventy-fifth embodiment, the present disclosure provides the method of the seventy-third or seventy-fourth embodiment, wherein the polymeric ribbons and polymeric strands are vertically centered.

In a seventy-sixth embodiment, the present disclosure provides the method of any one of the fifty-fifth to sixty-ninth and seventy-third to seventy-fifth embodiments, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of the polymeric ribbons, and wherein the second major surface comprises the second edges of the polymeric ribbons, and wherein neither the first nor second major surfaces comprise a portion of the polymeric strands.

In a seventy-eighth embodiment, the present disclosure provides the method of any one of the fifty-fifth to sixty-ninth embodiments, wherein the second dispensing orifices are vertically aligned, and wherein a first portion of the first dispensing orifices have their bottom edges closer to the second dispensing orifices than their top edges, and wherein a second portion of the first dispensing orifices have their top edges closer to the second dispensing orifices than their bottom edges.

In a seventy-ninth embodiment, the present disclosure provides the method of the seventy-eighth embodiment, wherein the first dispensing orifices alternate between top edges substantially aligned with the top edges of the second dispensing orifices and bottom edges substantially aligned with the bottom edges of the second dispensing orifices.

In an eightieth embodiment, the present disclosure provides the method of any one of the fifty-fifth to sixty-ninth, seventy-eighth or seventy-ninth embodiments, wherein the polymeric ribbons each have a center line bisecting the major surface and first and second edges symmetrically disposed on opposite sides of the center line, wherein the major surface of a first portion of the polymeric ribbons is bonded to only one polymeric strand at a location between the center line and the first edge and the major surface of a second portion of the polymeric ribbons is bonded to only one polymeric strand at a location between the center line at the second edge.

In an eighty-first embodiment, the present disclosure provides the method of any one of the fifty-fifth to sixty-ninth and seventy-eighth to eightieth embodiments, wherein the polymeric ribbons each have a center line bisecting the major surface and first and second edges symmetrically disposed on opposite sides of the center line, wherein the polymeric netting has first and second opposing major surfaces transverse to the major surfaces of the polymeric ribbons, wherein the first major surface of the polymeric netting comprises the first edges of a first portion of the polymeric ribbons, wherein the second major surface comprises the second edges of the polymeric ribbons, wherein the first portion of the polymeric ribbons does not extend to the second major surface, and wherein the second portion of the polymeric ribbons does not extend to the first major surface.

In an eighty-second embodiment, the present disclosure provides the method of any one of the fifty-fifth to eighty-first embodiments, further comprising electrostatically charging the polymeric netting.

In an eighty-third embodiment, the present disclosure provides the method of any one of the fifty-fifth to eighty-second embodiments, further comprising pleating the polymeric netting.

In an eighty-fourth embodiment, the present disclosure provides the method of any one of the fifty-fifth to eighty-third embodiments, further comprising attaching (in some embodiments, adhering) sorbent particles to at least one of the polymeric ribbons or polymeric strands.

In an eighty-fifth embodiment, the present disclosure provides the filter of the fifty-fourth embodiment, wherein the filter is a filter for heating, ventilation, or air conditioning equipment.

In an eighty-sixth embodiment, the present disclosure provides the filter of the fifty-fourth embodiment, wherein the filter is an automobile filter.

In an eighty-seventh embodiment, the present disclosure provides the filter of the fifty-fourth embodiment, wherein the filter is an appliance filter.

In an eighty-eighth embodiment, the present disclosure provides the filter of the fifty-fourth embodiment, wherein the filter is a window filter.

In an eighty-ninth embodiment, the present disclosure provides the filter of any one of the fifty-fourth or eighty-fifth to eighty-eighth embodiments, wherein the filter comprises a frame.

In a ninetieth embodiment, the present disclosure provides the filter of any one of the fifty-fourth or eighty-fifth to eighty-ninth embodiments, wherein the filter further comprises a second, different filtration medium.

In a ninety-first embodiment, the present disclosure provides the filter of the ninetieth embodiment, wherein the second, different filtration medium is electrostatically charged.

In a ninety-second embodiment, the present disclosure provides the filter of the ninetieth or ninety-first embodiment, wherein the second, different filtration medium comprises sorbent particles.

In a ninety-third embodiment, the present disclosure provides the filter of any one of the ninetieth to ninety-second embodiments, wherein the second, different filtration medium is pleated.

In a ninety-fourth embodiment, the present disclosure provides the filter of the ninety-third embodiment, wherein the polymeric netting is a support layer for the pleated second, different filtration medium.

In a ninety-fifth embodiment, the present disclosure provides the filter of any one of the fifty-fourth or eighty-fifth to ninety-third embodiments, wherein the polymeric netting is a pre-filter layer.

In a ninety-sixth embodiment, the present disclosure provides the filter of any one of the fifty-fourth or eighty-fifth to ninety-fifth embodiments, wherein the filter is a component of a filtration system that further comprises an ionizer.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Test Methods

Basis Weight, Thickness, and Solidity

Solidity is determined by dividing the measured bulk density of the polymeric netting by the density of the materials making up the solid portion of the polymeric netting. Bulk density of the polymeric netting was determined by first measuring the weight of a 135 mm diameter disk of the polymeric netting. Dividing the measured weight of the polymeric netting by its area provided the basis weight of the polymeric netting, which is reported below in g/m$^2$. The thickness of the polymeric netting was measured by obtaining (e.g., by die cutting) a 135 mm diameter disk of the polymeric netting and measuring the thickness in an uncompressed state. The bulk density of the web was determined by dividing the basis weight of the web by the thickness of the web and is reported as g/m$^3$.

The solidity is then determined by dividing the bulk density of the polymeric netting by the density of the material (e.g. polymer) in the polymeric ribbons and polymeric strands of the polymeric netting. The density of a bulk polymer can be measured by standard means if the supplier does not specify the material density. Solidity is a dimensionless fraction which is usually reported in percentage. Loft is usually reported as 100% minus the solidity (e.g., a solidity of 7% equates to a loft of 93%).

Percent (%) Penetration, Pressure Drop, and Quality Factor

Percent penetration, pressure drop, and the filtration Quality Factor (QF) of the polymeric netting were determined using a challenge aerosol containing DOP (dioctyl phthalate) liquid droplets, delivered (unless otherwise indicated)

at a flow rate of 85 liters/min to provide a face velocity of 13.8 cm/s, or 32 liters/min to provide a face velocity of 5.2 cm/s, and evaluated using a TSI (Registered Trademark) Model 8130 high-speed automated filter tester (commercially available from TSI Inc., Shoreview, Minn.). For DOP testing, the aerosol may contain particles with a diameter of about 0.185 μm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Wilmington, Mass.) may be employed to measure pressure drop (DELTA P, mm H$_2$O) through the filter. The equation:

$$QF = \frac{-\ln\left(\frac{\% \text{ Particle Penetration}}{100}\right)}{\Delta P}$$

may be used to calculate QF. The initial Quality Factor QF value usually provides a reliable indicator of overall performance, with higher initial QF values indicating better filtration performance and lower initial QF values indicating reduced filtration performance. Units of QF are inverse pressure drop (reported in 1/mm or mm$^{-1}$ H$_2$O).

Example 1

A co-extrusion die as generally depicted in FIGS. 22 and 23 and assembled with a multi shim repeating pattern of extrusion orifices as generally illustrated in FIGS. 12A and 12B was prepared. The thickness of the shims in the repeat sequence was 4 mils (0.102 mm). These shims were formed from stainless steel, with perforations cut by a wire electron discharge machining. Referring to FIG. 11, the height of dispensing orifices 356 of shims 300 were cut to 100 mils (2.54 mm). Referring to FIG. 9, the height of the dispensing orifice 156 of shims 100 were cut to 20 mils (0.508 mm). The shims were stacked in a repeating sequence 100, 100, 200, 200, 300, 300, 200, 200. As assembled the width of the dispensing openings 1001 and 1003 were each 0.203 mm, and the land spacings between openings were 0.203 mm. The extrusion orifices were aligned in a collinear, alternating arrangement, and resulting dispensing surface was as shown in FIG. 12B. The total width of the shim setup was about 13 cm (5 inches).

The inlet fittings on the two end blocks were each connected to three conventional single-screw extruders. Each extruder feeding cavities 1012a and 1012c were loaded with polypropylene homopolymer (obtained under the trade designation "PP F008F" from Braskem, Philadelphia, Pa.), dry blended with 10% polypropylene homopolymer (obtained under the trade designation "Total M3766" From Total Petrochemicals, LaPaorte Tex.).

The flow rate of the polymer exiting openings 1003 was 1.7 kg/hr, and flow rate of the polymer exiting openings 1001 was 1.4 kg/hr. The melt was extruded vertically into an extrusion quench takeaway. The quench takeaway speed was 1.2 m/min, and the melt drop distance was 3 cm. The extrusion temperature was 218° C. The polymer exiting openings 1003 was oscillating. The quench roll was a smooth temperature controlled chrome plated 20-cm diameter steel roll. The quench temperature, which was 10° C., was controlled with internal water flow. The web path wrapped 180 degrees around the chrome steel roll and then to a windup roll.

Figure 28:
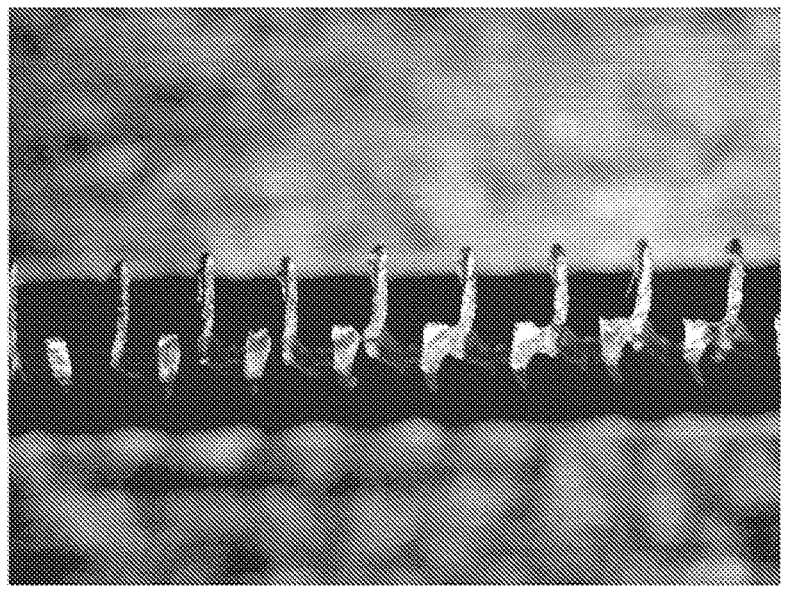
FIG. 28 is a photographs of a top view of the polymeric netting of Example 1.

A photograph of the polymeric netting obtained is shown in FIG. 28. Using an optical microscope at 30× magnification, the polymeric strand width and height were determined to be 200 micrometers and 470 micrometers respectively, and the polymeric ribbon width and height were determined to be 140 micrometers and 1000 micrometers, respectively. The spacing between polymeric ribbons was about 0.82 mm.

Basis weight, solidity, and pressure drop were measured for Example 1 according to the test methods described above. The basis weight, thickness, and solidity were determined to be 257 grams per square meter, 1.3 mm, and 22%, respectively. The pressure drop at 13.8 cm/s air velocity was determined to be 0.034 mm H$_2$O, and the pressure drop at 5.2 cm/s air velocity was determined to be 0.016 mm H$_2$O. The sample was also measured for pressure drop at a 1.0 m/s air velocity, and the pressure drop was determined to be 0.64 mm H$_2$O.

A sample of Example 1 was electrostatically charged with a corona charging process at approximately 19 kV and then tested for its efficiency at 5.2 cm/s using DOP aerosol. The results, below, show a marked increase in the quality factor owing to the increased efficiency of the material.

| Condition | PD @ 5.2 cm/s, mm H$_2$O | % Penetration | Quality factor |
|---|---|---|---|
| Uncharged | 0.016 | 99.0 | 0.7 |
| Charged | 0.016 | 93.7 | 4.4 |

Example 2

A co-extrusion die as generally depicted in FIGS. 22 and 23 and assembled with a multi shim repeating pattern of extrusion orifices as generally illustrated in FIGS. 12A and 12B was prepared. The thickness of the shims in the repeat sequence was 4 mils (0.102 mm) These shims were formed from stainless steel, with perforations cut by a wire electron discharge machining Referring to FIG. 11, the height of dispensing orifices 356 of shims 300 were cut to 100 mils (2.54 mm) Referring to FIG. 9, the height of the dispensing orifice 156 of shims 100 were cut to 10 mils (0.254 mm) The shims were stacked in a repeating sequence 100, 100, 200, 200, 300, 300, 200, 200. As assembled the width of the dispensing openings 1001 and 1003 were each 0.203 mm, and the land spacings between openings were 0.203 mm. The extrusion orifices were aligned in a collinear, alternating arrangement, and resulting dispensing surface was as shown in FIG. 12B. The total width of the shim setup was about 13 cm (5 inches).

The inlet fittings on the two end blocks were each connected to three conventional single-screw extruders. Each extruder feeding cavities 1012a and 1012c were loaded with polypropylene homopolymer (obtained under the trade designation "Total M3766" From Total Petrochemicals).

The flow rate of the polymer exiting openings 1003 was 5 kg/hr, and flow rate of the polymer exiting openings 1001 was 3.6 kg/hr. The melt was extruded vertically into an extrusion quench takeaway. The quench takeaway speed was 6.3 m/min, and the melt drop distance was 3 cm. The extrusion temperature was 218° C. The polymer exiting openings 1003 was oscillating. The quench roll was a smooth temperature controlled chrome plated 20-cm diameter steel roll. The quench temperature, which was 10° C., was controlled with internal water flow. The web path wrapped 180 degrees around the chrome steel roll and then to a windup roll.

Figure 29:
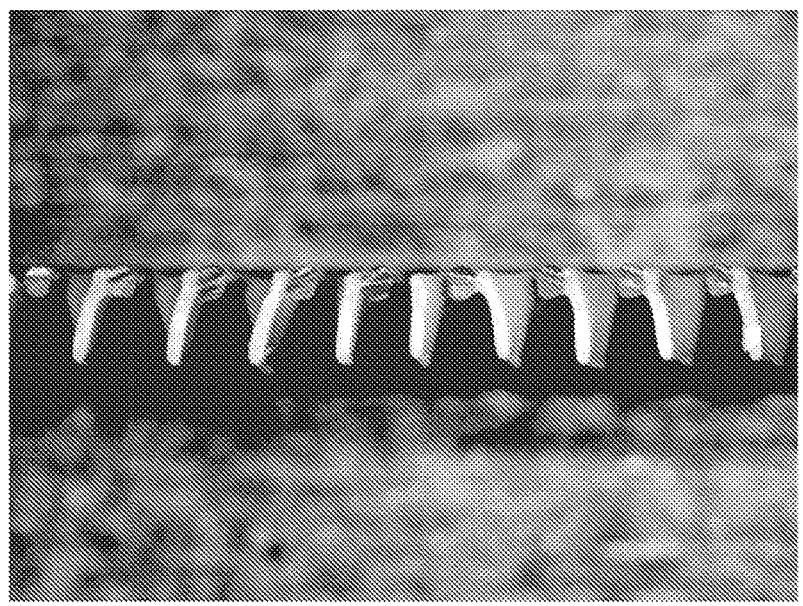
FIG. 29 is a photographs of a top view of the polymeric netting of Example 2.

A photograph of the polymeric netting obtained is shown in FIG. 29. Using an optical microscope at 30× magnification, the polymeric strand width and height were determined to be 225 micrometers and 300 micrometers respectively, and the polymeric ribbon width and height were determined to be 125 micrometers and 840 micrometers, respectively. The spacing between polymeric ribbons was about 0.70 mm.

Basis weight, solidity, and pressure drop were measured for Example 2 according to the test methods described above. The basis weight, thickness, and solidity were determined to be 227 grams per square meter, 1.0 mm, and 26%, respectively. The pressure drop at 13.8 cm/s air velocity was determined to be 0.04 mm $H_2O$.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A filtration medium comprising a polymeric netting, wherein the polymeric netting comprises polymeric ribbons and polymeric strands, each of the polymeric ribbons and strands having a length and width, wherein the length is the longest dimension and the width is the shortest dimension, wherein the polymeric ribbons have a height-to-width aspect ratio of at least three to one, a major surface that is intermittently bonded to a polymeric strand at spaced-apart bonding sites, and a height that is greater than a height of the polymeric strand, wherein the major surface of each of the polymeric ribbons is intermittently bonded to only one polymeric strand at spaced-apart bonding sites, and wherein at least one of the following limitations is met:
   the polymeric netting is electrostatically charged;
   the polymeric netting further comprises sorbent particles attached to at least some of the polymeric ribbons or polymeric strands; or
   the polymeric netting is pleated.

2. The filtration medium of claim 1, wherein at least one of the following limitations is met:
   the height-to-width aspect ratio of the polymeric ribbons is at least five to one;
   the height of the polymeric ribbon is at least two times greater than the height of the polymeric strand; or
   the major surface of each of the polymeric ribbons is intermittently bonded to only one polymeric strand at spaced-apart bonding sites.

3. The filtration medium of claim 1, wherein the polymeric ribbons each have a center line bisecting the major surface and first and second edges symmetrically disposed on opposite sides of the center line, wherein the major surface is intermittently bonded to only one polymeric strand at a location closer to the first edge than the second edge.

4. The filtration medium of claim 1, wherein the polymeric ribbons each have a center line bisecting the major surface, and wherein the major surface is intermittently bonded to only one polymeric strand at a location including the center line.

5. A filter comprising the filtration medium of claim 1.

6. The filter of claim 5, wherein the filter further comprises a second, different filtration medium.

7. The filter of claim 6, wherein the second, different filtration medium comprises sorbent particles.

8. The filter of claim 5, wherein the filter is a component of a filtration system that further comprises an ionizer.

9. The filtration medium of claim 1, wherein the polymeric netting is electrostatically charged.

10. The filtration medium of claim 1, wherein the polymeric netting further comprises sorbent particles attached to at least some of the polymeric ribbons or polymeric strands.

11. The filtration medium of claim 1, wherein the polymeric netting is pleated.

12. The filtration medium of claim 1, wherein the height-to-width aspect ratio of the polymeric ribbons is at least five to one.

13. The filtration medium of claim 1, wherein the height of the polymeric ribbon is at least two times greater than the height of the polymeric strand.

14. A filtration medium comprising a polymeric netting, wherein the polymeric netting comprises polymeric ribbons and polymeric strands, each of the polymeric ribbons and strands having a length and width, wherein the length is the longest dimension and the width is the shortest dimension, wherein the polymeric ribbons have a height-to-width aspect ratio of at least three to one, a major surface that is intermittently bonded to a polymeric strand at spaced-apart bonding sites, and a height that is greater than a height of the polymeric strand, and wherein at least one of the following limitations is met:
   the polymeric netting is electrostatically charged;
   the polymeric netting further comprises sorbent particles attached to at least some of the polymeric ribbons or polymeric strands; or
   the polymeric netting is pleated;
   and wherein the polymeric ribbons each have a center line bisecting the major surface and first and second edges symmetrically disposed on opposite sides of the center line, wherein the major surface is intermittently bonded to only one polymeric strand at a location closer to the first edge than the second edge.

15. A filtration medium comprising a polymeric netting, wherein the polymeric netting comprises polymeric ribbons and polymeric strands, each of the polymeric ribbons and strands having a length and width, wherein the length is the longest dimension and the width is the shortest dimension, wherein the polymeric ribbons have a height-to-width aspect ratio of at least three to one, a major surface that is intermittently bonded to a polymeric strand at spaced-apart bonding sites, and a height that is greater than a height of the polymeric strand, and wherein at least one of the following limitations is met:
   the polymeric netting is electrostatically charged;
   the polymeric netting further comprises sorbent particles attached to at least some of the polymeric ribbons or polymeric strands; or
   the polymeric netting is pleated;
   and wherein the polymeric ribbons each have a center line bisecting the major surface, wherein the major surface is intermittently bonded to only one polymeric strand at a location including the center line.

* * * * *

UNITED STATES PATENT AND TRADEMARK OFFICE
CERTIFICATE OF CORRECTION

PATENT NO. : 10,265,653 B2
APPLICATION NO. : 15/121976
DATED : April 23, 2019
INVENTOR(S) : Fox et al.

Page 1 of 2

It is certified that error appears in the above-identified patent and that said Letters Patent is hereby corrected as shown below:

On the Title Page

<u>Column 2 item (57), (Abstract)</u>
Line 6, Delete "one a" and insert -- one, a --, therefor.

In the Specification

<u>Column 1</u>
Line 9, Delete "No." and insert -- Nos. --, therefor.

<u>Column 19</u>
Line 56, Delete "netting" and insert -- netting. --, therefor.

<u>Column 22</u>
Line 49, Delete "and or" and insert -- and/or --, therefor.

<u>Column 22</u>
Line 65, Delete "napthalate;" and insert -- naphthalate; --, therefor.

<u>Column 23</u>
Line 2, Delete "alkonates" and insert -- alkanoates --, therefor.

<u>Column 23</u>
Line 57, Delete "or" and insert -- nor --, therefor.

<u>Column 24</u>
Line 25, Delete "Applicaton" and insert -- Application --, therefor.

<u>Column 41</u>
Line 55, Delete "LaPaorte" and insert -- La Porte --, therefor.

Signed and Sealed this
Seventh Day of January, 2020

Andrei Iancu
*Director of the United States Patent and Trademark Office*

Column 42
Line 37, Delete "mm)" and insert -- mm). --, therefor.

Column 42
Line 39, Delete "machining" and insert -- machining. --, therefor.

Column 42
Line 41, Delete "mm)" and insert -- mm). --, therefor.

Column 42
Line 42, Delete "mm)" and insert -- mm). --, therefor.